(12) United States Patent
Oishi et al.

(10) Patent No.: US 11,050,268 B2
(45) Date of Patent: Jun. 29, 2021

(54) POWER SUPPLY SYSTEM

(71) Applicant: Yazaki Corporation, Tokyo (JP)

(72) Inventors: Eiichiro Oishi, Shizuoka (JP); Kazuo Sugimura, Shizuoka (JP); Kazuya Tsubaki, Shizuoka (JP); Mitsuaki Morimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/702,416

(22) Filed: Dec. 3, 2019

(65) Prior Publication Data
US 2020/0185936 A1 Jun. 11, 2020

(30) Foreign Application Priority Data

Dec. 7, 2018 (JP) .............................. JP2018-229658
Mar. 11, 2019 (JP) .............................. JP2019-043424
Aug. 28, 2019 (JP) .............................. JP2019-155317

(51) Int. Cl.
*B60R 16/033* (2006.01)
*H02J 7/00* (2006.01)

(52) U.S. Cl.
CPC .......... *H02J 7/0024* (2013.01); *B60R 16/033* (2013.01); *H02J 7/0047* (2013.01)

(58) Field of Classification Search
CPC ..... H02J 7/0024; H02J 7/0047; B60R 16/033; Y02E 60/00; Y04S 10/126; Y02T 90/12; Y02T 10/7072; Y02T 10/70; B60L 53/62; B60L 53/63; B60L 58/19; B60L 58/10; B60L 3/0046; B60L 3/04; B60L 2240/547
See application file for complete search history.

(56) References Cited

U.S. PATENT DOCUMENTS

| | | | |
|---|---|---|---|
| 2007/0159007 A1 | 7/2007 | King et al. | |
| 2010/0164278 A1 | 7/2010 | Oyobe et al. | |
| 2018/0056798 A1 | 3/2018 | Syouda | |
| 2018/0345806 A1 | 12/2018 | Lee et al. | |
| 2019/0126761 A1* | 5/2019 | Verbridge | H01M 50/502 |
| 2019/0229541 A1* | 7/2019 | Ono | H02J 7/0024 |
| 2019/0356139 A1* | 11/2019 | Ichikawa | B60L 3/00 |

FOREIGN PATENT DOCUMENTS

| | | |
|---|---|---|
| DE | 10 2017 221 770 A1 | 6/2018 |
| EP | 2 034 583 A1 | 3/2009 |
| EP | 3 409 529 A1 | 12/2018 |
| JP | 2018-33263 A | 3/2018 |
| WO | 2014/156390 A1 | 10/2014 |

* cited by examiner

*Primary Examiner* — Daniel Cavallari
(74) *Attorney, Agent, or Firm* — Kenealy Vaidya LLP

(57) ABSTRACT

In a power supply system, a charge switching unit is relays switchable between a series circuit that connects a first high-voltage battery to a second high-voltage battery in series and a parallel circuit that connects the first high-voltage battery to the second high-voltage battery in parallel. If an input voltage is a first voltage (for example, approximately 400 V), a controller controls the charge switching unit to form the parallel circuit, and charges the first and second high-voltage batteries with power supplied from a quick charger. If the input voltage is a second voltage (for example, approximately 800 V) higher than the first voltage (for example, approximately 400 V), the controller controls the charge switching unit to form the series circuit, and charges the first and second high-voltage batteries with power supplied from a super-quick charger.

10 Claims, 44 Drawing Sheets

FIG.4

| | SYSTEM STOP | BATTERY CHARGING | | CHARGING RELAY FAILURE DETECTION | | |
|---|---|---|---|---|---|---|
| | | QUICK CHARGING | SUPER-QUICK CHARGING | CHARGING RELAY 41a | CHARGING RELAY 41c | CHARGING RELAY 41b |
| UPSTREAM-SIDE MAIN RELAY 32a | OFF | ON | ON | OFF | OFF | OFF |
| DOWNSTREAM-SIDE MAIN RELAY 32b | OFF | ON | ON | OFF | OFF | OFF |
| CHARGING RELAY 41a | OFF | OFF | ON | ON | OFF | OFF |
| CHARGING RELAY 41c | OFF | ON | OFF | OFF | ON | OFF |
| CHARGING RELAY 41b | OFF | ON | OFF | OFF | OFF | ON |

FIG.20

| | VEHICLE TRAVELING | BATTERY CHARGING | | PRE-CHARGING OPERATION | | BATTERY EQUALIZATION | BATTERY FAILURE | |
| --- | --- | --- | --- | --- | --- | --- | --- | --- |
| | | QUICK CHARGING | SUPER-QUICK CHARGING | FRONT | REAR | | FIRST HIGH-VOLTAGE BATTERY | SECOND HIGH-VOLTAGE BATTERY |
| CHARGING RELAY 41a | OFF | OFF | ON | OFF | OFF | OFF | OFF | OFF |
| CHARGING RELAY 41b | ON | ON | OFF | OFF | ON | ON | OFF | ON |
| CHARGING RELAY 41c | ON | ON | OFF | ON | OFF | ON | ON | OFF |
| CHARGING RELAY 41d | ON | OFF | OFF | ON | OFF | OFF | ON | ON |
| LOAD RELAY 31c | ON | OFF | OFF | ON | ON | OFF | ON | ON |
| LOAD RELAY 31d | ON | ON | ON | OFF | ON | OFF | ON | ON |
| LOAD RELAY 31a | ON | ON | ON | OFF | OFF | OFF | OFF | ON |
| LOAD RELAY 31b | ON | OFF | OFF | OFF | OFF | OFF | OFF | OFF |
| UPSTREAM-SIDE MAIN RELAY 32c | OFF | OFF | OFF | OFF | OFF | OFF | OFF | OFF |
| DOWNSTREAM-SIDE MAIN RELAY 32d | OFF | OFF | OFF | OFF | OFF | OFF | OFF | OFF |
| UPSTREAM-SIDE MAIN RELAY 32a | OFF | OFF | OFF | OFF | OFF | OFF | OFF | OFF |
| DOWNSTREAM-SIDE MAIN RELAY 32b | OFF | OFF | OFF | OFF | OFF | OFF | OFF | OFF |

FIG.30

| SWITCH | VEHICLE TRAVELING | | QUICK CHARGING | | BATTERY VOLTAGE EQUALIZATION |
|---|---|---|---|---|---|
| | 800-V MOTOR | 400-V MOTOR | 800-V CHARGING | 400-V CHARGING | |
| FET 41e | OFF | ON | ON | ON | CONSTANT CURRENT CONTROL |
| FET 41f | ON | ON | OFF | ON | CONSTANT CURRENT CONTROL |
| CHARGING RELAY 41a | ON | OFF | ON | OFF | OFF |
| CHARGING RELAY 41c | ON | ON | OFF | ON | ON |
| CHARGING RELAY 41b | OFF | ON | OFF | ON | ON |

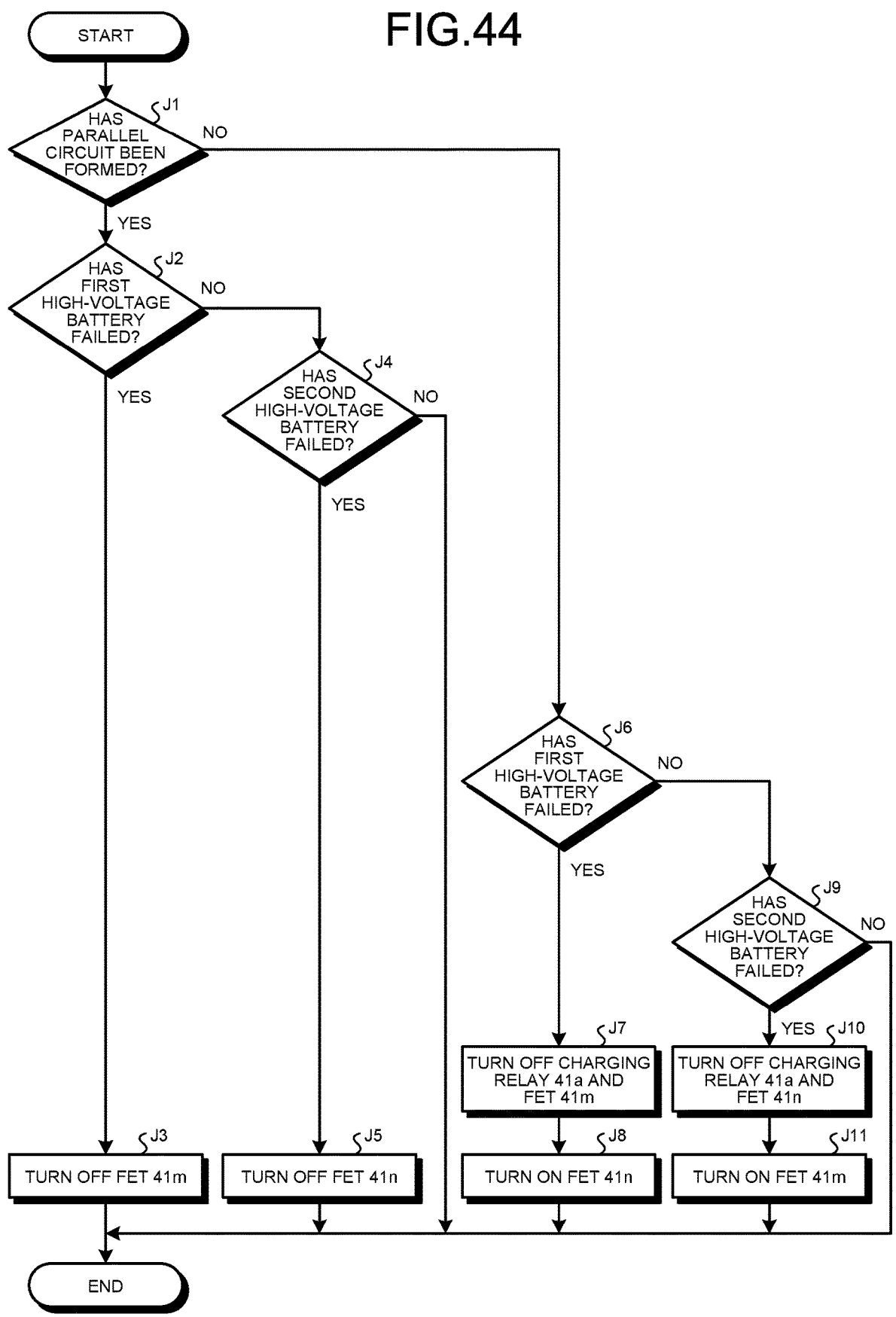

POWER SUPPLY SYSTEM

CROSS-REFERENCE TO RELATED APPLICATION(S)

The present application claims priority to and incorporates by reference the entire contents of Japanese Patent Application No. 2018-229658 filed in Japan on Dec. 7, 2018, Japanese Patent Application No. 2019-043424 filed in Japan on Mar. 11, 2019 and Japanese Patent Application No. 2019-155317 filed in Japan on Aug. 28, 2019.

BACKGROUND OF THE INVENTION

1. Field of the Invention

The present invention relates to a power supply system.

2. Description of the Related Art

Conventionally, for example, Japanese Patent Application Laid-open No. 2018-033263 discloses a vehicle quick charging device that performs charging with power supplied from an external charger. This quick charging device is provided with a plurality of battery modules, which are connected in series during charging and connected in parallel during discharging, thus reducing charging time.

The quick charging device described in Japanese Patent Application Laid-open No. 2018-033263 is desired to be capable of performing charging using either of, for example, the external charger for quick charging and an external charger for super-quick charging that provides a higher input voltage than the external charger for quick charging.

SUMMARY OF THE INVENTION

Accordingly, the present invention has been made in view of the above-described circumstances, and an object thereof is to provide a power supply system capable of appropriately performing charging in the case where the input voltage from the external charger varies.

In order to solve the above mentioned problem and achieve the object, a power supply system according to one aspect of the present invention includes a first battery that is mounted on a vehicle and is capable of storing power; a second battery that is mounted on the vehicle and is capable of storing power; a switching unit switchable between a series circuit that connects the first battery to the second battery in series and a parallel circuit that connects the first battery to the second battery in parallel; a first input unit configured to be connected to a first external charger and receive power supplied from the first external charger; and a controller configured to control the switching unit based on an input voltage of the power received from the first input unit, wherein the controller is configured to: control the switching unit to form the parallel circuit and charge the first battery and the second battery with the power supplied from the first external charger if the input voltage is a first voltage, or control the switching unit to form the series circuit and charge the first battery and the second battery with the power supplied from the first external charger if the input voltage is a second voltage higher than the first voltage.

According to another aspect of the present invention, in the power supply system, it is preferable that the switching unit includes a series connection switch configured to form the series circuit, a first parallel connection switch configured to form the parallel circuit, and a second parallel connection switch configured to form the parallel circuit, the series circuit connects a positive electrode of the first input unit to a positive electrode of the first battery, connects a negative electrode of the first battery to a positive electrode of the second battery through the series connection switch, and connects a negative electrode of the second battery to a negative electrode of the first input unit, the parallel circuit connects the positive electrode of the first input unit to the positive electrode of the first battery, and connects the negative electrode of the first battery to the negative electrode of the first input unit through the first parallel connection switch, and further, connects the positive electrode of the first input unit to the positive electrode of the second battery through the second parallel connection switch, and connects the negative electrode of the second battery to the negative electrode of the first input unit, and the controller is configured to: form the parallel circuit by turning on the first parallel connection switch and the second parallel connection switch and turning off the series connection switch if the input voltage is the first voltage; or form the series circuit by turning on the series connection switch and turning off the first parallel connection switch and the second parallel connection switch if the input voltage is the second voltage.

According to still another aspect of the present invention, in the power supply system, it is preferable that the power supply system further includes a circuit voltage detector that is capable of detecting a voltage applied to the series circuit by the first battery and the second battery, a voltage applied to the parallel circuit by the first battery, and a voltage applied to the parallel circuit by the second battery; a first battery voltage detector that is capable of detecting a voltage between the positive electrode and the negative electrode of the first battery; and a second battery voltage detector that is capable of detecting a voltage between the positive electrode and the negative electrode of the second battery, wherein the controller is configured to detect whether any one of the series connection switch, the first parallel connection switch, and the second parallel connection switch has failed, based on detection results of the circuit voltage detector, the first battery voltage detector, and the second battery voltage detector, after the first external charger is connected to the first input unit and before the power is supplied from the first external charger to the first input unit.

According to still another aspect of the present invention, in the power supply system, it is preferable that the controller is configured to detect whether the series connection switch has failed, based on the voltages of the first battery and the second battery detected by the circuit voltage detector, the voltage of the first battery detected by the first battery voltage detector, and the voltage of the second battery detected by the second battery voltage detector, detect whether the first parallel connection switch has failed, based on the voltage of the first battery detected by the circuit voltage detector and the voltage of the first battery detected by the first battery voltage detector, and detect whether the second parallel connection switch has failed, based on the voltage of the second battery detected by the circuit voltage detector and the voltage of the second battery detected by the second battery voltage detector.

According to still another aspect of the present invention, in the power supply system, it is preferable that the first battery and the second battery are configured to be connected by the series circuit or the parallel circuit, and constitute a power storage unit, the power supply system further includes: a rear power supply box that is provided on a rear side in an overall length direction of the vehicle, and is configured to turn on and off an electrical connection of the power storage unit to a load unit on the rear side of the vehicle; and a front power supply box that is provided on a front side in the overall length direction of the vehicle, and is configured to turn on and off an electrical connection of the power storage unit to a load unit on the front side of the vehicle, and one of the rear power supply box and the front power supply box is configured to turn on and off an electrical connection of the first input unit to the power storage unit.

According to still another aspect of the present invention, in the power supply system, it is preferable that the power supply system further includes a second input unit configured to be connected to a second external charger having a charging voltage lower than a charging voltage of the first external charger and receive power supplied from the second external charger, wherein the other of the rear power supply box and the front power supply box is configured to turn on and off an electrical connection of the second input unit to the power storage unit.

According to still another aspect of the present invention, in the power supply system, it is preferable that the switching unit includes a voltage equalization switch that is provided between the positive electrode of the first battery and the positive electrode of the second battery, and is configured to turn on and off an electrical connection between the positive electrode of the first battery and the positive electrode of the second battery, and includes a resistor connected in parallel to the voltage equalization switch, and the controller is configured to, when equalizing voltages of the first battery and the second battery, turn off the voltage equalization switch to form a closed circuit that connects the positive electrode of the first battery to the positive electrode of the second battery through the resistor, so as to cause a current to flow from a higher-voltage side toward a lower-voltage side of the positive electrode of the first battery and the positive electrode of the second battery through the resistor.

According to still another aspect of the present invention, in the power supply system, it is preferable that the power supply system further includes shut-off switches that is capable of shutting off the first battery and the second battery, wherein the controller is configured to: control, if the first battery is abnormal, one of the shut-off switches to shut off the first battery, and supply power from the second battery to a load unit on a rear side of the vehicle and a load unit on a front side of the vehicle, or control, if the second battery is abnormal, another of the shut-off switches to shut off the second battery, and supply power from the first battery to the load unit on the rear side of the vehicle and the load unit on the front side of the vehicle.

According to still another aspect of the present invention, in the power supply system, it is preferable that the controller is configured to: control, when supplying power to a first load unit having a load voltage equal to the first voltage, the switching unit to form the parallel circuit, and supply the power from the first battery and the second battery to the first load unit, or control, when supplying power to a second load unit having a load voltage equal to the second voltage, the switching unit to form the series circuit, and supply the power from the first battery and the second battery to the second load unit.

According to still another aspect of the present invention, in the power supply system, it is preferable that the power supply system further includes a plurality of battery units each including the first battery, the second battery, the switching unit, the first input unit, and the controller, wherein the battery units are connected in series to one another, and in each of the battery units, the controller is configured to control, when the input voltage is the first voltage, the switching unit to form the parallel circuit, and charge the first battery and the second battery with the power supplied from the first external charger, or control, when the input voltage is the second voltage, the switching unit to form the series circuit, and charge the first battery and the second battery with the power supplied from the first external charger.

According to still another aspect of the present invention, in the power supply system, it is preferable that the switching unit includes a first constant current switch configured to regulate a current flowing from the first battery to the second battery when the parallel circuit is formed and a second constant current switch configured to regulate a current flowing from the second battery to the first battery when the parallel circuit is formed.

According to still another aspect of the present invention, in the power supply system, it is preferable that the controller is configured to control the switching unit to form the series circuit to supply power from the first battery and the second battery to a second load unit having a load voltage equal to the second voltage, and is configured to supply power from one of the first battery and the second battery to a first load unit having a load voltage equal to the first voltage.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a chart illustrating a list of on/off operations of relays according to the first embodiment;

FIG. 20 is a chart illustrating a list of on/off operations of relays according to the second embodiment;

FIG. 30 is a chart illustrating a list of on/off operations of relays according to the third embodiment;

FIG. 44 is a flowchart illustrating the operation example during the battery failure according to the fourth embodiment.

DETAILED DESCRIPTION OF THE PREFERRED EMBODIMENTS

The following describes modes (embodiments) for carrying out the present invention in detail with reference to the drawings. The present invention is not limited to the description of the embodiments to be given below. Components to be described below include those easily conceivable by those skilled in the art or those substantially identical thereto. Moreover, configurations to be described below can be combined as appropriate. Furthermore, the configurations can be variously omitted, replaced, or modified within the scope not deviating from the gist of the present invention.

First Embodiment

Figure 1:
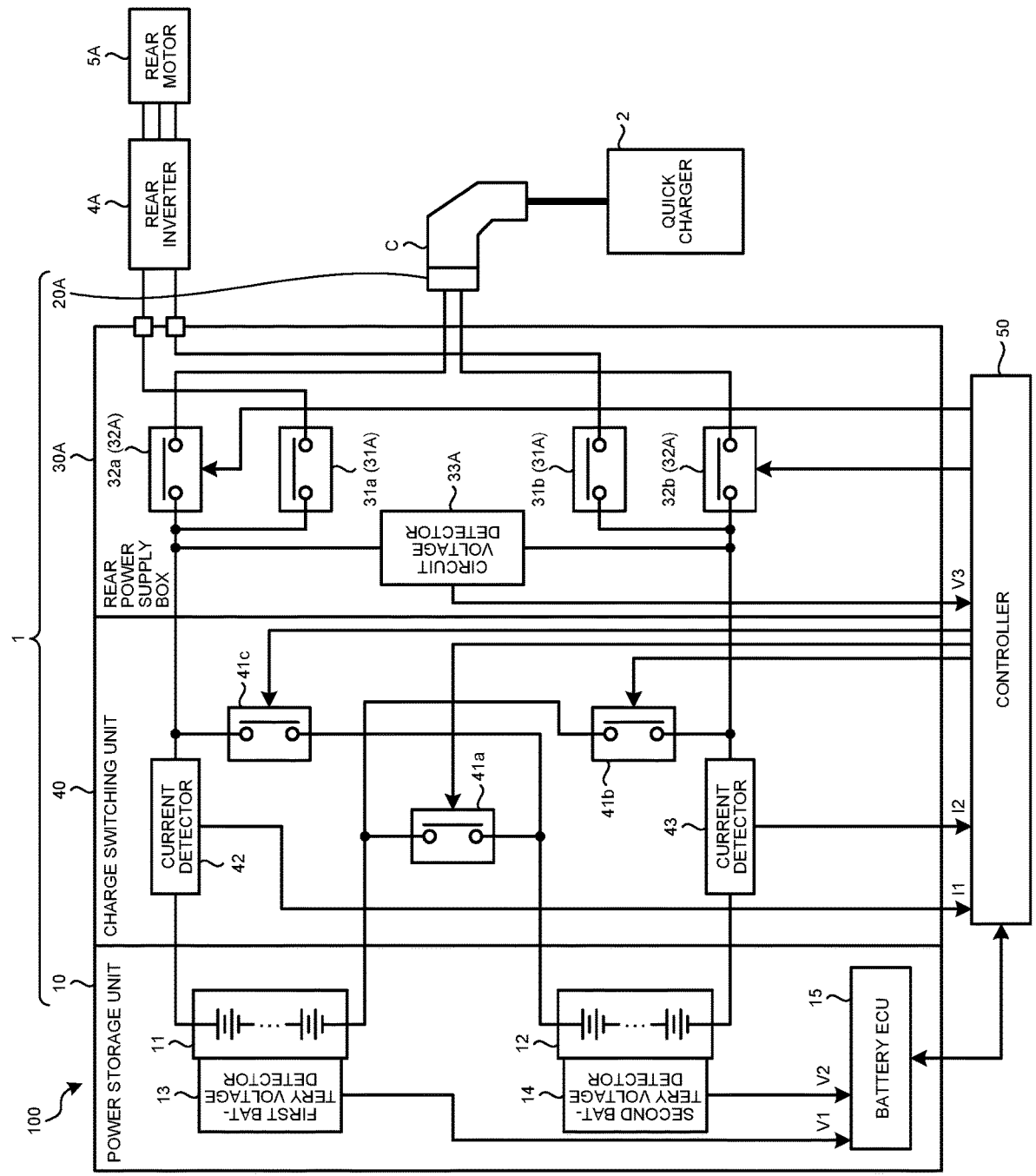
FIG. 1 is a circuit diagram illustrating a configuration example of a power supply system according to a first embodiment of the present invention.
Figure 2:
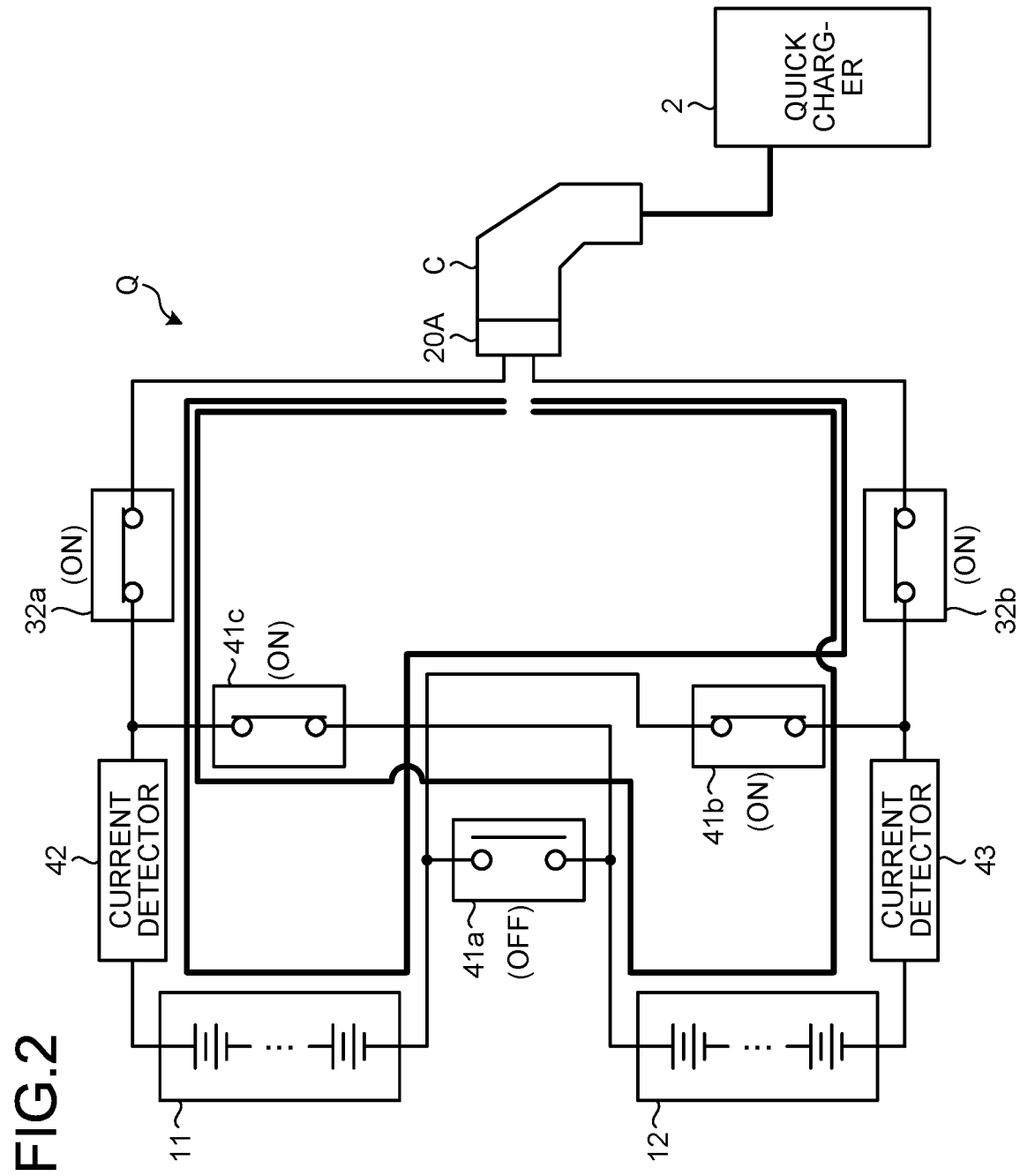
FIG. 2 is a circuit diagram illustrating an operation example of the power supply system according to the first embodiment during quick charging.
Figure 3:
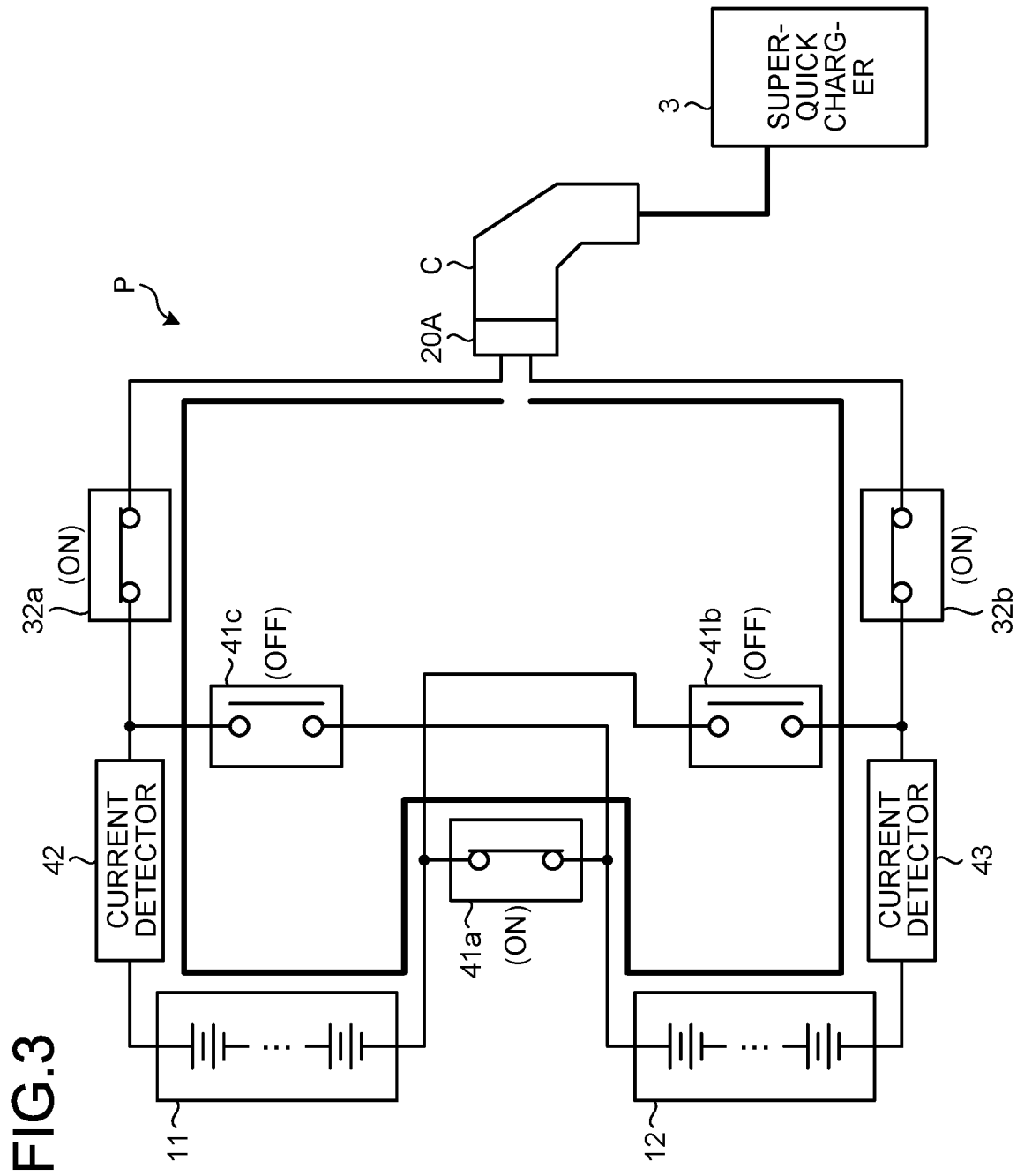
FIG. 3 is a circuit diagram illustrating an operation example of the power supply system according to the first embodiment during super-quick charging.

A power supply system 1 according to a first embodiment of the present invention will be described with reference to the drawings. FIG. 1 is a circuit diagram illustrating a configuration example of the power supply system 1 according to the first embodiment. FIG. 2 is a circuit diagram illustrating an operation example of the power supply system 1 according to the first embodiment during quick charging. FIG. 3 is a circuit diagram illustrating an operation example of the power supply system 1 according to the first embodiment during super-quick charging. FIG. 4 is a chart illustrating a list of on/off operations of relays according to the first embodiment.

The power supply system 1 is mounted on a vehicle 100, and supplies power to a load unit. The power supply system 1 is mounted on an electrically driven vehicle, such as an electric vehicle (EV), a hybrid-electric vehicle (HEV), or a plug-in hybrid electric vehicle (PHEV). The power supply system 1 is charged with power supplied by an external charger, and supplies the power obtained by the charging to the load unit. The power supply system 1 is charged with the power supplied by, for example, a quick charger 2 or a super-quick charger 3 serving as the external charger, and supplies the power obtained by the charging to a rear motor 5A through a rear inverter 4A serving as the load unit. The quick charger 2 has an output voltage of, for example, approximately 400 V. The super-quick charger 3 has an output voltage higher than an output voltage of the quick charger 2, the output voltage being, for example, approximately 800 V. The quick charger 2 and/or the super-quick charger 3 are/is installed, for example, at a charging station for the vehicle 100, where a connector C is attached to a direct-current (DC) charging port 20A to supply the power to the power supply system 1. The following describes the power supply system 1 in detail.

The power supply system 1 includes a power storage unit 10, the DC charging port 20A serving as a first input unit, a rear power supply box 30A, a charge switching unit 40 serving as a switching unit, and a controller 50. The power storage unit 10 stores therein the power, and includes a first high-voltage battery 11 serving as a first battery, a second high-voltage battery 12 serving as a second battery, a first battery voltage detector 13, a second battery voltage detector 14, and a battery electronic control unit (ECU) 15.

The first high-voltage battery 11 is a storage battery that is mounted on the vehicle 100 and is capable of storing therein the power. The first high-voltage battery 11 includes a plurality of battery cells. Each of the battery cells is constituted by a chargeable and dischargeable secondary cell, for example, by a lithium-ion battery. The battery cells are arranged side by side, and are connected in series to battery cells located adjacent thereto.

The second high-voltage battery 12 is a storage battery that is mounted on the vehicle 100 and is capable of storing therein the power. The second high-voltage battery 12 includes a plurality of battery cells. Each of the battery cells is constituted by a chargeable and dischargeable secondary cell, for example, by a lithium-ion battery. The battery cells are arranged side by side, and are connected in series to battery cells located adjacent thereto. The second high-voltage battery 12 has the same capacity as that of the first high-voltage battery 11.

The first battery voltage detector 13 detects a voltage of the first high-voltage battery 11. The first battery voltage detector 13 is a voltage detector different from a circuit voltage detector 33A (to be described later) of the rear power supply box 30A. The first battery voltage detector 13 is connected in parallel to the first high-voltage battery 11, and detects the voltage between a positive electrode and a negative electrode of the first high-voltage battery 11. The first battery voltage detector 13 is connected to the battery ECU 15, and outputs a detection voltage V1 serving as the detected voltage to the battery ECU 15.

The second battery voltage detector 14 detects a voltage of the second high-voltage battery 12. The second battery voltage detector 14 is a voltage detector different from the circuit voltage detector 33A of the rear power supply box 30A. The second battery voltage detector 14 is connected in parallel to the second high-voltage battery 12, and detects the voltage between a positive electrode and a negative electrode of the second high-voltage battery 12. The second battery voltage detector 14 is connected to the battery ECU 15, and outputs a detection voltage V2 serving as the detected voltage to the battery ECU 15.

The battery ECU 15 monitors the first high-voltage battery 11 and the second high-voltage battery 12. The battery ECU 15 and the first and second battery voltage detectors 13 and 14 are what are called cell voltage sensors (CVS's) and a battery management system (BMS). The battery ECU 15 is connected to the first battery voltage detector 13, and the detection voltage V1 is output from the first battery voltage detector 13 to the battery ECU 15. The battery ECU 15 is also connected to the second battery voltage detector 14, and the detection voltage V2 is output from the second battery voltage detector 14 to the battery ECU 15. The battery ECU 15 controls the first high-voltage battery 11 and the second high-voltage battery 12 based on the detection voltages V1 and V2. The battery ECU 15 performs the control, for example, so as to equalize amounts of charge of the first high-voltage battery 11 and the second high-voltage battery 12 to each other based on the detection voltages V1 and V2. The battery ECU 15 is connected to the controller 50, and outputs the detection voltages V1 and V2 to the controller 50.

The DC charging port 20A is what is called a DC inlet, to which the connector C of the quick charger 2 or the super-quick charger 3 is connected. The DC charging port 20A is connected to the rear power supply box 30A, and outputs the power supplied from the quick charger 2 or the super-quick charger 3 to the rear power supply box 30A.

The rear power supply box 30A is provided on a rear side in an overall length direction of the vehicle 100, and turns on and off an electrical connection of the power storage unit 10 to the rear inverter 4A and the rear motor 5A on the rear side of the vehicle 100. The rear power supply box 30A also turns on and off an electrical connection of the power storage unit 10 to the DC charging port 20A. The rear power supply box 30A includes a load power switching unit 31A, a main switching unit 32A, and the circuit voltage detector 33A.

The load power switching unit 31A switches the power supplied from the power storage unit 10 to the load unit. The load power switching unit 31A includes a load relay 31a and a load relay 31b. The load relays 31a and 31b conduct or shut off currents. The load relay 31a is provided between the positive electrode of the first high-voltage battery 11 or the positive electrode of the second high-voltage battery 12 and a positive electrode of the rear inverter 4A. The load relay 31a conducts or shuts off a current that flows from the positive electrode of the first high-voltage battery 11 or the positive electrode of the second high-voltage battery 12 to the rear inverter 4A. The load relay 31b is provided between the negative electrode of the first high-voltage battery 11 or the negative electrode of the second high-voltage battery 12 and a negative electrode of the rear inverter 4A. The load relay 31b conducts or shuts off a current that flows from the rear inverter 4A to the negative electrode of the first high-voltage battery 11 or the negative electrode of the second high-voltage battery 12.

The main switching unit 32A switches the power supplied from the DC charging port 20A to the power storage unit 10. The main switching unit 32A includes an upstream-side main relay 32a and a downstream-side main relay 32b. The upstream-side and downstream-side main relays 32a and 32b conduct or shut off currents. The upstream-side main relay 32a is provided between a positive electrode of the DC charging port 20A and the positive electrode of the first high-voltage battery 11. The upstream-side main relay 32a conducts or shuts off a current that flows from the DC charging port 20A to the first high-voltage battery 11. The upstream-side main relay 32a is located between the positive electrode of the DC charging port 20A and the positive electrode of the second high-voltage battery 12. The upstream-side main relay 32a conducts or shuts off a current that flows from the DC charging port 20A to the second high-voltage battery 12.

The downstream-side main relay 32b is provided between a negative electrode of the first high-voltage battery 11 and a negative electrode of the DC charging port 20A. The downstream-side main relay 32b conducts or shuts off a current that flows from the negative electrode of the first high-voltage battery 11 to the DC charging port 20A. The downstream-side main relay 32b is located between the negative electrode of the second high-voltage battery 12 and the negative electrode of the DC charging port 20A. The downstream-side main relay 32b conducts or shuts off a current that flows from the negative electrode of the second high-voltage battery 12 to the DC charging port 20A.

The circuit voltage detector 33A detects voltages of a series circuit P and a parallel circuit Q. The circuit voltage detector 33A is connected in parallel to the first high-voltage battery 11 and the second high-voltage battery 12 constituting the series circuit P, and detects a voltage applied to the series circuit P by the first high-voltage battery 11 and the second high-voltage battery 12. The circuit voltage detector 33A is connected to the controller 50, and outputs a detected detection voltage V3 of the first high-voltage battery 11 and the second high-voltage battery 12 to the controller 50.

The circuit voltage detector 33A is connected in parallel to the first high-voltage battery 11, and detects a voltage applied to the parallel circuit Q by the first high-voltage battery 11. The circuit voltage detector 33A outputs the detected detection voltage V3 of the first high-voltage battery 11 to the controller 50.

The circuit voltage detector 33A is connected in parallel to the second high-voltage battery 12, and detects a voltage applied to the parallel circuit Q by the second high-voltage battery 12. The circuit voltage detector 33A outputs the detected detection voltage V3 of the second high-voltage battery 12 to the controller 50.

The charge switching unit 40 switches a connection circuit of the first and second high-voltage batteries 11 and 12. The charge switching unit 40 switches the connection circuit, for example, into the series circuit P (refer to FIG. 3) that connects the first high-voltage battery 11 to the second high-voltage battery 12 in series, or into the parallel circuit Q (refer to FIG. 2) that connects the first high-voltage battery 11 to the second high-voltage battery 12 in parallel.

The charge switching unit 40 includes a charging relay 41a, a charging relay 41b, a charging relay 41c, and current detectors 42 and 43. The charging relays 41a to 41c conduct or shut off currents. The charging relay 41a forms the series circuit P, and is provided between the positive electrode of the second high-voltage battery 12 and the negative electrode of the first high-voltage battery 11. The charging relay 41a conducts or shuts off a current that flows from the second high-voltage battery 12 to the first high-voltage battery 11. The charging relay 41a preferably serves also as a service plug for ensuring electrical safety, and is preferably physically detachable.

As illustrated in FIG. 3, the series circuit P is a circuit that connects the first high-voltage battery 11 to the second high-voltage battery 12 in series. In the series circuit P, for example, the positive electrode of the DC charging port 20A is connected to the positive electrode of the first high-voltage battery 11; the negative electrode of the first high-voltage battery 11 is connected to the positive electrode of the second high-voltage battery 12 through the charging relay 41a; and the negative electrode of the second high-voltage battery 12 is connected to the negative electrode of the DC charging port 20A. In the series circuit P, the upstream-side main relay 32a is provided between the positive electrode of the DC charging port 20A and the positive electrode of the first high-voltage battery 11, and the downstream-side main relay 32b is provided between the negative electrode of the second high-voltage battery 12 and the negative electrode of the DC charging port 20A.

The charging relay 41b forms the parallel circuit Q, and is provided between the negative electrode of the first high-voltage battery 11 and the negative electrode of the DC charging port 20A. The charging relay 41b conducts or shuts off a current that flows from the negative electrode of the first high-voltage battery 11 to the negative electrode of the DC charging port 20A.

The charging relay 41c forms the parallel circuit Q, and is provided between the positive electrode of the DC charging port 20A and the positive electrode of the second high-voltage battery 12. The charging relay 41c conducts or shuts off a current that flows from the positive electrode of the DC charging port 20A to the positive electrode of the second high-voltage battery 12.

As illustrated in FIG. 2, the parallel circuit Q is a circuit that connects the first high-voltage battery 11 to the second high-voltage battery 12 in parallel. The parallel circuit Q forms, for example, a first closed circuit that connects the positive electrode of the DC charging port 20A to the positive electrode of the first high-voltage battery 11, and connects the negative electrode of the first high-voltage battery 11 to the negative electrode of the DC charging port 20A through the charging relay 41b, and a second closed circuit that connects the positive electrode of the DC charging port 20A to the positive electrode of the second high-voltage battery 12 through the charging relay 41c, and connects the negative electrode of the second high-voltage battery 12 to the negative electrode of the DC charging port 20A.

The current detector 42 detects a current. The current detector 42 is provided between the positive electrode of the DC charging port 20A and the positive electrode of the first high-voltage battery 11, and detects the current flowing from the DC charging port 20A to the first high-voltage battery 11. The current detector 42 detects the current flowing from the DC charging port 20A to the first high-voltage battery 11, for example, in each of the series circuit P and the parallel circuit Q. The current detector 42 is connected to the controller 50, and outputs a detected detection current I1 to the controller 50.

The current detector 43 detects a current. The current detector 43 is provided between the negative electrode of the second high-voltage battery 12 and the negative electrode of the DC charging port 20A, and detects the current flowing from the second high-voltage battery 12 to the DC charging port 20A. The current detector 43 detects the current flowing from the second high-voltage battery 12 to the DC charging port 20A, for example, in each of the series circuit P and the parallel circuit Q. The current detector 43 is connected to the controller 50, and outputs a detected detection current I2 to the controller 50. In the series circuit P, the current detectors 42 and 43 detect the detection currents I1 and I2, respectively, and accordingly, when either one thereof fails, the other thereof can detect the current.

The controller 50 controls the rear power supply box 30A and the charge switching unit 40. For example, when supplying the power to the rear inverter 4A in a case of discharging, the controller 50 forms the parallel circuit Q by turning on the charging relays 41b and 41c and turning off the charging relay 41a. The controller 50 turns on the load relays 31a and 31b to electrically connect the power storage unit 10 to the rear inverter 4A through the parallel circuit Q so as to supply the power from the power storage unit 10 to the rear inverter 4A. The controller 50 forms the series circuit P by turning on the charging relay 41a and turning off the charging relays 41b and 41c. The controller 50 turns on the load relays 31a and 31b to electrically connect the power storage unit 10 to the rear inverter 4A through the series circuit P so as to supply the power from the power storage unit 10 to the rear inverter 4A.

For example, when the connector C of the quick charger 2 has been connected to the DC charging port 20A in the case of the charging, the controller 50 controls the charge switching unit 40 to form the parallel circuit Q. For example, as illustrated in FIG. 2, the controller 50 forms the parallel circuit Q by turning on the charging relays 41b and 41c and turning off the charging relay 41a. The controller 50 turns on the upstream-side main relay 32a and the downstream-side main relay 32b to electrically connect the parallel circuit Q of the charge switching unit 40 to the DC charging port 20A so as to charge the first high-voltage battery 11 and the second high-voltage battery 12 with the power supplied from the quick charger 2. FIG. 4 illustrates on/off relations among the charging relays 41a, 41b, and 41c, the upstream-side main relay 32a, and the downstream-side main relay 32b during the quick charging.

When the connector C of the super-quick charger 3 has been connected to the DC charging port 20A in the case of the charging, the controller 50 controls the charge switching unit 40 to form the series circuit P. For example, as illustrated in FIG. 3, the controller 50 forms the series circuit P by turning on the charging relay 41a and turning off the charging relays 41b and 41c. The controller 50 turns on the upstream-side main relay 32a and the downstream-side main relay 32b to electrically connect the series circuit P of the charge switching unit 40 to the DC charging port 20A so as to charge the first high-voltage battery 11 and the second high-voltage battery 12 with the power supplied from the super-quick charger 3. FIG. 4 illustrates the on/off relations among the charging relays 41a, 41b, and 41c, the upstream-side main relay 32a, and the downstream-side main relay 32b during the super-quick charging.

For example, when the connector C of the quick charger 2 has been connected to the DC charging port 20A, the controller 50 acquires voltage information indicating an input voltage (for example, approximately 400 V) received from the quick charger 2 through the DC charging port 20A, and based on the acquired voltage information, controls the charge switching unit 40 so as to form the parallel circuit Q. When the connector C of the super-quick charger 3 is connected to the DC charging port 20A, the controller 50 acquires the voltage information indicating the input voltage (for example, approximately 800 V) received from the super-quick charger 3 through the DC charging port 20A, and based on the acquired voltage information, controls the charge switching unit 40 so as to form the series circuit P.

For example, when the connector C of the quick charger 2 has been connected to the DC charging port 20A, the controller 50 may control the charge switching unit 40 based on the result of detection of the voltage of the power supplied from the quick charger 2 by the circuit voltage detector 33A. In this case, the controller 50 turns off all the charging relays 41a to 41c, and turns on the upstream-side main relay 32a and the downstream-side main relay 32b to cause the circuit voltage detector 33A to detect the voltage of the power supplied from the quick charger 2.

Figure 5:
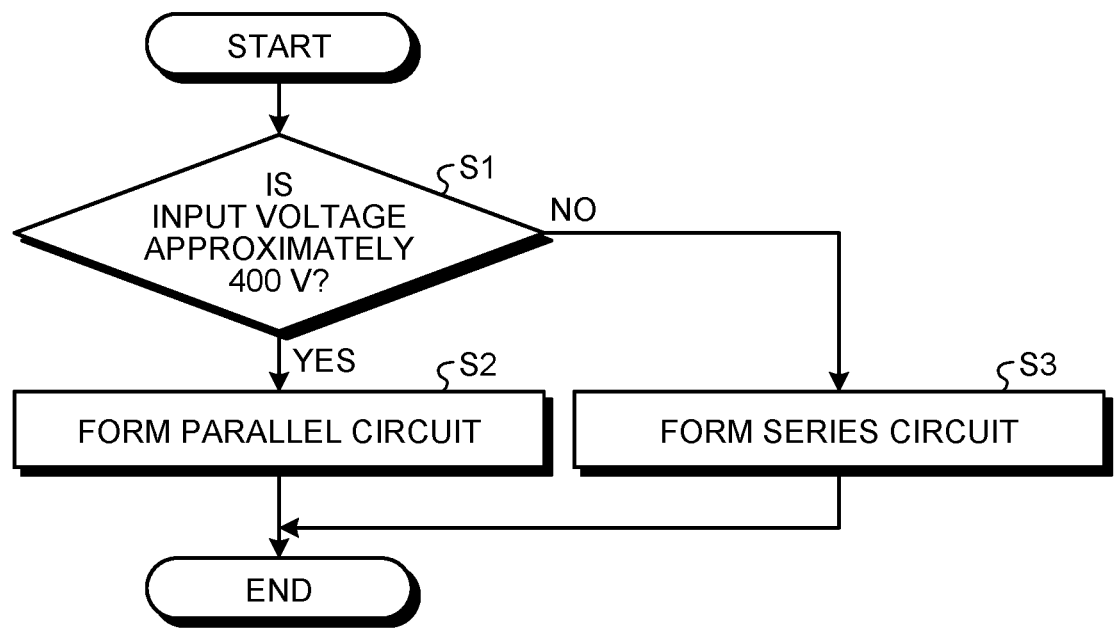
FIG. 5 is a flowchart illustrating an operation example of the power supply system according to the first embodiment.

The following describes an operation example of the power supply system 1 with reference to FIG. 5. FIG. 5 is a flowchart illustrating the operation example of the power supply system 1 according to the first embodiment. In the power supply system 1, the controller 50 determines whether the input voltage is approximately 400 V (Step S1). If the input voltage is approximately 400 V (first voltage) (Yes at Step S1), the controller 50 controls the charge switching unit 40 to form the parallel circuit Q (Step S2). The controller 50 forms the parallel circuit Q, for example, by turning on the charging relays 41b and 41c and turning off the charging relay 41a. The controller 50 charges the first high-voltage battery 11 and the second high-voltage battery 12 with the power supplied from the quick charger 2, and ends the charging processing.

If, in contrast, the input voltage is not approximately 400 V, but approximately 800 V (second voltage) that is higher than approximately 400 V (No at Step S1), the controller 50 controls the charge switching unit 40 to form the series circuit P (Step S3). The controller 50 forms the series circuit P, for example, by turning on the charging relay 41a and turning off the charging relays 41b and 41c. The controller 50 charges the first high-voltage battery 11 and the second high-voltage battery 12 with the power supplied from the super-quick charger 3, and ends the charging processing.

Figure 6:
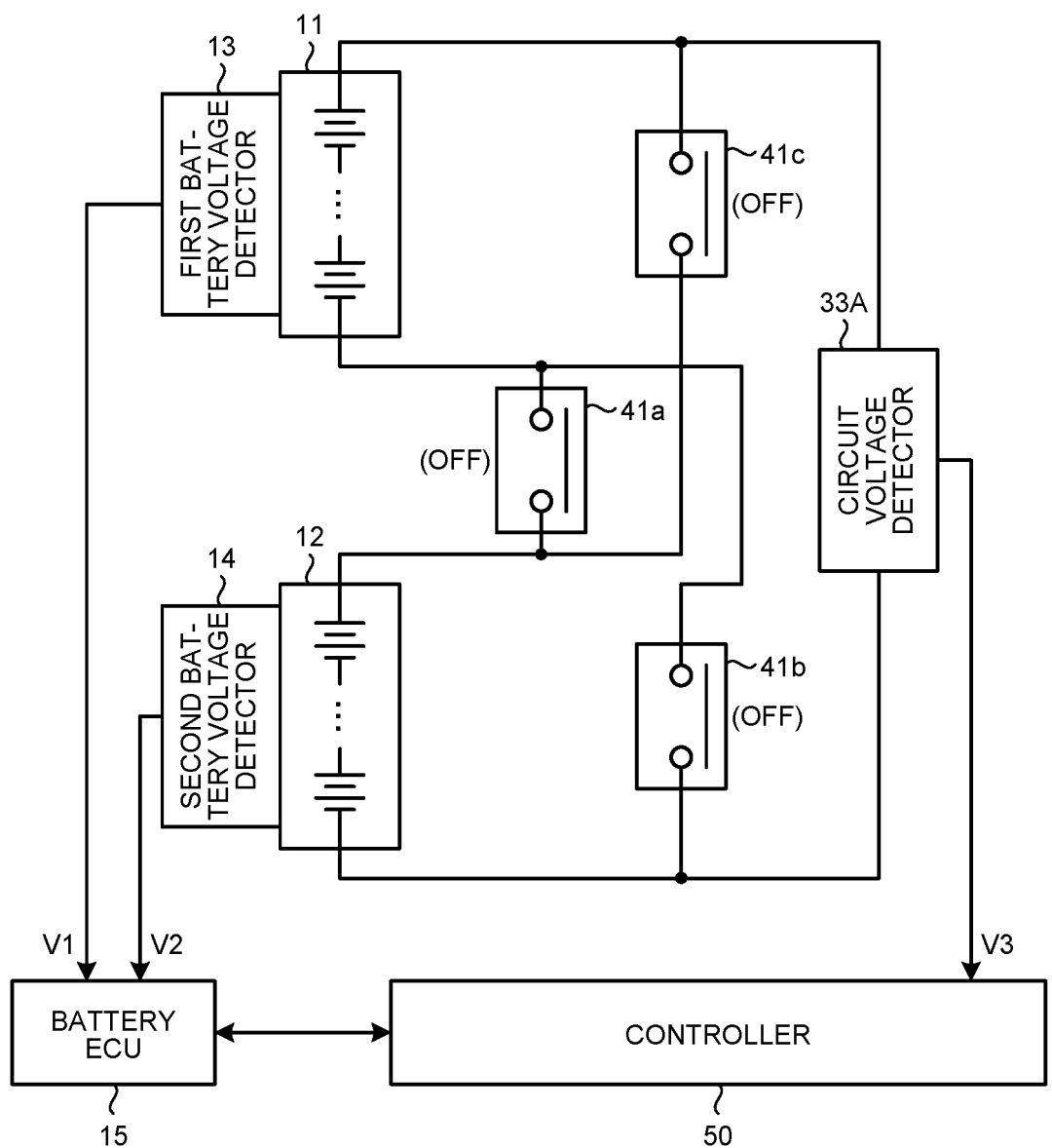
FIG. 6 is a circuit diagram illustrating a detection example of an on-lock failure of charging relays according to the first embodiment.
Figure 7:
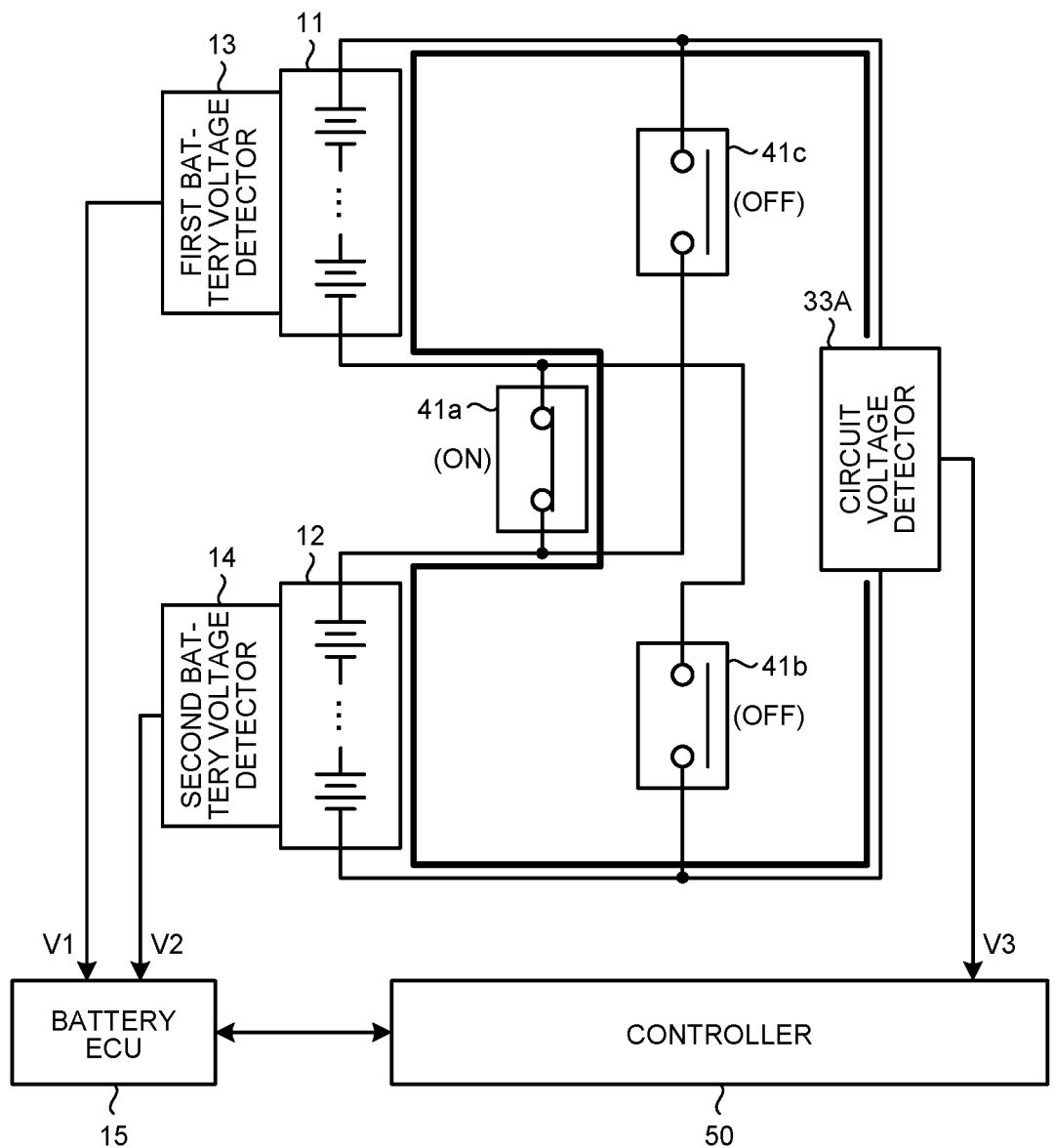
FIG. 7 is a circuit diagram illustrating a detection example of an off-lock failure of one of the charging relays according to the first embodiment.
Figure 8:
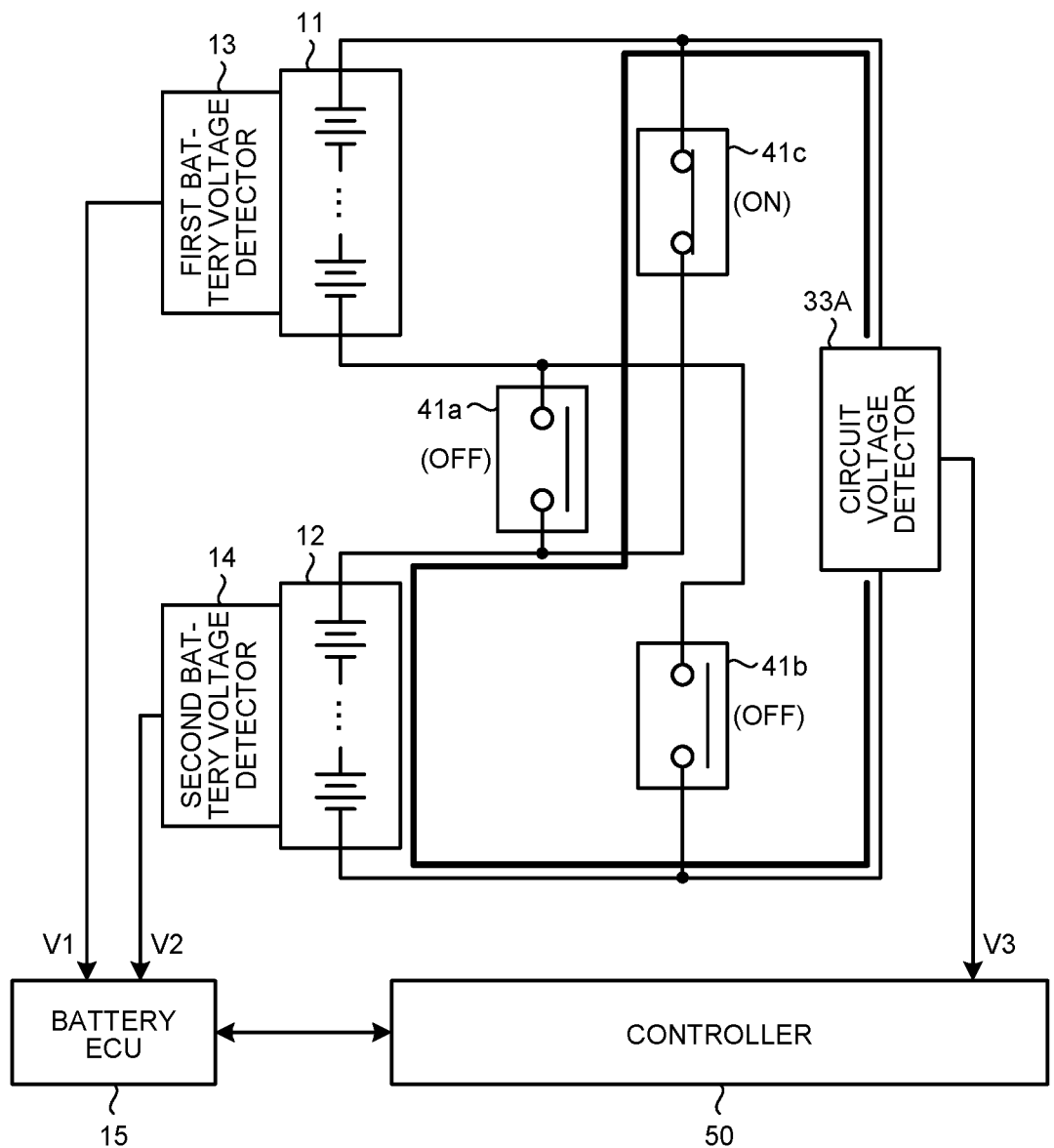
FIG. 8 is a circuit diagram illustrating a detection example of the off-lock failure of another of the charging relays according to the first embodiment.
Figure 9:
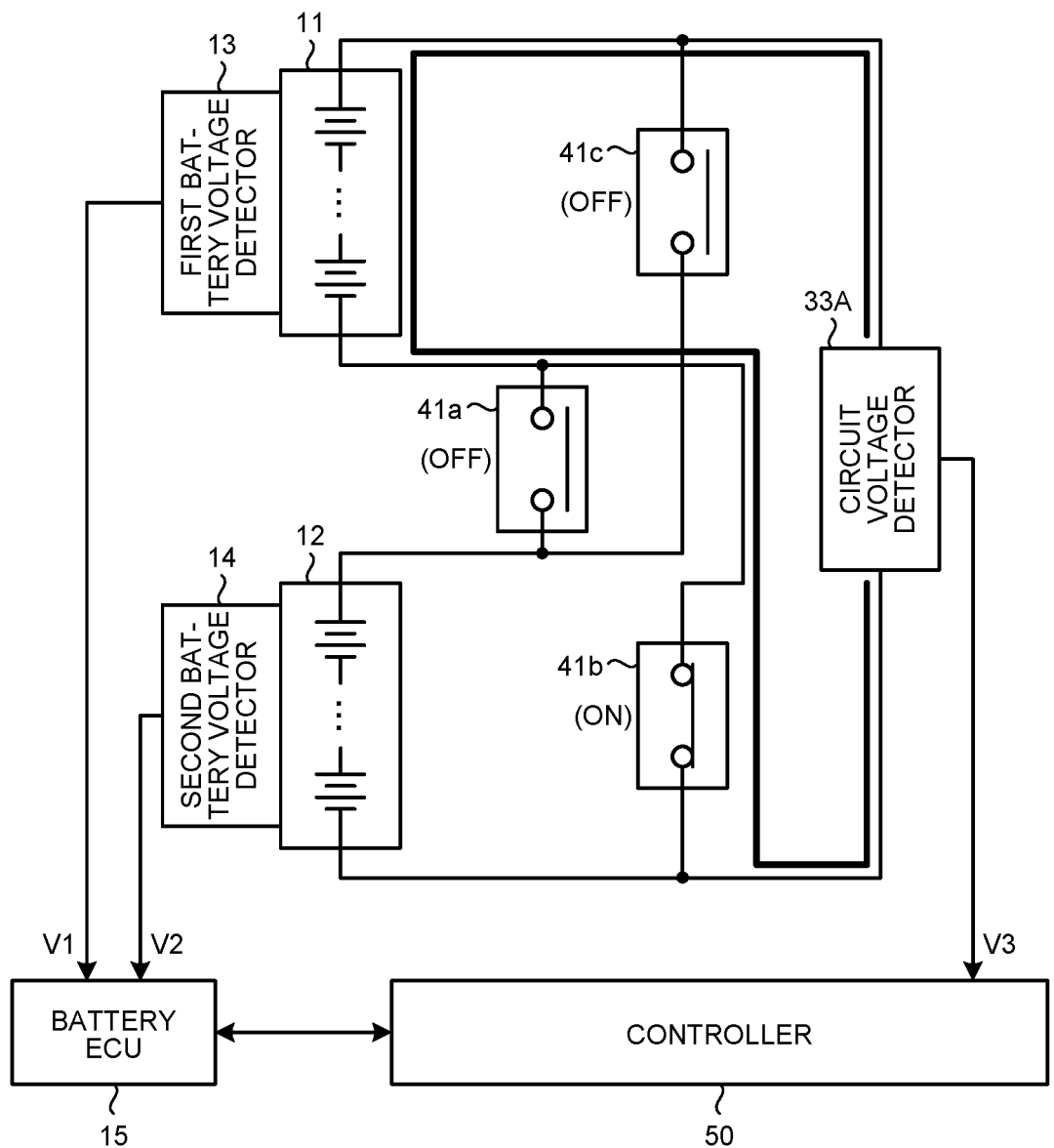
FIG. 9 is a circuit diagram illustrating a detection example of the off-lock failure of still another of the charging relays according to the first embodiment.
Figure 10:
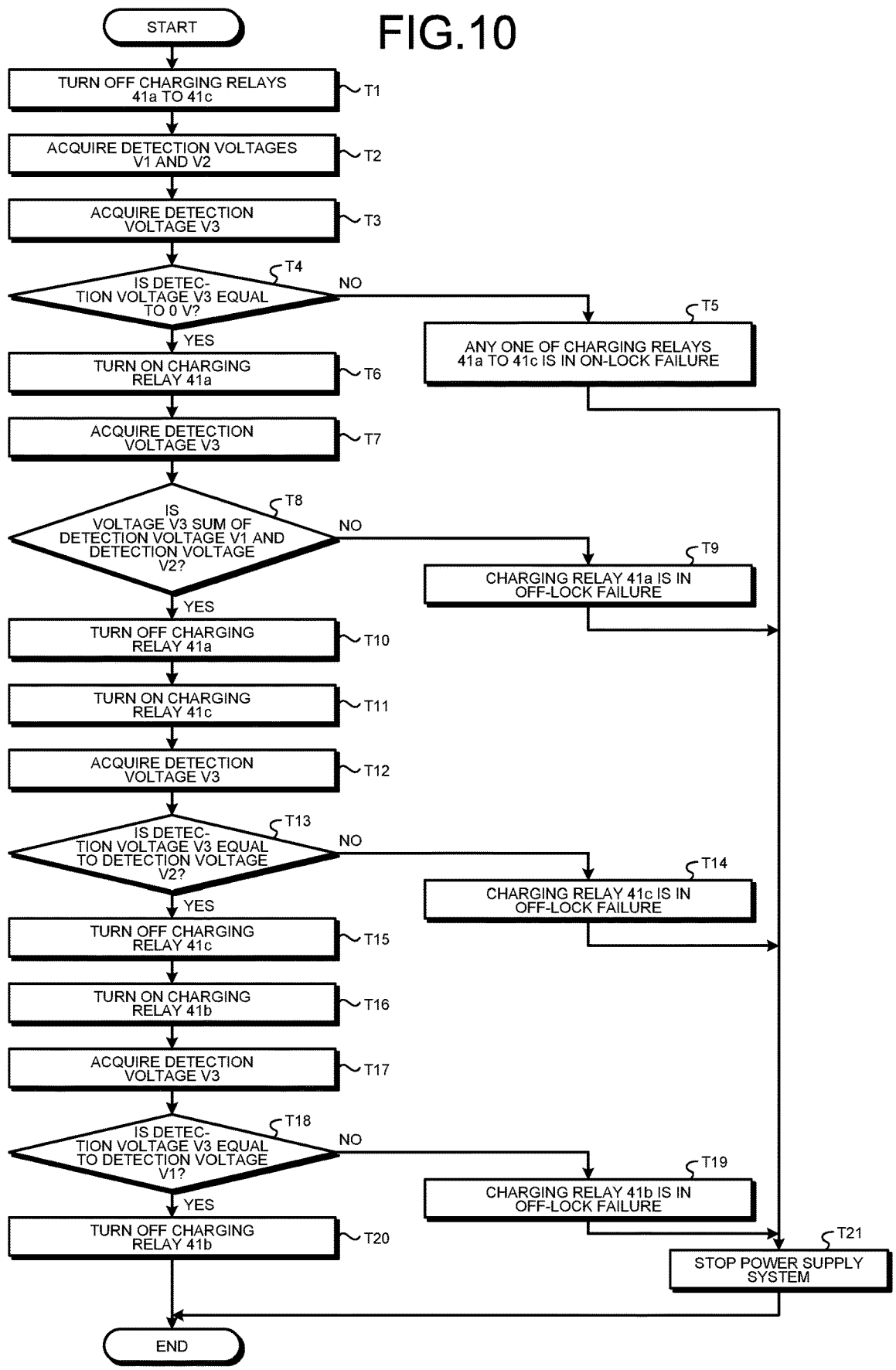
FIG. 10 is a flowchart illustrating the detection examples of the failures of the charging relays according to the first embodiment.

The following describes failure detection of the charging relays 41a to 41c. FIG. 6 is a circuit diagram illustrating a detection example of an on-lock failure of the charging relays 41a to 41c according to the first embodiment. FIG. 7 is a circuit diagram illustrating a detection example of an off-lock failure of the charging relay 41a according to the first embodiment. FIG. 8 is a circuit diagram illustrating a detection example of the off-lock failure of the charging relay 41c according to the first embodiment. FIG. 9 is a circuit diagram illustrating a detection example of the off-lock failure of the charging relay 41b according to the first embodiment. FIG. 10 is a flowchart illustrating the detection examples of the failures of the charging relays 41a to 41c according to the first embodiment.

After the quick charger 2 or the super-quick charger 3 is connected to the DC charging port 20A and before the power is supplied from the quick charger 2 or the super-quick charger 3 to the DC charging port 20A, the controller 50 detects (diagnoses) whether any one of the charging relays 41a to 41c has failed. The controller 50 starts the failure detection of the charging relays 41a to 41c, for example, immediately after detecting that the connector C of the quick charger 2 or the super-quick charger 3 has been connected to the DC charging port 20A.

For example, in the case of performing the failure detection of the charging relays 41a to 41c, the controller 50 performs the failure detection in a state in which the upstream-side main relay 32a and the downstream-side main relay 32b are turned off, and the electrical connection between the rear power supply box 30A and the DC charging port 20A is shut off. As illustrated in FIGS. 6 and 10, when the detection example of the on-lock failure of the charging relays 41a to 41c is performed, the charging relays 41a to 41c are all turned off (Step T1). The on-lock failure refers to a failure in which any one of the charging relays 41a to 41c is fixed to be on and not switchable to be off. The controller 50 acquires the detection voltage V1 of the first high-voltage battery 11 from the first battery voltage detector 13, and acquires the detection voltage V2 of the second high-voltage battery 12 from the second battery voltage detector 14 (Step T2). The controller 50 then acquires the detection voltage V3 from the circuit voltage detector 33A (Step T3).

Then, the controller 50 determines whether the detection voltage V3 is 0 V (Step T4). If the detection voltage V3 is not 0 V (No at Step T4), the controller 50 determines that any one of the charging relays 41a to 41c is in the on-lock failure (Step T5). In other words, the controller 50 determines that at least one of the charging relays 41a to 41c is in the on-lock failure if the circuit voltage detector 33A has detected a voltage although the charging relays 41a to 41c are all off.

For example, when the detection voltage V1 of the first high-voltage battery 11 differs from the detection voltage V2 of the second high-voltage battery 12, if the detection voltage V3 is equal to the detection voltage V1 of the first high-voltage battery 11, the controller 50 determines that the charging relay 41b constituting the parallel circuit Q including the first high-voltage battery 11 is in the on-lock failure. When the detection voltage V1 of the first high-voltage battery 11 differs from the detection voltage V2 of the second high-voltage battery 12, if the detection voltage V3 is equal to the detection voltage V2 of the second high-voltage battery 12, the controller 50 determines that the charging relay 41c constituting the parallel circuit Q including the second high-voltage battery 12 is in the on-lock failure. If the detection voltage V3 is equal to the total voltage of the detection voltage V1 of the first high-voltage battery 11 and the detection voltage V2 of the second high-voltage battery 12, the controller 50 determines that the charging relay 41a constituting the series circuit P is in the on-lock failure. If any one of the charging relays 41a to 41c is in the on-lock failure, the controller 50 stops the power supply system 1 (Step T21). The controller 50 shuts off a circuit of the power supply system 1, for example, by turning off all the relays of the load power switching unit 31A, the main switching unit 32A, and the charge switching unit 40, and notifies an external ECU of a failed portion and a failure state.

If the detection voltage V3 is 0 V (Yes at Step T4), the controller 50 determines that the charging relays 41a to 41c are not in the on-lock failure, and detects whether the charging relay 41a has failed, based on the detection voltage V3 of the first high-voltage battery 11 and the second high-voltage battery 12. For example, as illustrated in FIG. 7, the controller 50 turns on the charging relay 41a to form the series circuit P (Step T6), and acquires the detection voltage V3 from the circuit voltage detector 33A (Step T7). FIG. 4 illustrates the on/off relations among the relays when the failure detection of the charging relay 41a is performed. The controller 50 determined whether the detection voltage V3 is equal to the total voltage of the detection voltage V1 and the detection voltage V2 (Step T8). If the detection voltage V3 is not equal to the total voltage of the detection voltage V1 and the detection voltage V2 (No at Step T8), the controller 50 determines that the charging relay 41a constituting the series circuit P is in the off-lock failure (Step T9). The off-lock failure refers to a failure in which, for example, any one of the charging relays 41a to 41c is fixed to be off and not switchable to be on. If the charging relay 41a is in the off-lock failure, the controller 50 stops the power supply system 1 (Step T21).

If the detection voltage V3 is equal to the total voltage of the detection voltage V1 and the detection voltage V2 (Yes at Step T8), the controller 50 determines that the charging relay 41a is not in the off-lock failure. The controller 50 detects whether the charging relay 41c has failed, based on the detection voltage V2 of the second high-voltage battery 12 detected by the second battery voltage detector 14 and the detection voltage V3 of the second high-voltage battery 12 detected by the circuit voltage detector 33A. For example, the controller 50 turns off the charging relay 41a (Step T10), and turns on the charging relay 41c (Step T11). FIG. 4 illustrates the on/off relations among the relays when the failure detection of the charging relay 41c is performed. The controller 50 acquires the detection voltage V3 from the circuit voltage detector 33A (Step T12), and determines whether the acquired detection voltage V3 is equal to the detection voltage V2 of the second high-voltage battery 12 (Step T13). If the detection voltage V3 is not equal to the detection voltage V2 of the second high-voltage battery 12 (No at Step T13), the controller 50 determines that the charging relay 41c constituting the parallel circuit Q including the second high-voltage battery 12 is in the off-lock failure (Step T14). If the charging relay 41c is in the off-lock failure, the controller 50 stops the power supply system 1 (Step T21).

If the detection voltage V3 is equal to the detection voltage V2 of the second high-voltage battery 12 (Yes at Step T13), the controller 50 determines that the charging relay 41c is not in the off-lock failure. The controller 50 detects whether the charging relay 41b has failed, based on the detection voltage V1 of the first high-voltage battery 11 detected by the first battery voltage detector 13 and the detection voltage V3 of the first high-voltage battery 11 detected by the circuit voltage detector 33A. For example, the controller 50 turns off the charging relay 41c (Step T15), and turns on the charging relay 41b (Step T16). FIG. 4 illustrates the on/off relations among the relays when the failure detection of the charging relay 41b is performed. The controller 50 acquires the detection voltage V3 from the circuit voltage detector 33A (Step T17), and determines whether the acquired detection voltage V3 is equal to the detection voltage V1 of the first high-voltage battery 11 (Step T18). If the detection voltage V3 is not equal to the detection voltage V1 of the first high-voltage battery 11 (No at Step T18), the controller 50 determines that the charging relay 41b constituting the parallel circuit Q including the first high-voltage battery 11 is in the off-lock failure (Step T19). If the charging relay 41b is in the off-lock failure, the controller 50 stops the power supply system 1 (Step T21). If the detection voltage V3 is equal to the detection voltage V1 of the first high-voltage battery 11 (Yes at Step T18), the controller 50 determines that the charging relay 41b is not in the off-lock failure. The controller 50 turns off the charging relay 41b (Step T20), and ends the failure detection.

As described above, the power supply system 1 according to the first embodiment includes the first high-voltage battery 11, the second high-voltage battery 12, the charge switching unit 40, the DC charging port 20A, and the controller 50. The first high-voltage battery 11 is the battery that is mounted on the vehicle 100 and is capable of storing the power. The second high-voltage battery 12 is the battery that is mounted on the vehicle 100 and is capable of storing therein the power. The charge switching unit 40 is the relays switchable between the series circuit P that connects the first high-voltage battery 11 to the second high-voltage battery 12 in series and the parallel circuit Q that connects the first high-voltage battery 11 to the second high-voltage battery 12 in parallel. The DC charging port 20A is connected to the quick charger 2 or the super-quick charger 3, and receives the power supplied from the quick charger 2 or the super-quick charger 3. The controller 50 controls the charge switching unit 40 based on the input voltage of the power received from the DC charging port 20A. If the input voltage is the first voltage (for example, approximately 400 V), the controller 50 controls the charge switching unit 40 to form the parallel circuit Q, and charges the first high-voltage battery 11 and the second high-voltage battery 12 with the power supplied from the quick charger 2. If the input voltage is the second voltage (for example, approximately 800 V)

higher than the first voltage (for example, approximately 400 V), the controller 50 controls the charge switching unit 40 to form the series circuit P, and charges the first high-voltage battery 11 and the second high-voltage battery 12 with the power supplied from the super-quick charger 3.

With this configuration, the power supply system 1 forms the parallel circuit Q or the series circuit P according to the input voltage received by the DC charging port 20A, and accordingly can appropriately charge the first high-voltage battery 11 and the second high-voltage battery 12 even if the input voltage varies. As a result, the power supply system 1 can accept a plurality of types of external chargers, such as the quick charger 2 and the super-quick charger 3, having different voltages, and therefore, can be improved in versatility.

In the above-described power supply system 1, the charge switching unit 40 includes the charging relay 41a that forms the series circuit P, the charging relay 41b that forms the parallel circuit Q, and the charging relay 41c that forms the parallel circuit Q. In the series circuit P, the positive electrode of the DC charging port 20A is connected to the positive electrode of the first high-voltage battery 11; the negative electrode of the first high-voltage battery 11 is connected to the positive electrode of the second high-voltage battery 12 through the charging relay 41a; and the negative electrode of the second high-voltage battery 12 is connected to the negative electrode of the DC charging port 20A. In the parallel circuit Q, the positive electrode of the DC charging port 20A is connected to the positive electrode of the first high-voltage battery 11, and the negative electrode of the first high-voltage battery 11 is connected to the negative electrode of the DC charging port 20A through the charging relay 41b; and, in addition, the positive electrode of the DC charging port 20A is connected to the positive electrode of the second high-voltage battery 12 through the charging relay 41c, and the negative electrode of the second high-voltage battery 12 is connected to the negative electrode of the DC charging port 20A. If the input voltage is the first voltage (for example, approximately 400 V), the controller 50 forms the parallel circuit Q by turning on the charging relay 41b and the charging relay 41c and turning off the charging relay 41a. If the input voltage is the second voltage (for example, approximately 800 V), the controller 50 forms the series circuit P by turning on the charging relay 41a and turning off the charging relay 41b and the charging relay 41c. This configuration allows the power supply system 1 to form the series circuit P and the parallel circuit Q while restraining an increase in the number of the charging relays 41a to 41c.

The power supply system 1 further includes the circuit voltage detector 33A, the first battery voltage detector 13, and the second battery voltage detector 14. The circuit voltage detector 33A can detect the voltage applied to the series circuit P by the first high-voltage battery 11 and the second high-voltage battery 12, the voltage applied to the parallel circuit Q by the first high-voltage battery 11, and the voltage applied to the parallel circuit Q by the second high-voltage battery 12. The first battery voltage detector 13 can detect the voltage between the positive electrode and the negative electrode of the first high-voltage battery 11. The second battery voltage detector 14 can detect the voltage between the positive electrode and the negative electrode of the second high-voltage battery 12. After the quick charger 2 or the super-quick charger 3 is connected to the DC charging port 20A and before the power is supplied from the quick charger 2 or the super-quick charger 3 to the DC charging port 20A, the controller 50 detects whether any one of the charging relay 41a, the charging relay 41b, and the charging relay 41c has failed, based on detection results of the circuit voltage detector 33A, the first battery voltage detector 13, and the second battery voltage detector 14. Through this operation, the power supply system 1 can detect whether any one of the charging relays 41a to 41c has failed before starting the charging, and can prevent a charging error from occurring during the charging. As a result, the power supply system 1 can be improved in reliability.

In the above-described power supply system 1, the controller 50 detects whether the charging relay 41a has failed, based on the detection voltage V3 of the first high-voltage battery 11 and the second high-voltage battery 12 detected by the circuit voltage detector 33A, the detection voltage V1 of the first high-voltage battery 11 detected by the first battery voltage detector 13, and the detection voltage V2 of the second high-voltage battery 12 detected by the second battery voltage detector 14. The controller 50 detects whether the charging relay 41b has failed, based on the detection voltage V3 of the first high-voltage battery 11 detected by the circuit voltage detector 33A and the detection voltage V1 of the first high-voltage battery 11 detected by the first battery voltage detector 13. The controller 50 detects whether the charging relay 41c has failed, based on the detection voltage V3 of the second high-voltage battery 12 detected by the circuit voltage detector 33A and the detection voltage V2 of the second high-voltage battery 12 detected by the second battery voltage detector 14. Thus, the power supply system 1 determines whether any one of the charging relays 41a to 41c has failed based on the detection voltages V1 and V2, and accordingly can accurately determine the failure. For example, even if the voltage of each of the first high-voltage battery 11 and the second high-voltage battery 12 varies depending on the situation due to, for example, a difference in amount of charge or deterioration, the power supply system 1 can accurately determine whether any one of the charging relays 41a to 41c has failed.

Second Embodiment

The following describes a power supply system 1A according to a second embodiment of the present invention. In the second embodiment, the same components as those of the first embodiment are denoted by the same reference numerals as those of the first embodiment, and will not be described in detail. In the second embodiment, the power supply system 1A performs the charging with the high-voltage power supplied by the quick charger 2 or the super-quick charger 3 described above, or increases the voltage of low-voltage power supplied from an alternating-current (AC) power supply 6, for example, for home use, and performs the charging with the power increased in voltage. The power supply system 1A supplies the power to the rear inverter 4A and the rear motor 5A on the rear side of the vehicle 100, and supplies the power to a front inverter 4B and a front motor 5B on a front side of the vehicle 100.

Figure 11:
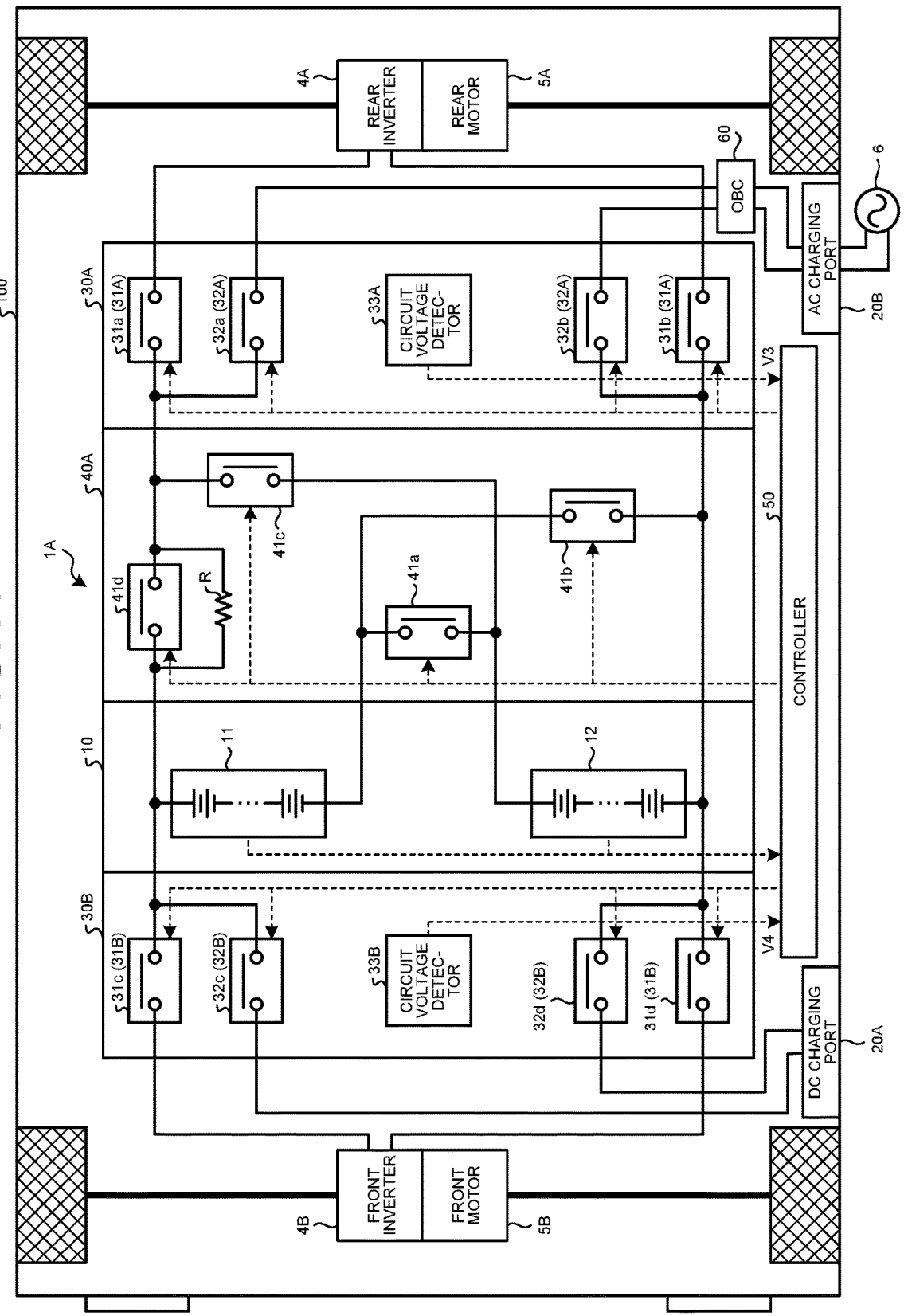
FIG. 11 is a circuit diagram illustrating a configuration example of a power supply system according to a second embodiment of the present invention.

The power supply system 1A according to the second embodiment differs from the power supply system 1 according to the first embodiment, for example, in that the power supply system 1A includes a front power supply box 30B that distributes the power to the front inverter 4B and the front motor 5B on the front side of the vehicle 100. As illustrated in FIG. 11, the power supply system 1A includes the power storage unit 10, the DC charging port 20A, an AC charging port 20B serving as a second input unit, the rear power supply box 30A, the front power supply box 30B, a charge switching unit 40A, the controller 50, and an on-board charger (OBC) 60. FIG. 11 is a circuit diagram illustrating a configuration example of the power supply system 1A according to the second embodiment. The power storage unit 10 is constituted by the first high-voltage battery 11 and the second high-voltage battery 12 connected by the series circuit P or the parallel circuit Q.

The DC charging port 20A is what is called a DC inlet, and is connected to the connector C of the quick charger 2 or the super-quick charger 3, as described above. The DC charging port 20A is connected to the front power supply box 30B, and outputs the power supplied from the quick charger 2 or the super-quick charger 3 to the front power supply box 30B.

The AC charging port 20B that is what is called an AC inlet is connected to the AC power supply 6 having a charging voltage lower than a charging voltage of the quick charger 2, and receives the power supplied from the AC power supply 6. The AC charging port 20B is connected to the OBC 60, and outputs the power supplied from the AC power supply 6 to the rear power supply box 30A through the OBC 60.

The rear power supply box 30A turns on and off the electrical connection of the power storage unit 10 to the rear inverter 4A on the rear side of the vehicle 100. The rear power supply box 30A also turns on and off an electrical connection of the power storage unit 10 to the AC charging port 20B.

The front power supply box 30B is provided on the front side in the overall length direction of the vehicle 100, and turns on and off an electrical connection of the power storage unit 10 to the front inverter 4B on the front side of the vehicle 100. The front power supply box 30B turns on and off the electrical connection of the power storage unit 10 to the DC charging port 20A. The front power supply box 30B includes a load power switching unit 31B, a main switching unit 32B, and a circuit voltage detector 33B.

The load power switching unit 31B switches the power supplied from the power storage unit 10 to a load unit. The load power switching unit 31B includes a load relay 31c and a load relay 31d. The load relays 31c and 31d conduct or shut off currents. The load relay 31c is provided between the positive electrode of the first high-voltage battery 11 or the positive electrode of the second high-voltage battery 12 and a positive electrode of the front inverter 4B. The load relay 31c conducts or shuts off a current that flows from the positive electrode of the first high-voltage battery 11 or the positive electrode of the second high-voltage battery 12 to the front inverter 4B. The load relay 31d is provided between the negative electrode of the first high-voltage battery 11 or the negative electrode of the second high-voltage battery 12 and a negative electrode of the front inverter 4B. The load relay 31d conducts or shuts off a current that flows from the front inverter 4B to the negative electrode of the first high-voltage battery 11 or the negative electrode of the second high-voltage battery 12.

The main switching unit 32B switches the power supplied from the DC charging port 20A to the power storage unit 10. The main switching unit 32B includes an upstream-side main relay 32c and a downstream-side main relay 32d. The upstream-side and downstream-side main relays 32c and 32d conduct or shut off currents. The upstream-side main relay 32c is provided between the positive electrode of the DC charging port 20A and the positive electrode of the first high-voltage battery 11. The upstream-side main relay 32c conducts or shuts off the current that flows from the DC charging port 20A to the first high-voltage battery 11. The upstream-side main relay 32c is located between the positive electrode of the DC charging port 20A and the positive electrode of the second high-voltage battery 12. The upstream-side main relay 32c conducts or shuts off the current that flows from the DC charging port 20A to the second high-voltage battery 12.

The downstream-side main relay 32d is provided between the negative electrode of the first high-voltage battery 11 and the negative electrode of the DC charging port 20A. The downstream-side main relay 32d conducts or shuts off the current that flows from the negative electrode of the first high-voltage battery 11 to the DC charging port 20A. The downstream-side main relay 32d is located between the negative electrode of the second high-voltage battery 12 and the negative electrode of the DC charging port 20A. The downstream-side main relay 32d conducts or shuts off the current that flows from the negative electrode of the second high-voltage battery 12 to the DC charging port 20A.

The circuit voltage detector 33B detects the voltages of the series circuit P and the parallel circuit Q. The circuit voltage detector 33B is connected in parallel to the first high-voltage battery 11 and the second high-voltage battery 12 constituting the series circuit P, and detects the voltage applied to the series circuit P by the first high-voltage battery 11 and the second high-voltage battery 12. The circuit voltage detector 33B is connected to the controller 50, and outputs a detected detection voltage V4 of the first high-voltage battery 11 and the second high-voltage battery 12 to the controller 50.

The circuit voltage detector 33B is connected in parallel to the first high-voltage battery 11, and detects the voltage applied to the parallel circuit Q by the first high-voltage battery 11. The circuit voltage detector 33B outputs the detected detection voltage V4 of the first high-voltage battery 11 to the controller 50.

The circuit voltage detector 33B is connected in parallel to the second high-voltage battery 12, and detects the voltage applied to the parallel circuit Q by the second high-voltage battery 12. The circuit voltage detector 33B outputs the detected detection voltage V4 of the second high-voltage battery 12 to the controller 50.

The charge switching unit 40A includes the charging relay 41a, the charging relay 41b, the charging relay 41c, a charging relay 41d, and a resistor R. The charging relays 41a to 41c are configured in the same way as the charging relays described in the first embodiment. The charging relay 41d is provided between the positive electrode of the first high-voltage battery 11 and the positive electrode of the second high-voltage battery 12. In this example, the charging relay 41d is provided between the positive electrode of the first high-voltage battery 11 and the charging relay 41c. The charging relay 41d electrically turns on and off an electrical connection between the positive electrode of the first high-voltage battery 11 and the positive electrode of the second high-voltage battery 12. The resistor R is connected in parallel to the charging relay 41d.

The OBC 60 converts the power. The OBC 60 is connected to the AC charging port 20B, and converts the AC power output from the AC charging port 20B into DC power and increases the voltage of the DC power. The OBC 60 is connected to the rear power supply box 30A, and outputs the DC power increased in voltage to the power storage unit 10 through the rear power supply box 30A. In this case, the power storage unit 10 preferably forms the parallel circuit Q in order to reduce a loss caused by the on-board charger during the voltage increase.

Figure 12:
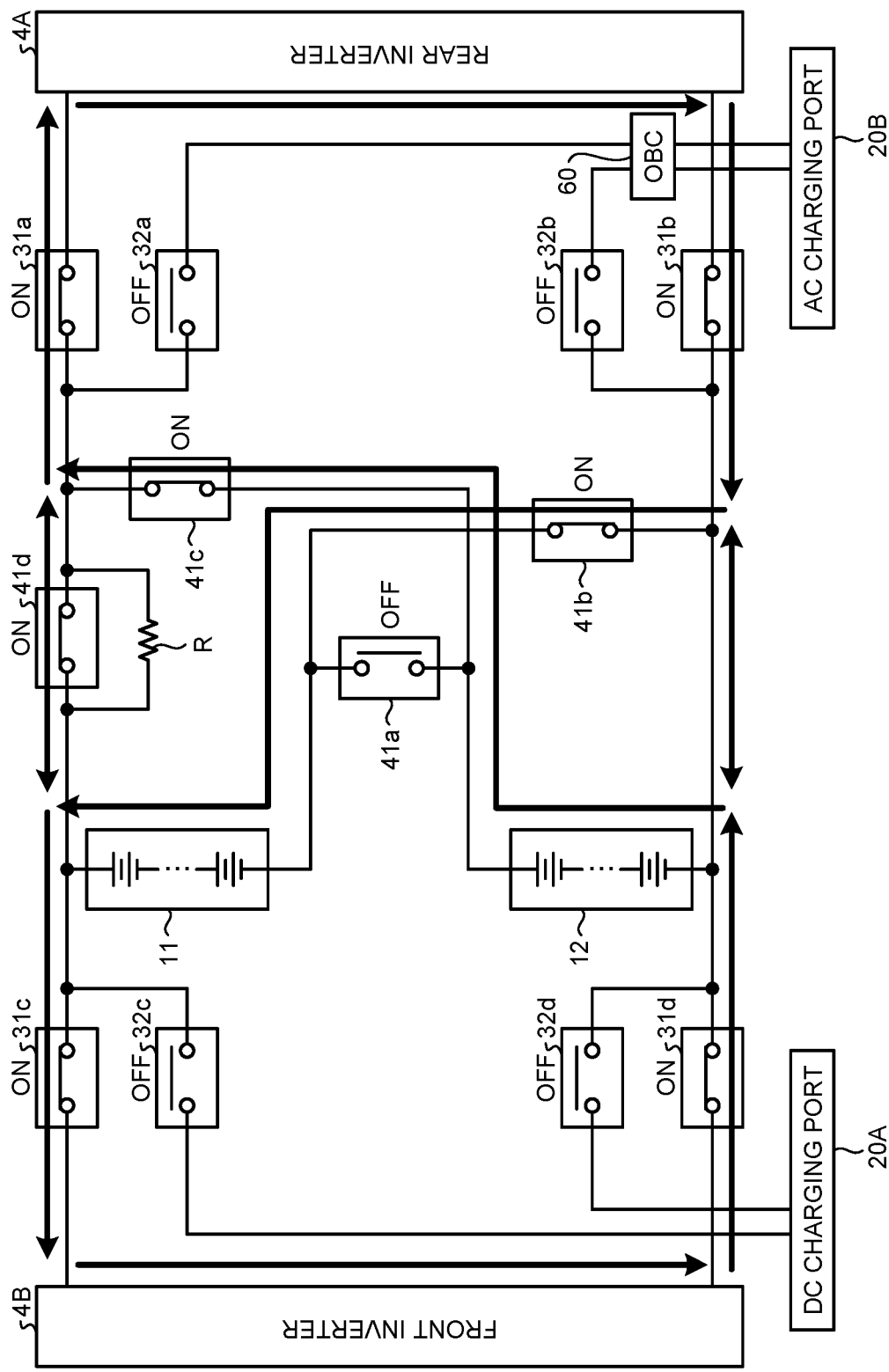
FIG. 12 is a circuit diagram illustrating an operation example of the power supply system according to the second embodiment during vehicle traveling.

The following describes an operation example of the power supply system 1A during vehicle traveling. FIG. 12 is a circuit diagram illustrating the operation example of the power supply system 1A according to the second embodiment during the vehicle traveling. During the vehicle traveling, as illustrated in FIG. 12, the controller 50 turns on the charging relays 41b, 41c, and 41d and the load relays 31a, 31b, 31c, and 31d, and turns off the charging relay 41a, the upstream-side main relays 32a and 32c, and the downstream-side main relays 32b and 32d. Through this operation, the controller 50 can form the parallel circuit Q that connects the first high-voltage battery 11 to the second high-voltage battery 12 in parallel to each other, and can supply the power from the first high-voltage battery 11 and the second high-voltage battery 12 formed into the parallel circuit Q to the rear inverter 4A and the front inverter 4B. At this time, the rear inverter 4A and the front inverter 4B operate at an output voltage (for example, approximately 400 V) of the rear inverter 4A or the front inverter 4B. FIG. 20 illustrates the on/off relations among the relays during the vehicle traveling.

Figure 13:
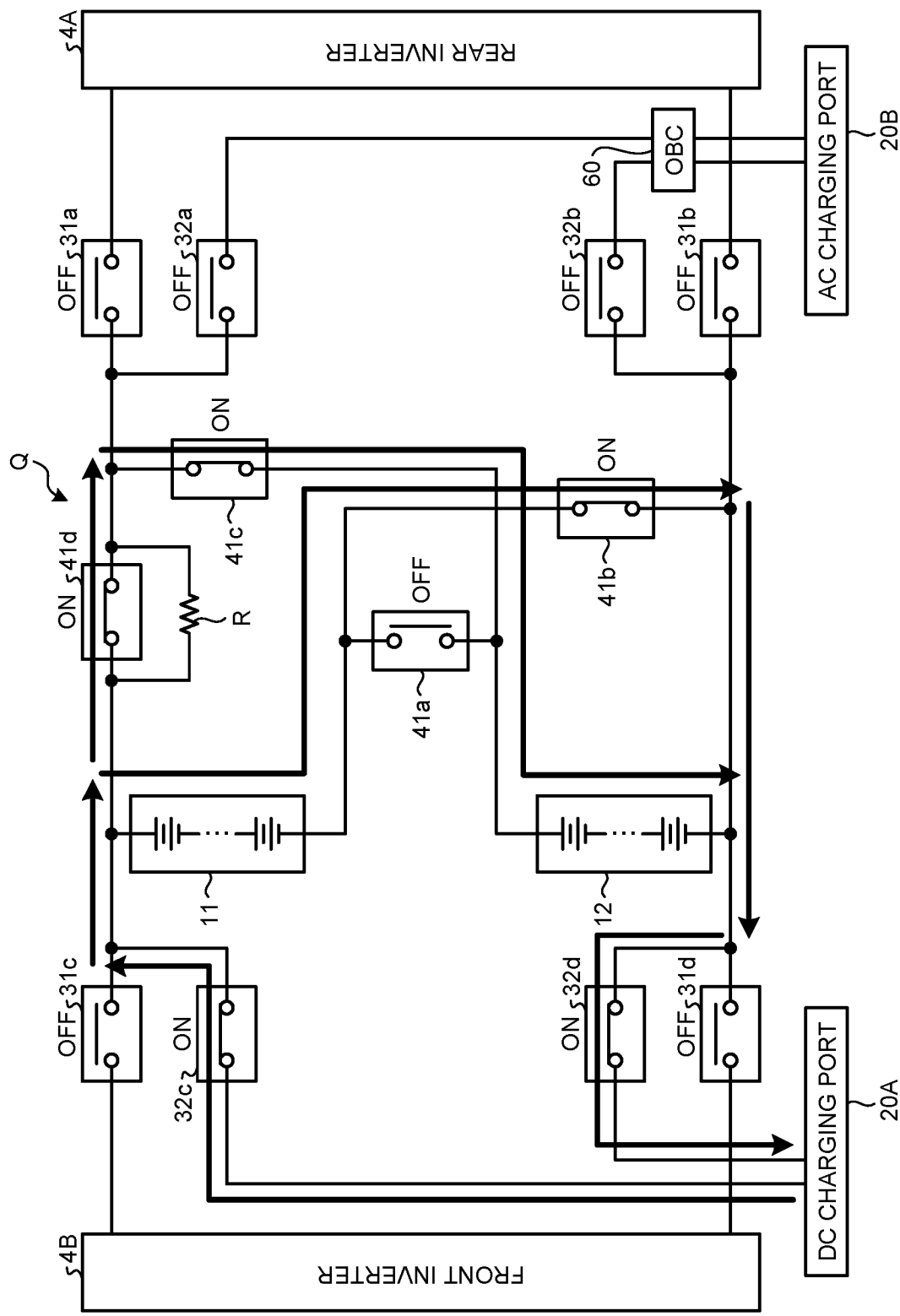
FIG. 13 is a circuit diagram illustrating an operation example of the power supply system according to the second embodiment during the quick charging.

The following describes an operation example of the power supply system 1A during the quick charging. FIG. 13 is a circuit diagram illustrating the operation example of the power supply system 1A according to the second embodiment during the quick charging. In the case of the quick charging, the controller 50 controls the charge switching unit 40A to form the parallel circuit Q that connects the first high-voltage battery 11 to the second high-voltage battery 12 in parallel. For example, as illustrated in FIG. 13, the controller 50 forms the parallel circuit Q by turning on the charging relays 41b, 41c, and 41d and turning off the charging relay 41a. The controller 50 turns on the upstream-side main relay 32c and the downstream-side main relay 32d to electrically connect the parallel circuit Q of the charge switching unit 40A to the DC charging port 20A so as to charge the first high-voltage battery 11 and the second high-voltage battery 12 with the power supplied from the quick charger 2 through the DC charging port 20A. At this time, the supply voltage supplied from the quick charger 2 is equal to the output voltage (for example, approximately 400 V) of the first high-voltage battery 11 or the second high-voltage battery 12. FIG. 20 illustrates the on/off relations among the relays during the quick charging.

Figure 14:
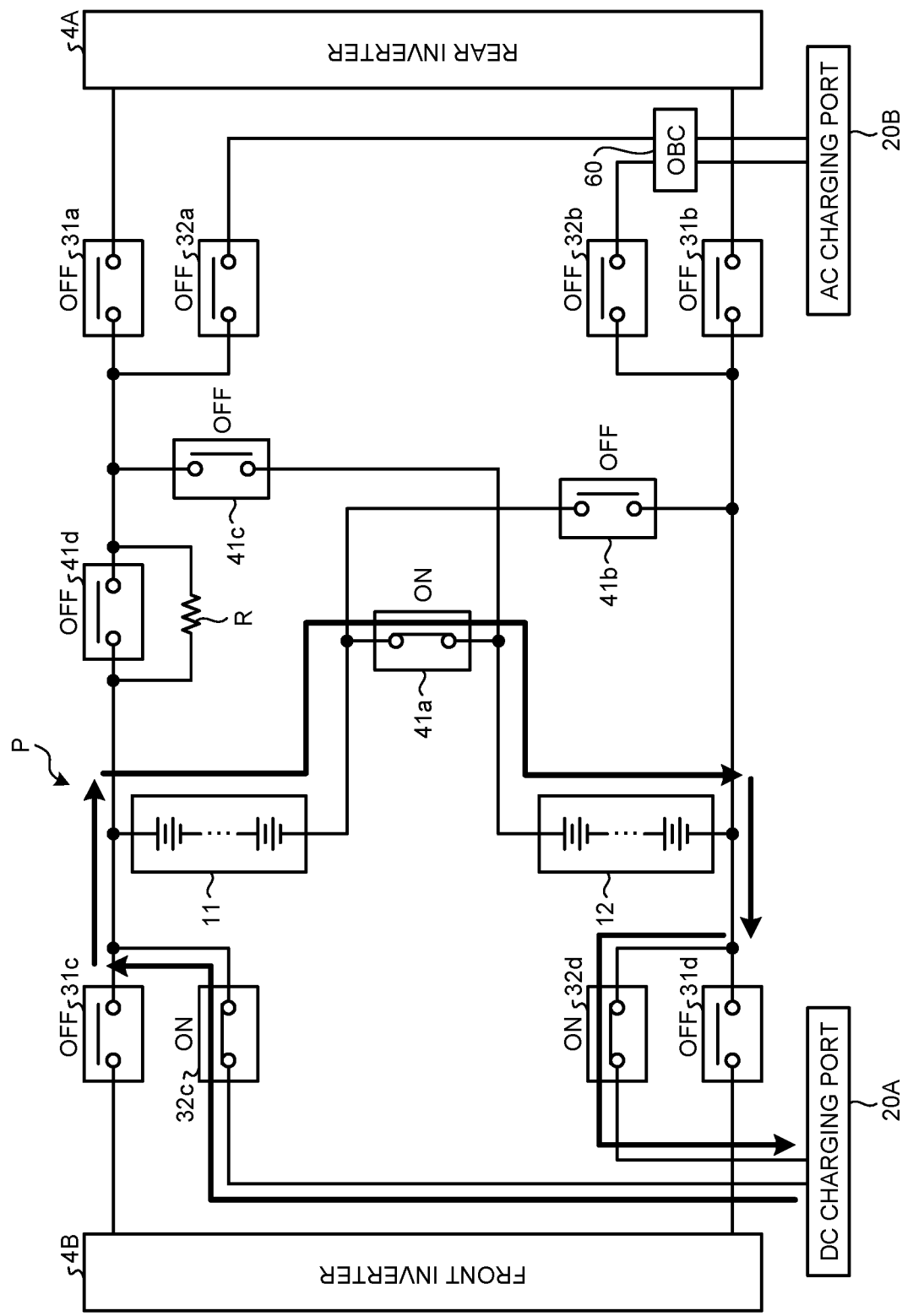
FIG. 14 is a circuit diagram illustrating an operation example of the power supply system according to the second embodiment during the super-quick charging.

The following describes an operation example of the power supply system 1A during the super-quick charging. FIG. 14 is a circuit diagram illustrating the operation example of the power supply system 1A according to the second embodiment during the super-quick charging. In the case of the super-quick charging, the controller 50 controls the charge switching unit 40A to form the series circuit P. For example, as illustrated in FIG. 14, the controller 50 forms the series circuit P by turning on the charging relay 41a and turning off the charging relays 41b, 41c, and 41d. The controller 50 turns on the upstream-side main relay 32c and the downstream-side main relay 32d to electrically connect the series circuit P of the charge switching unit 40A to the DC charging port 20A so as to charge the first high-voltage battery 11 and the second high-voltage battery 12 with the power supplied from the super-quick charger 3 through the DC charging port 20A. At this time, the supply voltage supplied from the super-quick charger 3 is equal to the total output voltage (for example, approximately 800 V) of the first high-voltage battery 11 and the second high-voltage battery 12. FIG. 20 illustrates the on/off relations among the relays during the super-quick charging.

Figure 15:
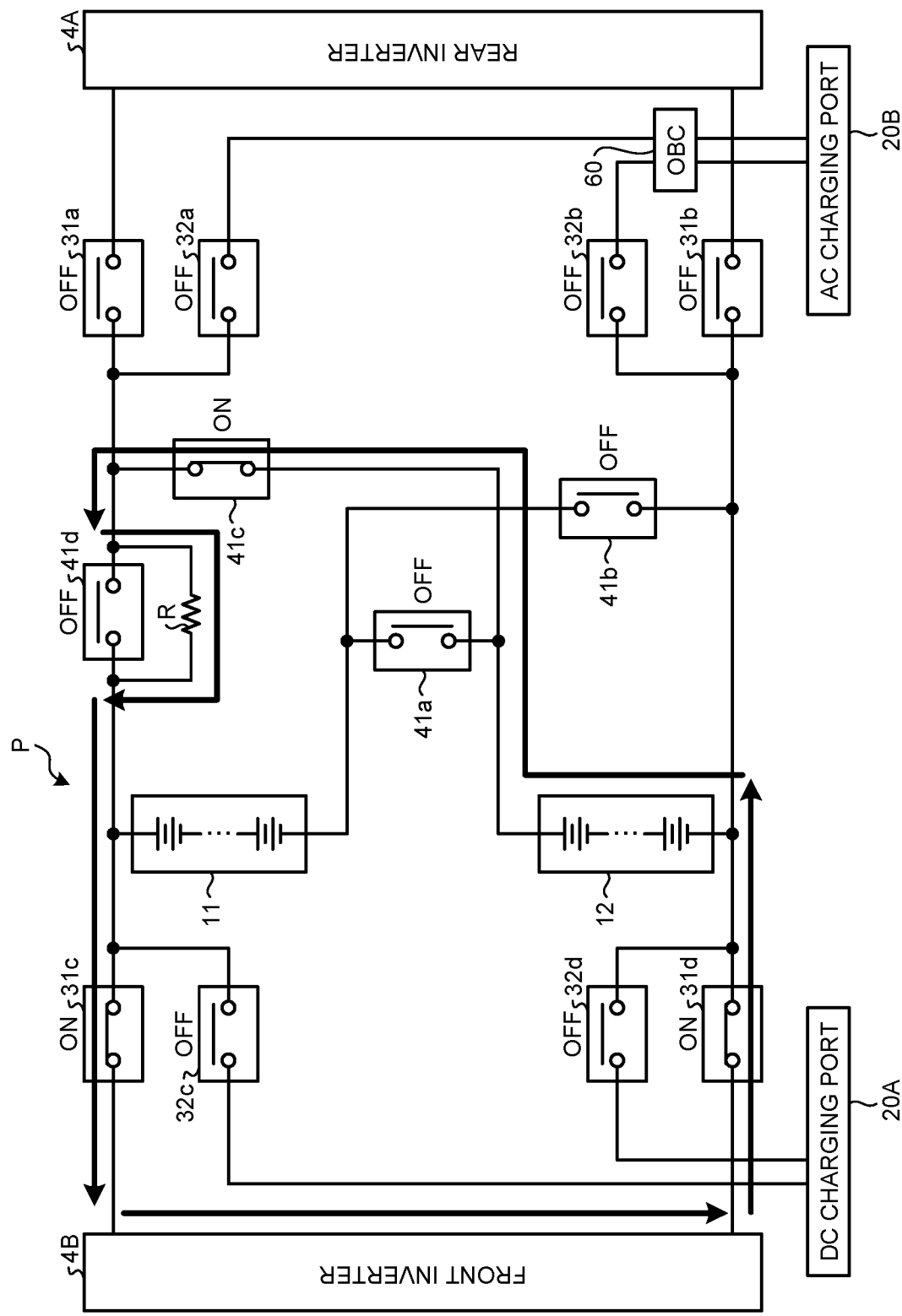
FIG. 15 is a circuit diagram illustrating an operation example of the power supply system according to the second embodiment during front pre-charging.

The following describes an operation example of the power supply system 1A during front pre-charging. FIG. 15 is a circuit diagram illustrating the operation example of the power supply system 1A according to the second embodiment during the front pre-charging. A capacitor generally for smoothing the power supply voltage is provided on an input side of, for example, the front inverter 4B serving as the high-voltage load unit. When the power supply system 1A starts, the power supply system 1A preferably performs the front pre-charging to pre-charge this capacitor.

When performing the front pre-charging, the controller 50 turns on the charging relay 41c, the load relay 31c, and the load relay 31d, and turns off, for example, the charging relay 41d, for example, as illustrated in FIG. 15. Through this operation, the controller 50 can connect the second high-voltage battery 12 to the front inverter 4B through the resistor R. As a result, the controller 50 can supply the power supplied from the second high-voltage battery 12 to the front inverter 4B through the resistor R, and thus can charge the capacitor on the input side of, for example, the front inverter 4B. FIG. 20 illustrates the on/off relations among the relays during the front pre-charging.

Figure 16:
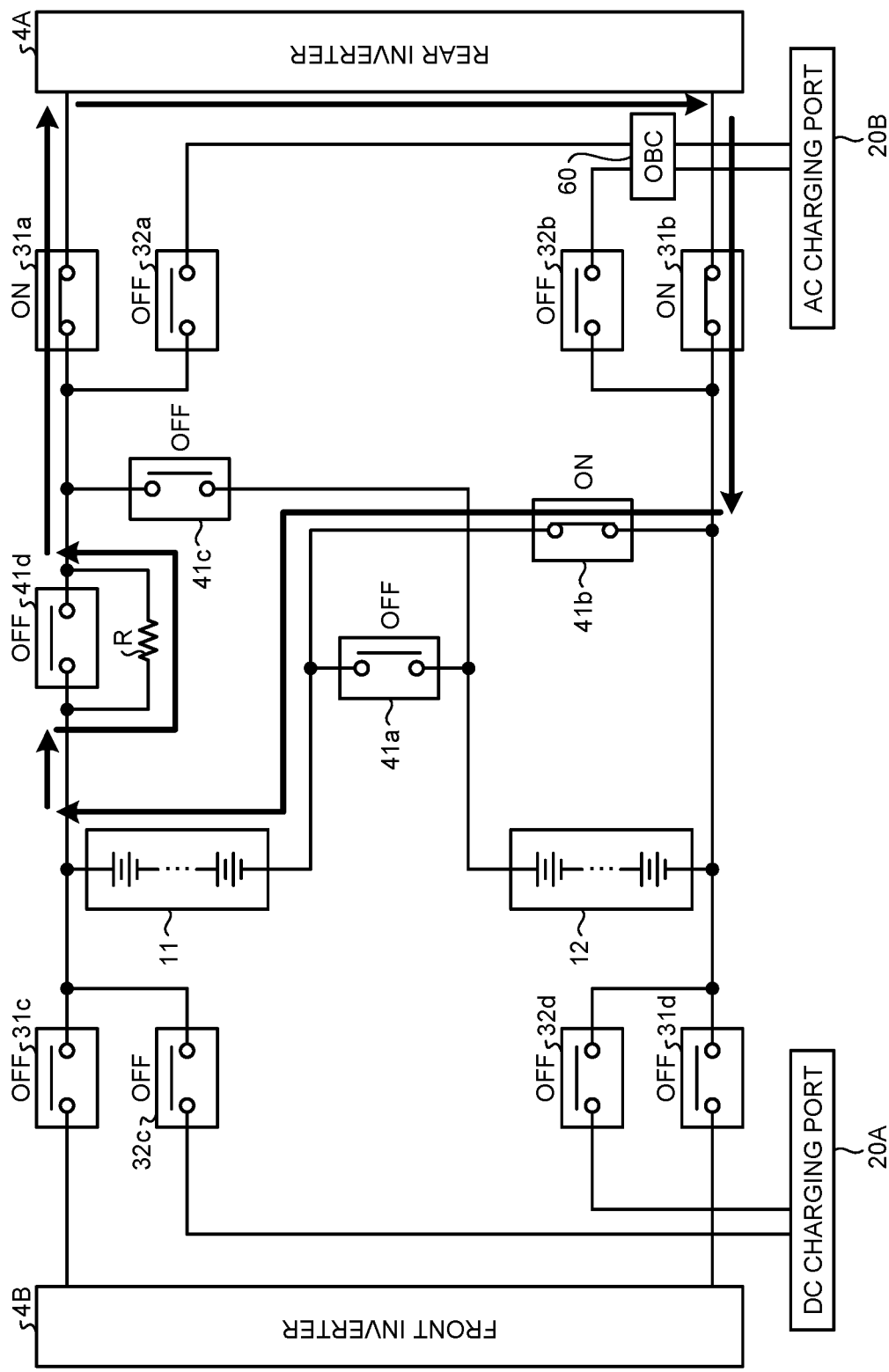
FIG. 16 is a circuit diagram illustrating an operation example of the power supply system according to the second embodiment during rear pre-charging.

The following describes an operation example of the power supply system 1A during rear pre-charging. FIG. 16 is a circuit diagram illustrating the operation example of the power supply system 1A according to the second embodiment during the rear pre-charging. A capacitor generally for smoothing the power supply voltage is provided on an input side of, for example, the rear inverter 4A serving as the high-voltage load unit. When the power supply system 1A starts, the power supply system 1A preferably performs the rear pre-charging to pre-charge this capacitor.

When performing the rear pre-charging, the controller 50 turns on the charging relay 41b, the load relay 31a, and the load relay 31b, and turns off, for example, the charging relay 41d, for example, as illustrated in FIG. 16. Through this operation, the controller 50 can connect the first high-voltage battery 11 to the rear inverter 4A through the resistor R. As a result, the controller 50 can supply the power supplied from the first high-voltage battery 11 to the rear inverter 4A through the resistor R, and thus can charge the capacitor on the input side of, for example, the rear inverter 4A. Since the controller 50 performs the front pre-charging and the rear pre-charging through the same resistor R, the circuit configuration can be simplified. FIG. 20 illustrates the on/off relations among the relays during the rear pre-charging.

Figure 17:
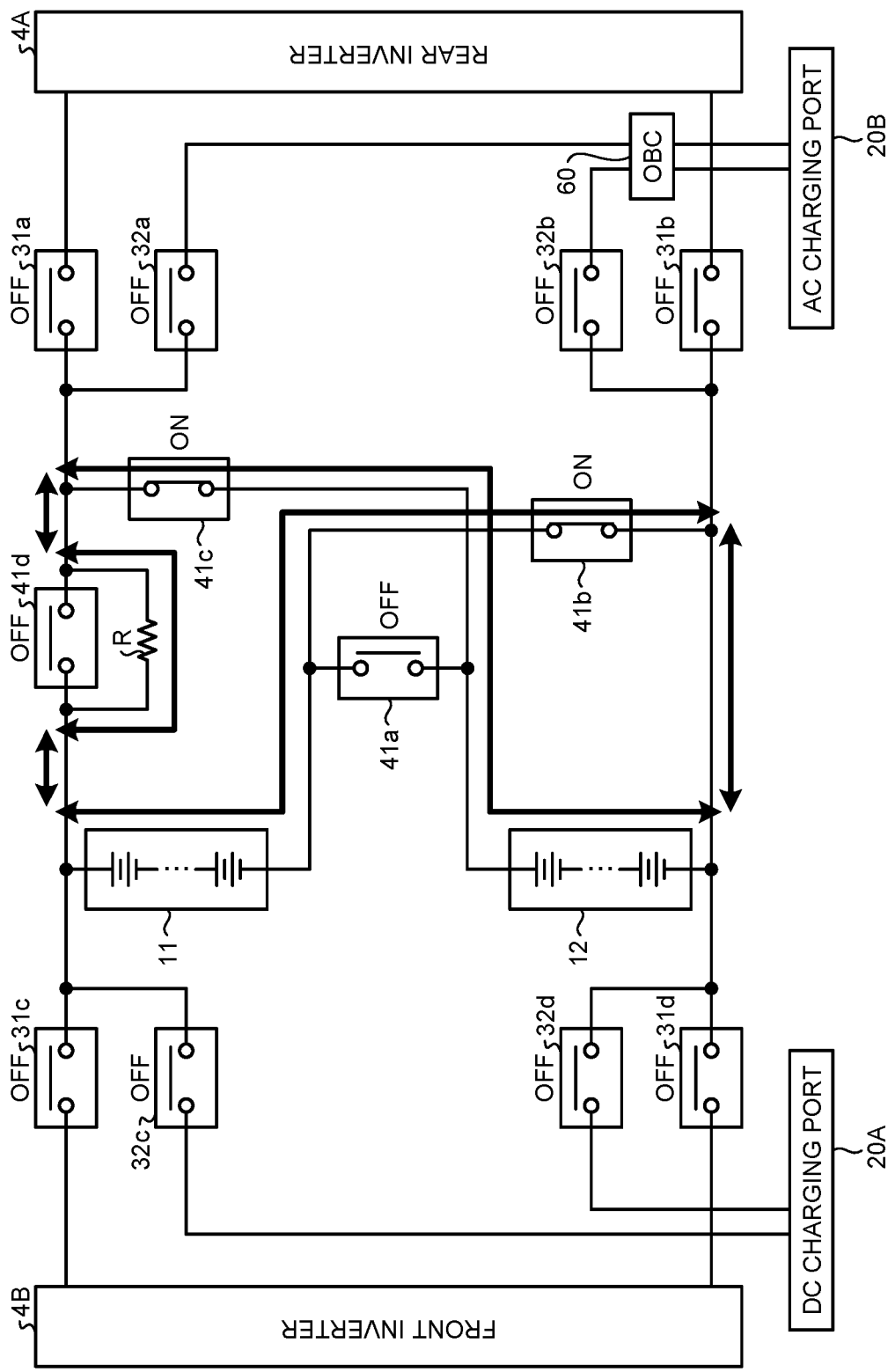
FIG. 17 is a circuit diagram illustrating an operation example of the power supply system according to the second embodiment during battery equalization processing.

The following describes an operation example of the power supply system 1A during battery equalization processing. FIG. 17 is a circuit diagram illustrating the operation example of the power supply system 1A according to the second embodiment during the battery equalization processing. In the case of performing the battery equalization processing to equalize the voltages of the first high-voltage battery 11 and the second high-voltage battery 12, for example, as illustrated in FIG. 17, the controller 50 turns on the charging relays 41b and 41c, and turns off, for example, the charging relay 41d. Through this operation, the controller 50 forms a closed circuit that connects the positive electrode of the first high-voltage battery 11 to the positive electrode of the second high-voltage battery 12 through the resistor R. The controller 50 causes a current to flow from a higher-voltage side toward a lower-voltage side of the positive electrode of the first high-voltage battery 11 and the positive electrode of the second high-voltage battery 12 through the resistor R so as to equalize the voltages of the batteries. FIG. 20 illustrates the on/off relations among the relays during the battery equalization processing.

Figure 18:
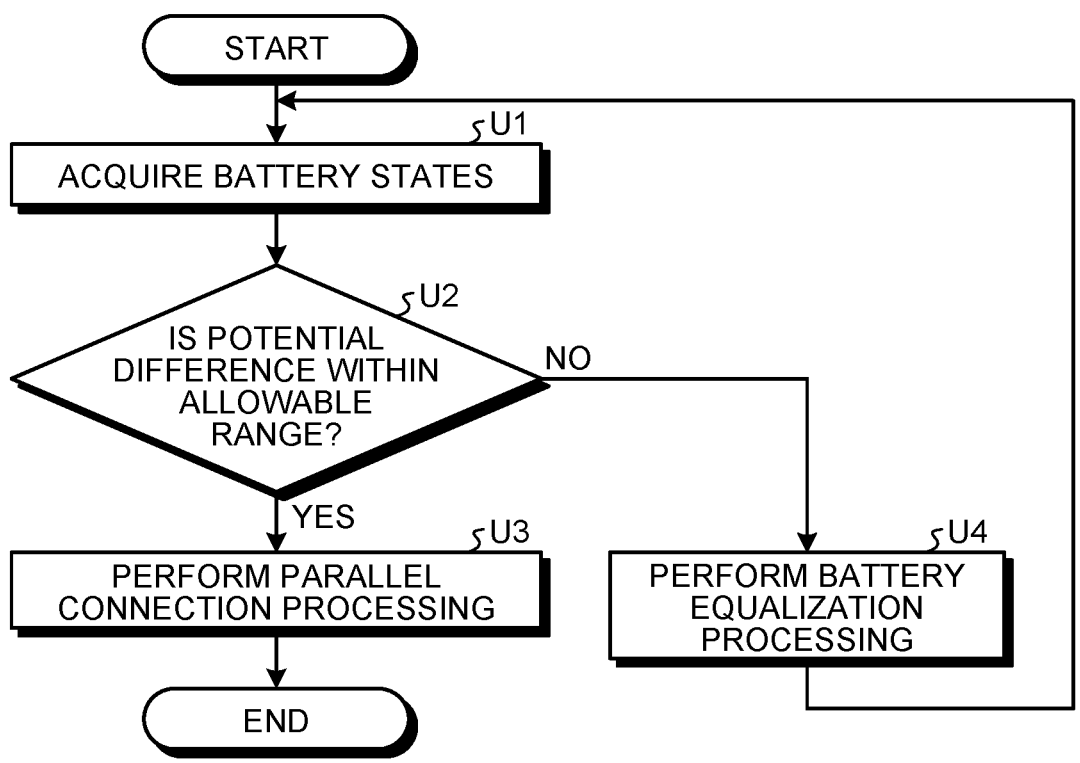
FIG. 18 is a flowchart illustrating the operation example of the power supply system according to the second embodiment during the battery equalization processing.

The following describes the operation example of the power supply system 1A during the battery equalization processing, with reference to a flowchart. FIG. 18 is the flowchart illustrating the operation example of the power supply system 1A according to the second embodiment during the battery equalization processing. This battery equalization processing is performed, for example, when the vehicle 100 is stationary. As illustrated in FIG. 18, the controller 50 acquires battery states when the vehicle 100 is stationary (Step U1). For example, the controller 50 acquires the detection voltage V1 of the first high-voltage battery 11 from the first battery voltage detector 13, and acquires the detection voltage V2 of the second high-voltage battery 12 from the second battery voltage detector 14, as described above. Then, the controller 50 determines whether the potential difference between the first high-voltage battery 11 and the second high-voltage battery 12 is within an allowable range (Step U2). For example, the controller 50 compares the detection voltage V1 of the first high-voltage battery 11 with the detection voltage V2 of the second high-voltage battery 12, and determines whether the potential difference between the detection voltages V1 and V2 is within the allowable range. If the potential difference between the first high-voltage battery 11 and the second high-voltage battery 12 is within the allowable range (Yes at Step U2), the controller 50 performs the parallel connection processing to connect the first high-voltage battery 11 to the second high-voltage battery 12 in parallel (Step U3). If, instead, the potential difference between the first high-voltage battery 11 and the second high-voltage battery 12 is not within the allowable range (No at Step U2), the controller 50 performs the battery equalization processing (Step U4). For example, the controller 50 forms the closed circuit that connects the positive electrode of the first high-voltage battery 11 to the positive electrode of the second high-voltage battery 12 through the resistor R by turning on the charging relays 41b and 41c and turning off, for example, the charging relay 41d, and causes the current to flow from the higher-voltage side toward the lower-voltage side through the resistor R. The controller 50 performs the processing at Step U1 again to acquire the battery states again, and repeats the above-described processing. As a result, in the case of connecting the first high-voltage battery 11 to the second high-voltage battery 12 in parallel, the controller 50 can keep the potential difference between the batteries within the allowable range, and thus can prevent an excessive current from flowing.

Figure 19:
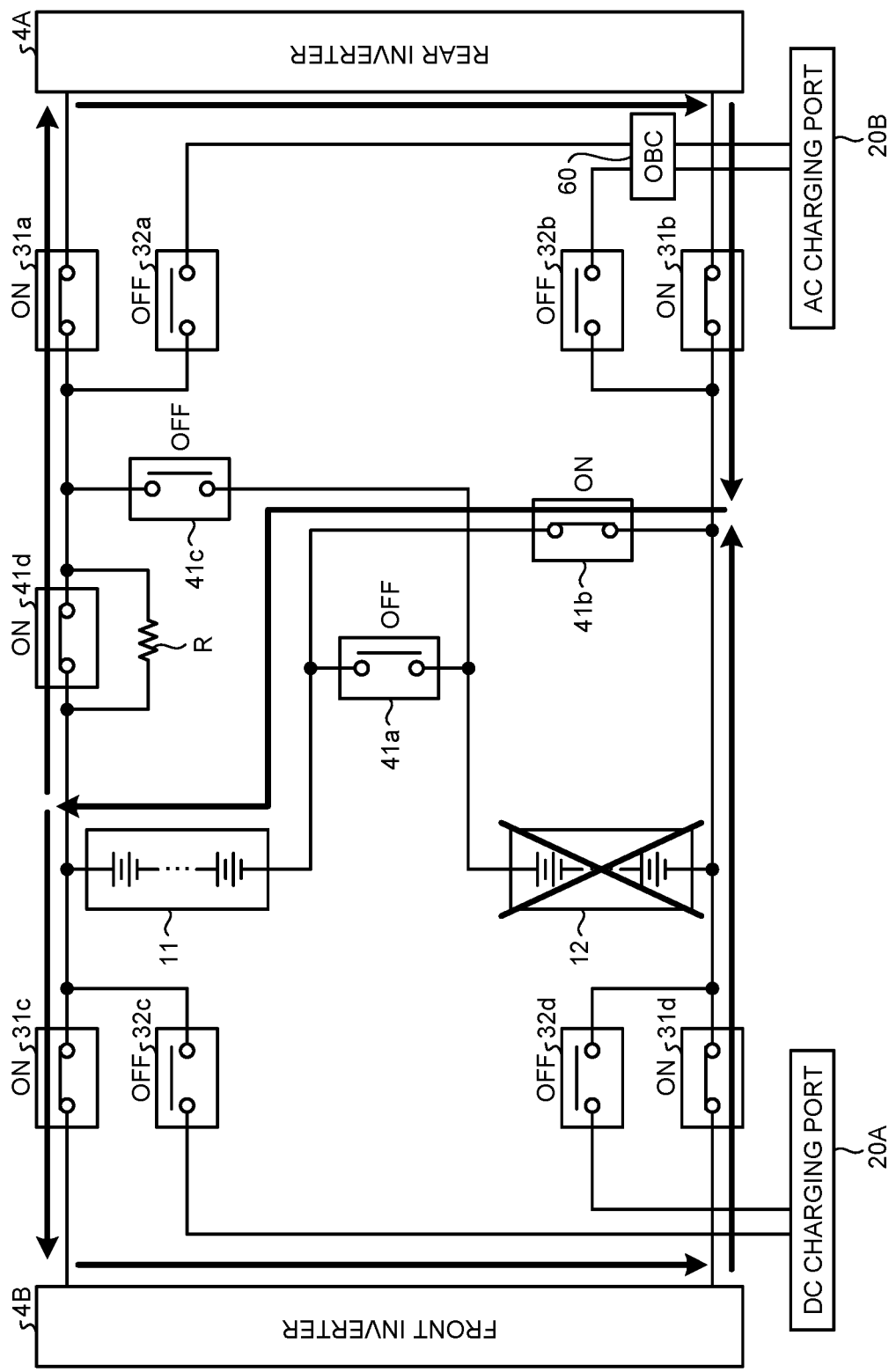
FIG. 19 is a circuit diagram illustrating an operation example of the power supply system according to the second embodiment during a battery abnormality.

The following describes an operation example of the power supply system 1A during a battery abnormality. FIG. 19 is a circuit diagram illustrating the operation example of the power supply system 1A according to the second embodiment during the battery abnormality. If one of the first high-voltage battery 11 and the second high-voltage battery 12 is abnormal, the controller 50 performs control so as to supply the power to the rear inverter 4A and the front inverter 4B from the other of the first high-voltage battery 11 and the second high-voltage battery 12. In this example, a case will be described where the second high-voltage battery 12 is abnormal. For example, as illustrated in FIG. 19, if the second high-voltage battery 12 is abnormal, the controller 50 turns on the charging relays 41b and 41d and the load relays 31a to 31d, and turns off, for example, the charging relay (switch for shutting off) 41c. Through this operation, the controller 50 can connect the first high-voltage battery 11 to the rear inverter 4A and the front inverter 4B, and separate the second high-voltage battery 12 from the rear inverter 4A and the front inverter 4B to shut off the second high-voltage battery 12. As a result, if the second high-voltage battery 12 is abnormal, the controller 50 can supply the power from the first high-voltage battery 11 to the rear inverter 4A and the front inverter 4B, and thus can continue the traveling of the vehicle 100.

Figure 21:
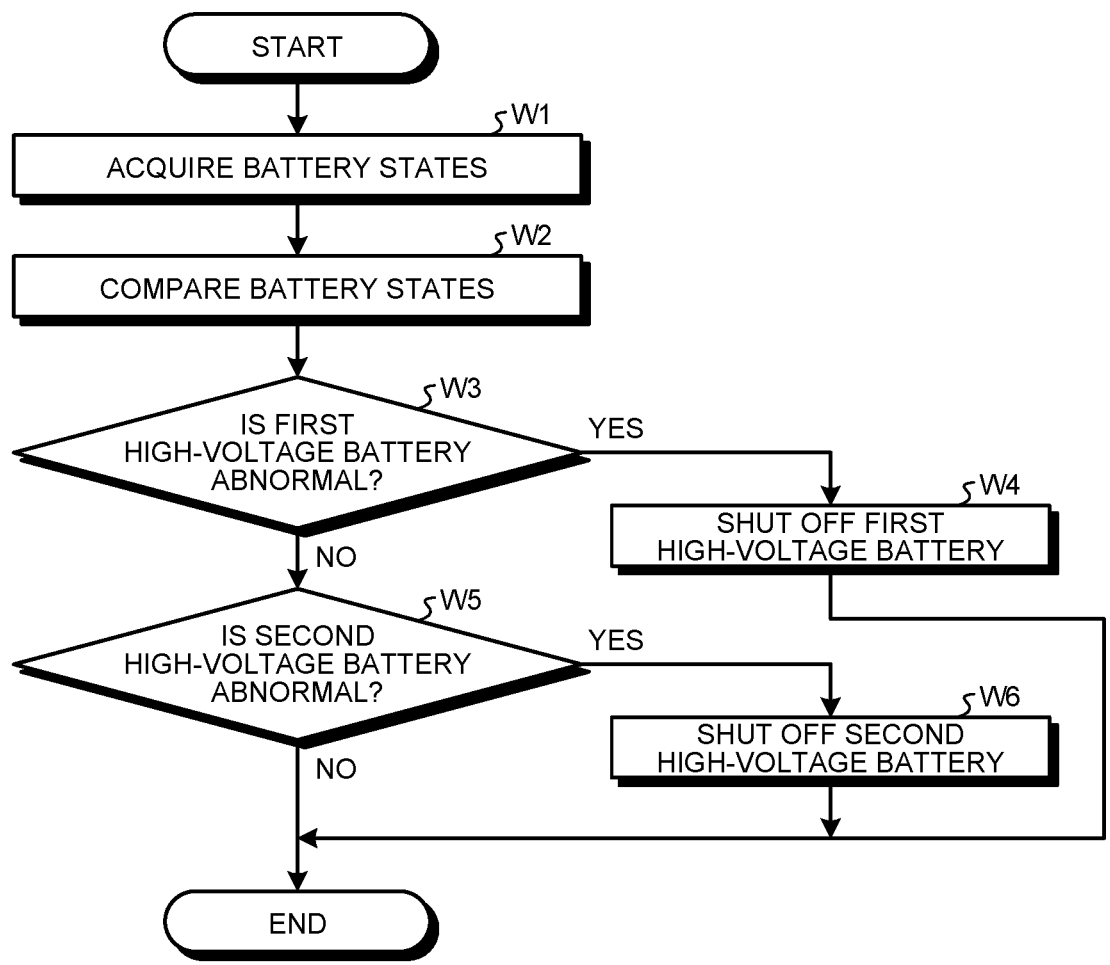
FIG. 21 is a flowchart illustrating the operation example of the power supply system according to the second embodiment during the battery abnormality.

The following describes the operation example of the power supply system 1A during the battery abnormality, with reference to a flowchart. FIG. 21 is the flowchart illustrating the operation example of the power supply system 1A according to the second embodiment during the battery abnormality. As illustrated in FIG. 21, the controller 50 acquires the battery states (Step W1). For example, the controller 50 acquires the detection voltage V1 of the first high-voltage battery 11 from the first battery voltage detector 13, and acquires the detection voltage V2 of the second high-voltage battery 12 from the second battery voltage detector 14, as described above. The battery states may include, for example, currents, temperatures, states of charge, and degrees of deterioration, in addition to the detection voltages V1 and V2. Then, the controller 50 compares a battery state of the first high-voltage battery 11 with a battery state of the second high-voltage battery 12 (Step W2).

If the first high-voltage battery 11 is in an abnormal state of, for example, not outputting a predetermined voltage (Yes at Step W3), the controller 50 shuts off the first high-voltage battery 11 (Step W4), switches to supply the power from the second high-voltage battery 12 to the rear inverter 4A and the front inverter 4B, and ends the process. If, instead, the first high-voltage battery 11 is not abnormal (No at Step W3), and the second high-voltage battery 12 is abnormal (Yes at Step W5), the controller 50 shuts off the second high-voltage battery 12 (Step W6), switches to supply the power from the first high-voltage battery 11 to the rear inverter 4A and the front inverter 4B, and ends the process. If, at Step W5 described above, the second high-voltage battery 12 is not abnormal (No at Step W5), the controller 50 ends the process without further processing because both batteries are normal. If both the first high-voltage battery 11 and the second high-voltage battery 12 are in the abnormal state of, for example, not outputting the predetermined voltage, the controller 50 may shut off one of the batteries in a worse condition, and supply the power to the other of the batteries.

As described above, the power supply system 1A according to the second embodiment includes the rear power supply box 30A and the front power supply box 30B. The first high-voltage battery 11 and the second high-voltage battery 12 are connected by the series circuit P or the parallel circuit Q to constitute the power storage unit 10. The rear power supply box 30A is provided on the rear side in the overall length direction of the vehicle 100, and turns on and off the electrical connection of the power storage unit 10 to the rear inverter 4A of the vehicle 100. The front power supply box 30B is provided on the front side in the overall length direction of the vehicle 100, and turns on and off the electrical connection of the power storage unit 10 to the front inverter 4B of the vehicle 100. The front power supply box 30B turns on and off the electrical connection of the power storage unit 10 to the DC charging port 20A. This configuration allows the power supply system 1A to appropriately distribute the power to the rear inverter 4A provided on the rear side of the vehicle 100 and the front inverter 4B provided on the front side of the vehicle 100. The power supply system 1A can also appropriately charge the power storage unit 10 with the power supplied through the DC charging port 20A.

The above-described power supply system 1A includes the AC charging port 20B that is connected to the AC power supply 6 having the charging voltage lower than that of the quick charger 2, and that receives the power supplied from the AC power supply 6. The rear power supply box 30A turns on and off the electrical connection of the power storage unit 10 to the AC charging port 20B. This configuration allows the power supply system 1A to appropriately charge the power storage unit 10 with the power supplied through the AC charging port 20B.

In the above-described power supply system 1A, the charge switching unit 40A includes the charging relay 41d and the resistor R. The charging relay 41d is provided between the positive electrode of the first high-voltage battery 11 and the positive electrode of the second high-voltage battery 12, and electrically turns on and off the electrical connection between the positive electrode of the first high-voltage battery 11 and the positive electrode of the second high-voltage battery 12. The resistor R is connected in parallel to the charging relay 41d. In the case of equalizing the voltages of the first high-voltage battery 11 and the second high-voltage battery 12, the controller 50 turns off the charging relay 41d to form the closed circuit that connects the positive electrode of the first high-voltage battery 11 to the positive electrode of the second high-voltage battery 12 through the resistor R. The controller 50 causes the current to flow from the higher-voltage side toward the lower-voltage side of the positive electrode of the first high-voltage battery 11 and the positive electrode of the second high-voltage battery 12 through the resistor R.

With this configuration, when a potential difference has been generated between the first high-voltage battery 11 and the second high-voltage battery 12, the power supply system 1A can eliminate the potential difference. As a result, when the parallel circuit Q is formed, the power supply system 1A can restrain an excessive current from flowing due to the potential difference. The power supply system 1A uses the resistor R used during the pre-charging also for eliminating the potential difference, and therefore can be reduced in number of parts. As a result, the circuit of the power supply system 1A can be restrained from increasing in size, and thus, space saving and cost reduction can be achieved.

The above-described power supply system 1A includes the charging relay 41b capable of shutting off the first high-voltage battery 11 and the charging relay 41c capable of shutting off the second high-voltage battery 12. If the second high-voltage battery 12 is abnormal, the controller 50 turns off the charging relay 41c to shut off the second high-voltage battery 12 so as to supply the power from the first high-voltage battery 11 to the rear inverter 4A of the vehicle 100 and the front inverter 4B of the vehicle 100. If, instead, the first high-voltage battery 11 is abnormal, the controller 50 turns off the charging relay 41b to shut off the first high-voltage battery 11 so as to supply the power from the second high-voltage battery 12 to the rear inverter 4A of the vehicle 100 and the front inverter 4B of the vehicle 100. With this configuration, even if one of the first high-voltage battery 11 and the second high-voltage battery 12 is abnormal, the power supply system 1A can use the other of the first high-voltage battery 11 and the second high-voltage battery 12 to supply the power, and thus can minimize the influence of the battery abnormality on the system. As a result, the power supply system 1A can ensure the power supply required for the vehicle travel, and can restrain the system from decreasing in reliability.

Third Embodiment

Figure 22:
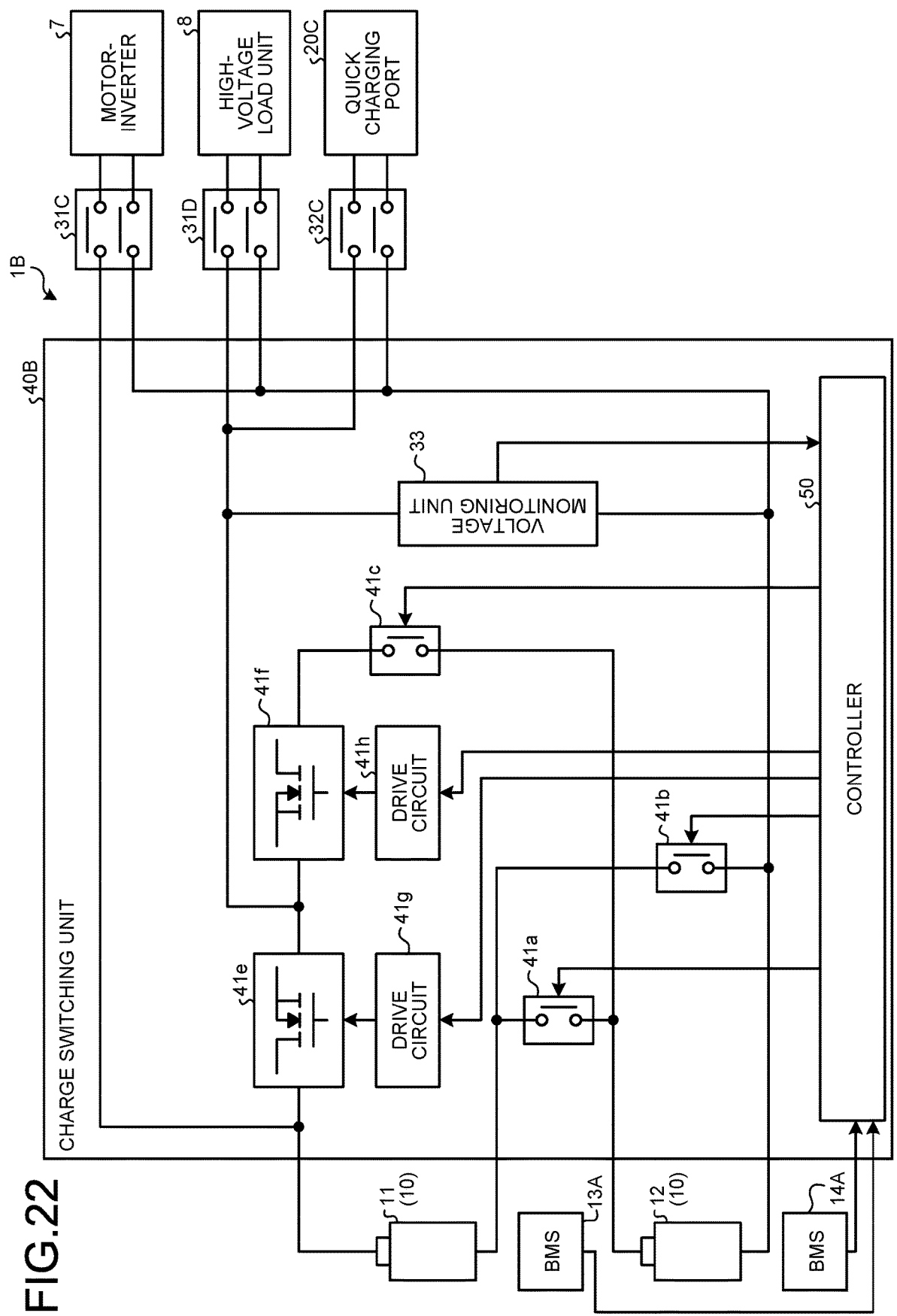
FIG. 22 is a circuit diagram illustrating a configuration example of a power supply system according to a third embodiment of the present invention.

The following describes a power supply system 1B according to a third embodiment of the present invention. FIG. 22 is a circuit diagram illustrating a configuration example of the power supply system 1B according to the third embodiment. In the third embodiment, the same components as those of either one of the first or second embodiments are denoted by the same reference numerals as those of either one of the first or second embodiments, and will not be described in detail. The power supply system 1B in the third embodiment differs from the power supply systems in the first and second embodiments in that the power supply system 1B supplies power from the first and second high-voltage batteries 11 and 12 formed into the series circuit P to a motor-inverter 7 (second load unit). The power supply system 1B also differs from the power supply systems in the first and second embodiments in that the power supply system 1B performs constant current control using field-effect transistors (FETs) 41e and 41f when equalizing the states of charge.

As illustrated in FIG. 22, the power supply system 1B includes the first high-voltage battery 11, the second high-voltage battery 12, a battery management system (BMS) 13A, a BMS 14A, load power switching units 31C and 31D, a main switching unit 32C, a quick charging port 20C, and a charge switching unit 40B.

The BMS 13A monitors the state of the first high-voltage battery 11. The BMS 13A monitors, for example, the total voltage, the remaining capacity, and input and output currents of the first high-voltage battery 11, and voltages of the respective battery cells of the first high-voltage battery 11. The BMS 13A is connected to the controller 50, and outputs the monitoring results of the first high-voltage battery 11 to the controller 50.

The BMS 14A monitors the state of the second high-voltage battery 12. The BMS 14A monitors, for example, the total voltage, the remaining capacity, and input and output currents of the second high-voltage battery 12, and voltages of the respective battery cells of the second high-voltage battery 12. The BMS 14A is connected to the controller 50, and outputs the monitoring results of the second high-voltage battery 12 to the controller 50.

The quick charging port 20C is what is called an inlet, to which the connector C of the quick charger 2 or the super-quick charger 3 described above is connected. The quick charging port 20C is connected to the charge switching unit 40B through the main switching unit 32C, and outputs the power supplied from the quick charger 2 or the super-quick charger 3 to the charge switching unit 40B.

The main switching unit 32C switches the power supplied from the quick charging port 20C to the power storage unit 10. The main switching unit 32C is provided between the quick charging port 20C and the power storage unit 10 (first and second high-voltage batteries 11 and 12). The main switching unit 32C conducts or shuts off a current that flows from the quick charging port 20C to the power storage unit 10.

The load power switching unit 31C switches the power supplied from the power storage unit 10 to the motor-inverter 7. The load power switching unit 31C is provided between the power storage unit 10 and the motor-inverter 7. The load power switching unit 31C conducts or shuts off a current that flows from the power storage unit 10 to the motor-inverter 7.

The load power switching unit 31D switches power supplied from the power storage unit 10 to a high-voltage load unit 8. The high-voltage load unit 8 is, for example, an electric air conditioner (A/C) compressor or a positive temperature coefficient (PTC) heater. The load power switching unit 31D is provided between the power storage unit 10 and the high-voltage load unit 8. The load power switching unit 31D conducts or shuts off a current that flows from the power storage unit 10 to the high-voltage load unit 8.

The charge switching unit 40B switches a connection circuit of the first and second high-voltage batteries 11 and 12. The charge switching unit 40B switches the connection circuit, for example, into the series circuit P (refer to FIG. 26) that connects the first high-voltage battery 11 to the second high-voltage battery 12 in series, or into the parallel circuit Q (refer to FIG. 27) that connects the first high-voltage battery 11 to the second high-voltage battery 12 in parallel.

The charge switching unit 40B includes the charging relay 41a, the charging relay 41b, the charging relay 41c, a voltage monitoring unit 33, the FET 41e serving as a first switch for constant current, the FET 41f serving as a second switch for constant current, drive circuits 41g and 41h, and the controller 50. The charging relays 41a to 41c conduct or shut off currents. The charging relay 41a forms the series circuit P, and is provided between the positive electrode of the second high-voltage battery 12 and the negative electrode of the first high-voltage battery 11. The charging relay 41a conducts or shuts off the current that flows from the second high-voltage battery 12 to the first high-voltage battery 11.

Figure 26:
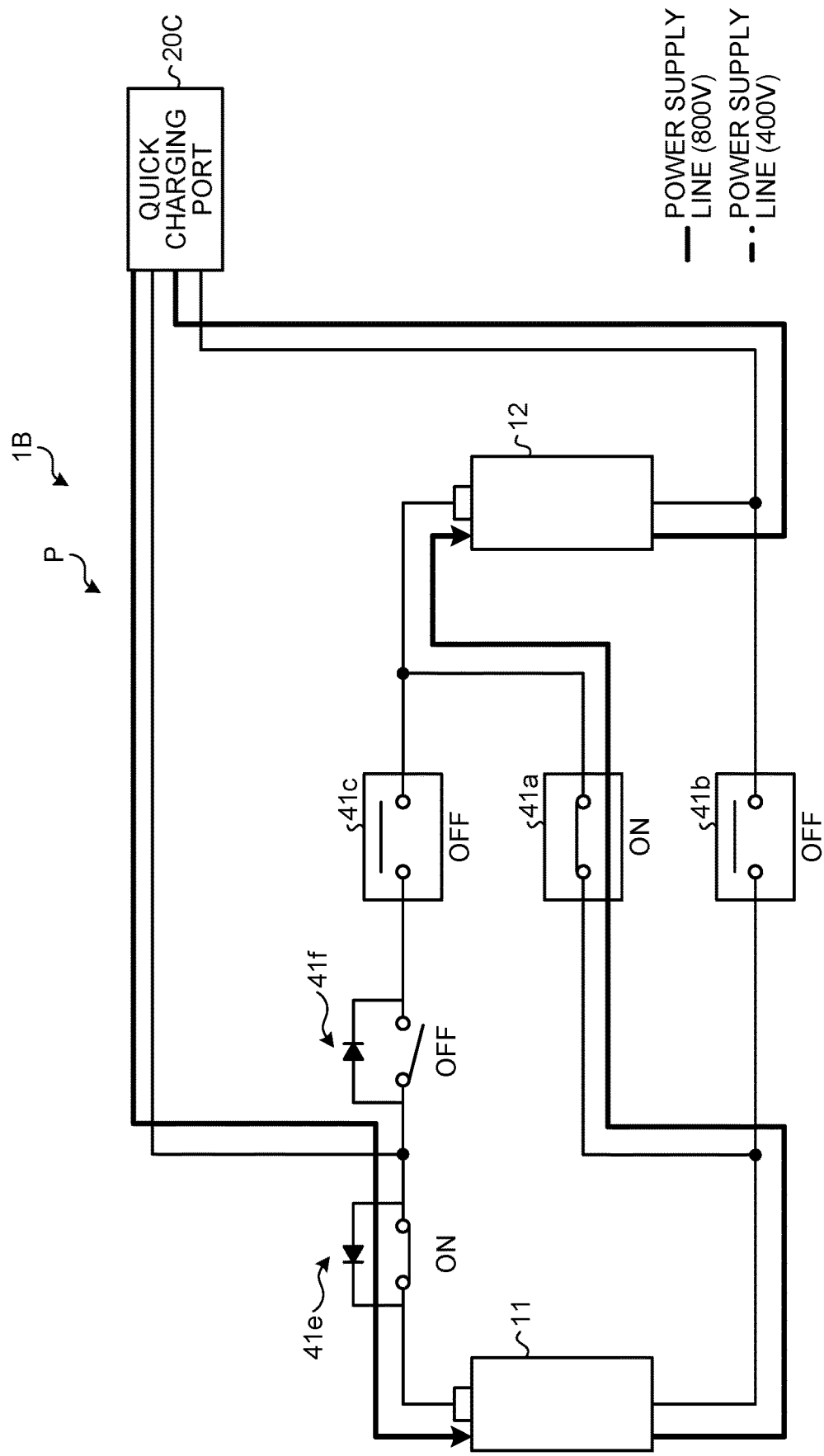
FIG. 26 is a circuit diagram illustrating an operation example of the power supply system according to the third embodiment during the super-quick charging.

The series circuit P is a circuit that connects the first high-voltage battery 11 to the second high-voltage battery 12 in series. In the series circuit P, for example, as illustrated in FIG. 26, a positive electrode of the quick charging port 20C is connected to the positive electrode of the first high-voltage battery 11; the negative electrode of the first high-voltage battery 11 is connected to the positive electrode of the second high-voltage battery 12 through the charging relay 41a; and the negative electrode of the second high-voltage battery 12 is connected to a negative electrode of the quick charging port 20C.

The charging relay 41b forms the parallel circuit Q, and is provided between the negative electrode of the first high-voltage battery 11 and the negative electrode of the quick charging port 20C. The charging relay 41b conducts or shuts off a current that flows from the negative electrode of the first high-voltage battery 11 to the negative electrode of the quick charging port 20C.

The charging relay 41c forms the parallel circuit Q, and is provided between the positive electrode of the quick charging port 20C and the positive electrode of the second high-voltage battery 12. The charging relay 41c conducts or shuts off a current that flows from the positive electrode of the quick charging port 20C to the positive electrode of the second high-voltage battery 12.

The voltage monitoring unit 33 monitors voltages of the series circuit P and the parallel circuit Q. The voltage monitoring unit 33 is connected in parallel to the first high-voltage battery 11 and the second high-voltage battery 12 constituting the series circuit P. The voltage monitoring unit 33 detects a voltage applied from the quick charging port 20C to the series circuit P. The voltage monitoring unit 33 is also connected in parallel to the first high-voltage battery 11 and the second high-voltage battery 12 constituting the parallel circuit Q. The voltage monitoring unit 33 detects a voltage applied from the quick charging port 20C to the parallel circuit Q. The voltage monitoring unit 33 is connected to the controller 50, and outputs the detected voltages to the controller 50.

The FETs 41e and 41f conduct or shut off currents. The FETs 41e and 41f are, for example, n-channel metal-oxide semiconductor (MOS) FETs, but are not limited thereto. The FET 41e is provided between the positive electrode of the first high-voltage battery 11 and the quick charging port 20C. During the charging, the FET 41e is turned on by the drive circuit 41g to conduct a current that flows from the quick charging port 20C to the positive electrode of the first high-voltage battery 11. During the charging, the FET 41e is turned off by the drive circuit 41g to shut off a current that flows from the positive electrode of the first high-voltage battery 11 back to the quick charging port 20C.

The FET 41e is also disposed between the positive electrode of the first high-voltage battery 11 and the high-voltage load unit 8. During the discharging, the FET 41e is turned on by the drive circuit 41g to conduct a current that flows from the first high-voltage battery 11 to the high-voltage load unit 8. During the discharging, the FET 41e is turned off by the drive circuit 41g to shut off the current that flows from the first high-voltage battery 11 to the high-voltage load unit 8.

The FET 41f is provided between the positive electrode of the second high-voltage battery 12 and the quick charging port 20C. During the charging, the FET 41f is turned on by the drive circuit 41h to conduct a current that flows from the quick charging port 20C to the positive electrode of the second high-voltage battery 12. During the charging, the FET 41f is turned off by the drive circuit 41h to shut off a current that flows from the positive electrode of the second high-voltage battery 12 back to the quick charging port 20C.

The FET 41f is also disposed between the positive electrode of the second high-voltage battery 12 and the high-voltage load unit 8. During the discharging, the FET 41f is turned on by the drive circuit 41h to conduct a current that flows from the second high-voltage battery 12 to the high-voltage load unit 8. During the discharging, the FET 41f is turned off by the drive circuit 41h to shut off the current that flows from the second high-voltage battery 12 to the high-voltage load unit 8.

The drive circuit 41g controls driving of the FET 41e. The drive circuit 41g is connected to the controller 50 and the FET 41e, and turns on or off the FET 41e based on a control signal output from the controller 50.

The drive circuit 41h controls driving of the FET 41f. The drive circuit 41h is connected to the controller 50 and the FET 41f, and turns on or off the FET 41f based on a control signal output from the controller 50.

The controller 50 controls the charging relays 41a to 41c and the drive circuits 41g and 41h. The controller 50 controls the charging relays 41a to 41c and the drive circuits 41g and 41h based on, for example, the monitoring results of the first high-voltage battery 11 output from the BMS 13A, the monitoring results of the second high-voltage battery 12 output from the BMS 14A, and the detection voltages detected by the voltage monitoring unit 33.

Figure 23:
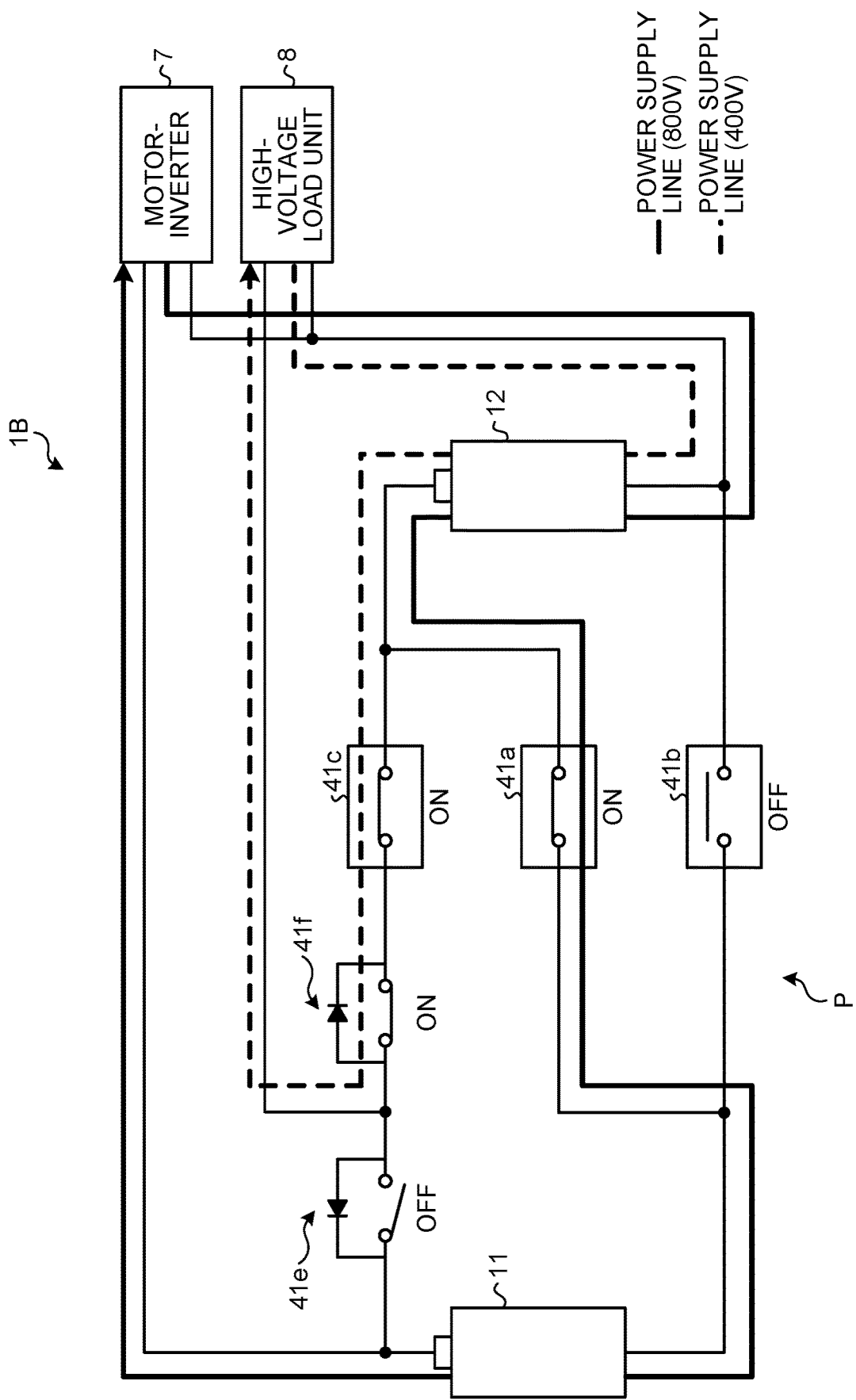
FIG. 23 is a circuit diagram illustrating an operation example (No. 1) of the power supply system according to the third embodiment during the vehicle traveling.

FIG. 23 is a circuit diagram illustrating an operation example (No. 1) of the power supply system 1B according to the third embodiment during the vehicle traveling. As illustrated in FIG. 23, when supplying the power to the motor-inverter 7 having a load voltage of approximately 800 V (second voltage) during the vehicle traveling, the controller 50 controls the charge switching unit 40B to form the series circuit P including the first high-voltage battery 11 and the second high-voltage battery 12. Specifically, the controller 50 forms the series circuit P by turning on the charging relays 41a and 41c and the FET 41f and turning off the charging relay 41b and the FET 41e. The controller 50 supplies the power from the first high-voltage battery 11 and the second high-voltage battery 12 constituting the series circuit P to the motor-inverter 7 using a power supply line of 800 V. FIG. 30 illustrates the on/off relations among the charging relays 41a, 41b, and 41c and FETs 41e and 41f in the case of driving the 800-V motor during the vehicle traveling.

In the example illustrated in FIG. 23, the controller 50 supplies the power to the motor-inverter 7 having the load voltage of approximately 800 V, and also simultaneously supplies the power to the high-voltage load unit 8 having a load voltage of approximately 400 V (first voltage). Specifically, the controller 50 connects the series circuit P to the motor-inverter 7 to supply the power from the first high-voltage battery 11 and the second high-voltage battery 12 constituting the series circuit P to the motor-inverter 7, and connects the second high-voltage battery 12 to the high-voltage load unit 8 to supply the power from the second high-voltage battery 12 to the high-voltage load unit 8 using a power supply line of 400 V.

Figure 24:
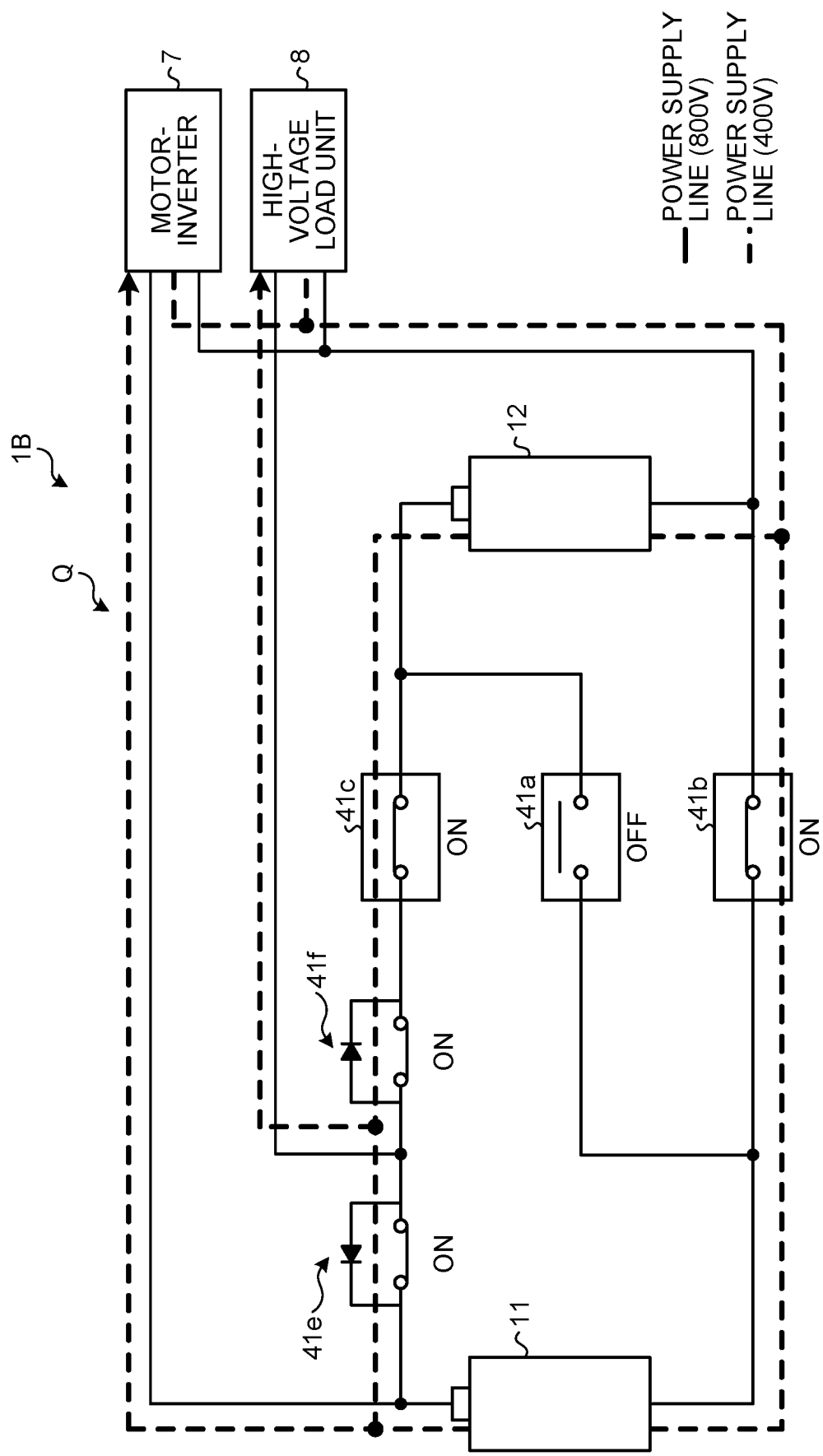
FIG. 24 is a circuit diagram illustrating an operation example (No. 2) of the power supply system according to the third embodiment during the vehicle traveling.

FIG. 24 is a circuit diagram illustrating an operation example (No. 2) of the power supply system 1B according to the third embodiment during the vehicle traveling. This example assumes that the load voltages of the motor-inverter 7 and the high-voltage load unit 8 are both 400 V. In this case, the controller 50 controls the charge switching unit 40B to form the parallel circuit Q including the first high-voltage battery 11 and the second high-voltage battery 12. Specifically, the controller 50 forms the parallel circuit Q by turning off the charging relay 41a and turning on the charging relays 41b and 41c and the FETs 41e and 41f. The controller 50 supplies the power from the first high-voltage battery 11 and the second high-voltage battery 12 constituting the parallel circuit Q to the motor-inverter 7 and the high-voltage load unit 8 using power supply lines of 400 V. FIG. 30 illustrates the on/off relations among the charging relays 41a, 41b, and 41c and FETs 41e and 41f in the case of driving the 400-V motors during the vehicle traveling.

Figure 25:
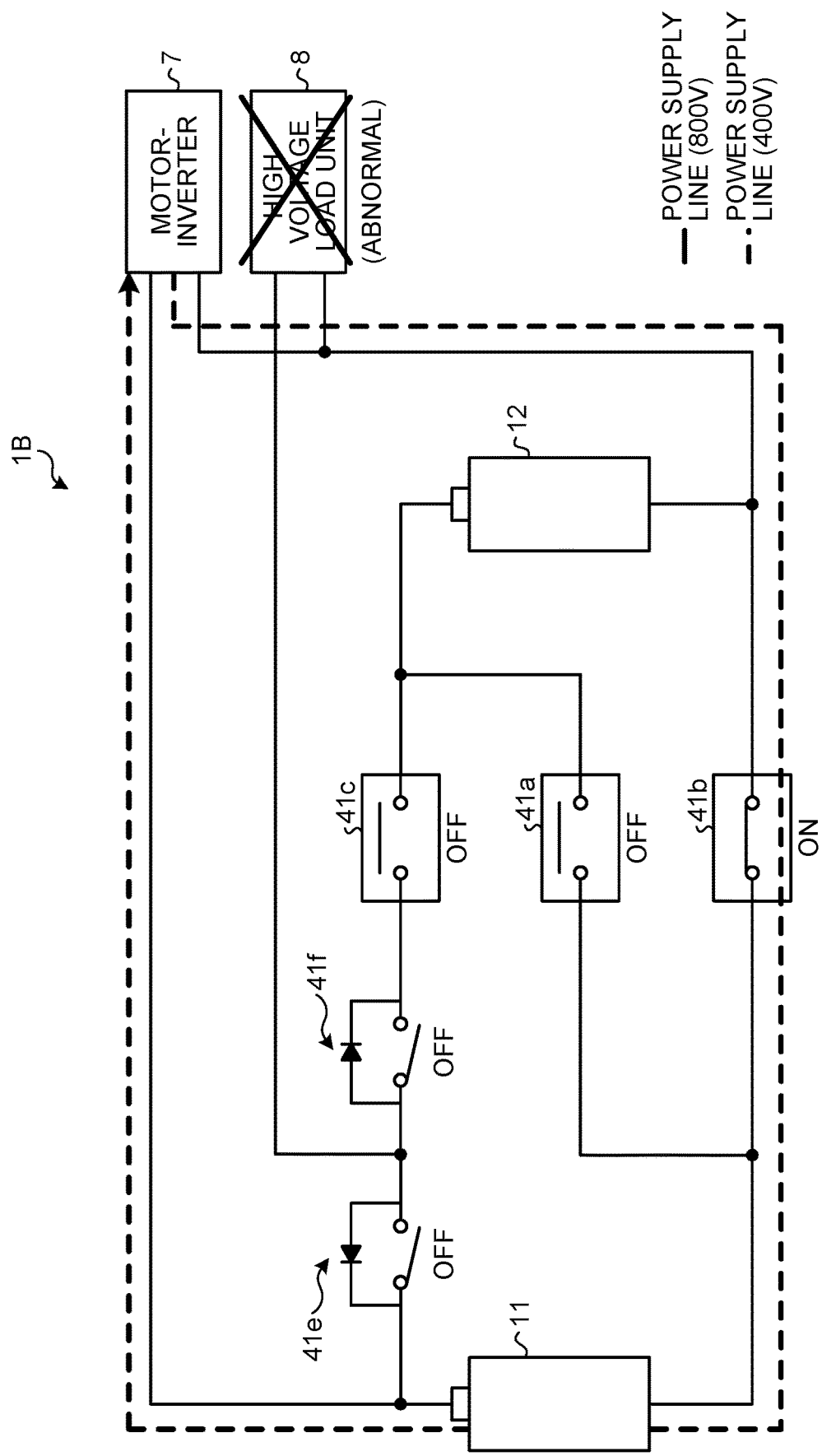
FIG. 25 is a circuit diagram illustrating an operation example (No. 3) of the power supply system according to the third embodiment during the vehicle traveling.

FIG. 25 is a circuit diagram illustrating an operation example (No. 3) of the power supply system 1B according to the third embodiment during the vehicle traveling. This example assumes that the load voltages of the motor-inverter 7 and the high-voltage load unit 8 are both 400 V, and an abnormality has occurred in the high-voltage load unit 8. In this case, the controller 50 stops supplying the power to the abnormal high-voltage load unit 8, and continues to supply the power to the motor-inverter 7 using the power supply line of 400 V. Specifically, in the state of the parallel circuit Q in FIG. 24, the controller 50 turns off the charging relay 41c and the FET 41f to stop supplying the power from the second high-voltage battery 12 to the high-voltage load unit 8, and turns off the FET 41e to stop supplying the power from the first high-voltage battery 11 to the high-voltage load unit 8 (refer to FIG. 25). Through this operation, the power supply system 1B can continue to supply the power to the motor-inverter 7 in the state of stopping supplying the power to the high-voltage load unit 8. Thus, the power supply system 1B can reduce an influence on the motor (for example, a rapid decline in the power supply voltage) for driving the vehicle, and can reduce a drop in reliability of the traveling of the vehicle.

FIG. 26 is a circuit diagram illustrating an operation example of the power supply system 1B according to the third embodiment during the super-quick charging. For example, when performing the super-quick charging (for example, 800-V charging), the controller 50 controls the charge switching unit 40B to form the series circuit P. For example, as illustrated in FIG. 26, the controller 50 forms the series circuit P by turning on the charging relay 41a and the FET 41e and turning off the charging relays 41b and 41c and the FET 41f. The power supply system 1B turns on the main switching unit 32C to electrically connect the series circuit P to the quick charging port 20C so as to charge the first high-voltage battery 11 and the second high-voltage battery 12 with the power supplied from the quick charging port 20C using a power supply line of 800 V. FIG. 30 illustrates the on/off relations among the charging relays 41a, 41b, and 41c and FETs 41e and 41f during the super-quick charging (800-V charging).

Figure 27:
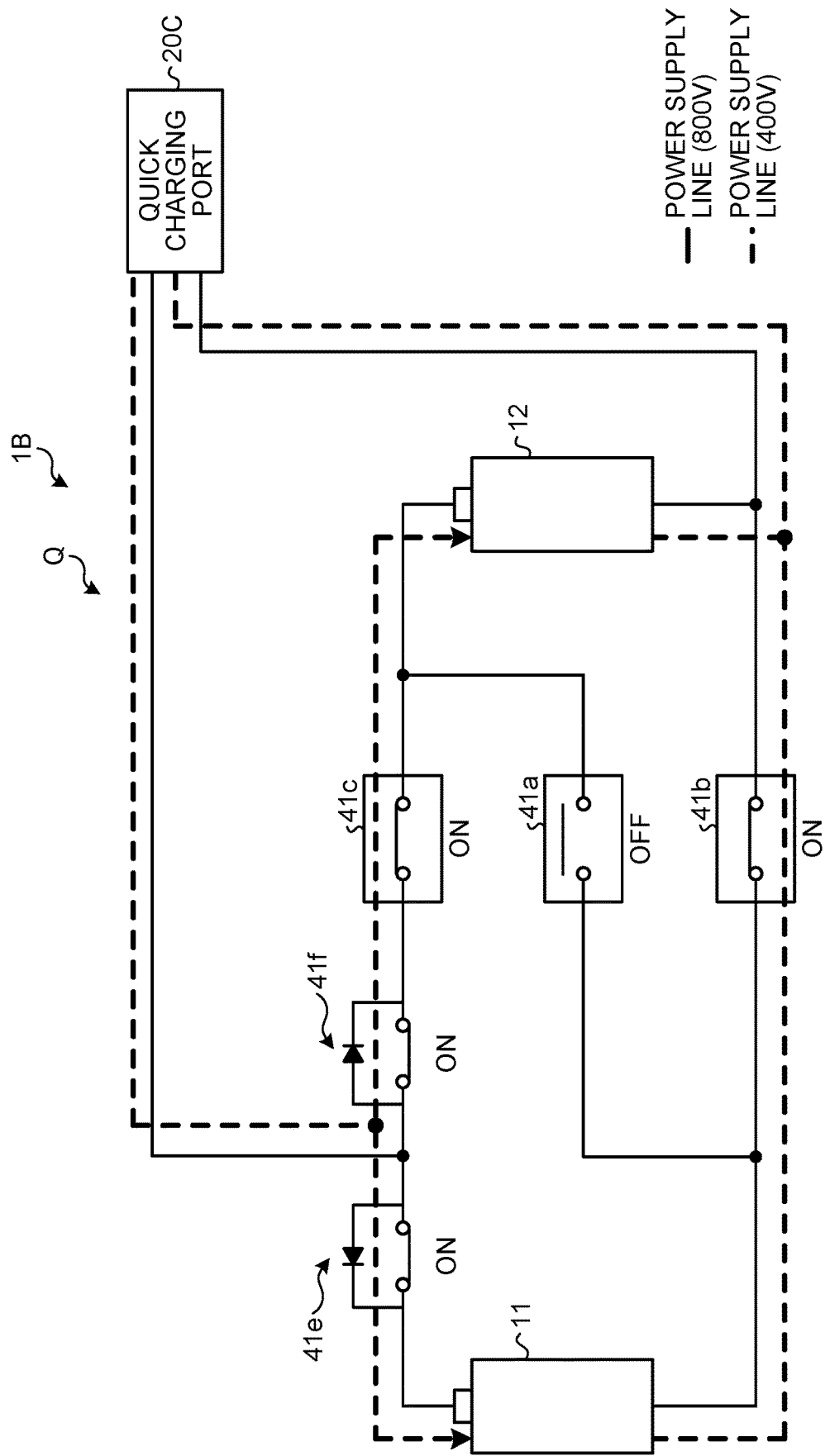
FIG. 27 is a circuit diagram illustrating an operation example (No. 1) of the power supply system according to the third embodiment during the quick charging.

FIG. 27 is a circuit diagram illustrating an operation example (No. 1) of the power supply system 1B according to the third embodiment during the quick charging. For example, when performing the quick charging (for example, 400-V charging), the controller 50 controls the charge switching unit 40B to form the parallel circuit Q. For example, as illustrated in FIG. 27, the controller 50 forms the parallel circuit Q by turning on the charging relays 41b and 41c and the FETs 41e and 41f and turning off the charging relay 41a. The power supply system 1B turns on the main switching unit 32C to electrically connect the parallel circuit Q of the charge switching unit 40B to the quick charging port 20C so as to charge the first high-voltage battery 11 and the second high-voltage battery 12 with the power supplied from the quick charging port 20C using power supply lines of 400 V. FIG. 30 illustrates the on/off relations among the charging relays 41a, 41b, and 41c and FETs 41e and 41f during the quick charging (400 V charging).

Figure 28:
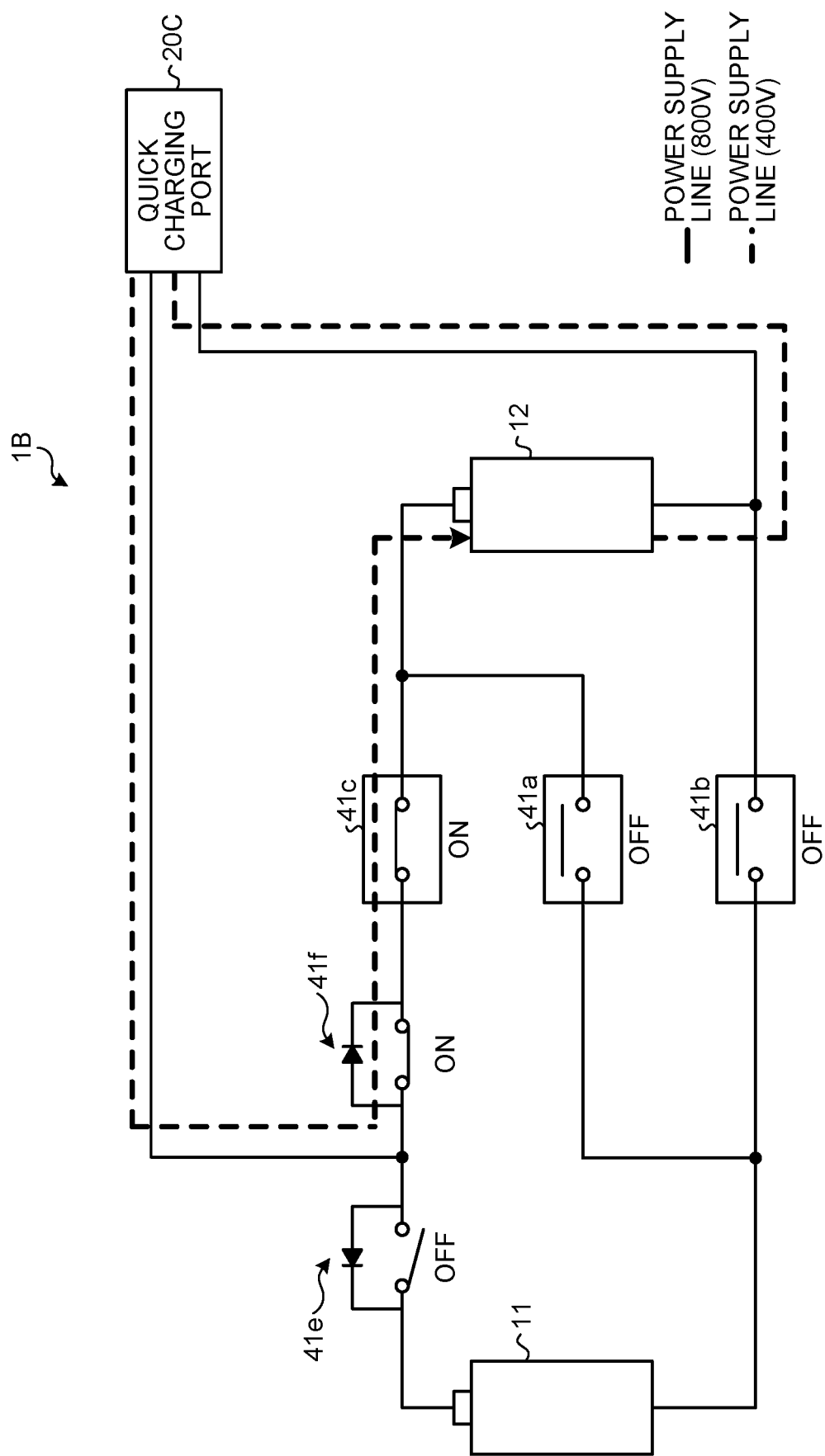
FIG. 28 is a circuit diagram illustrating an operation example (No. 2) of the power supply system according to the third embodiment during the quick charging.

FIG. 28 is a circuit diagram illustrating an operation example (No. 2) of the power supply system 1B according to the third embodiment during the quick charging. For example, when a difference has been generated between the amounts of charge of the first and second high-voltage batteries 11 and 12, the controller 50 needs to preferentially charge one of the batteries to eliminate the difference. For example, when the amount of charge of the second high-voltage battery 12 is smaller than that of the first high-voltage battery 11, the controller 50 turns on the charging relay 41c and the FET 41f, and turns off the charging relays 41a and 41b and the FET 41e, as illustrated in FIG. 28. The power supply system 1B turns on the main switching unit 32C to electrically connect the second high-voltage battery 12 to the quick charging port 20C so as to charge the second high-voltage battery 12 with the power supplied from the quick charging port 20C using the power supply line of 400 V. At this time, since the first high-voltage battery 11 is not electrically connected to the quick charging port 20C, the power supply system 1B does not charge the first high-voltage battery 11 with the power supplied from the quick charging port 20C. The power supply system 1B may perform the control to eliminate the difference between the amounts of charge not only during the above-described quick charging, but also during a regenerative operation to recover energy during vehicle deceleration.

Figure 29:
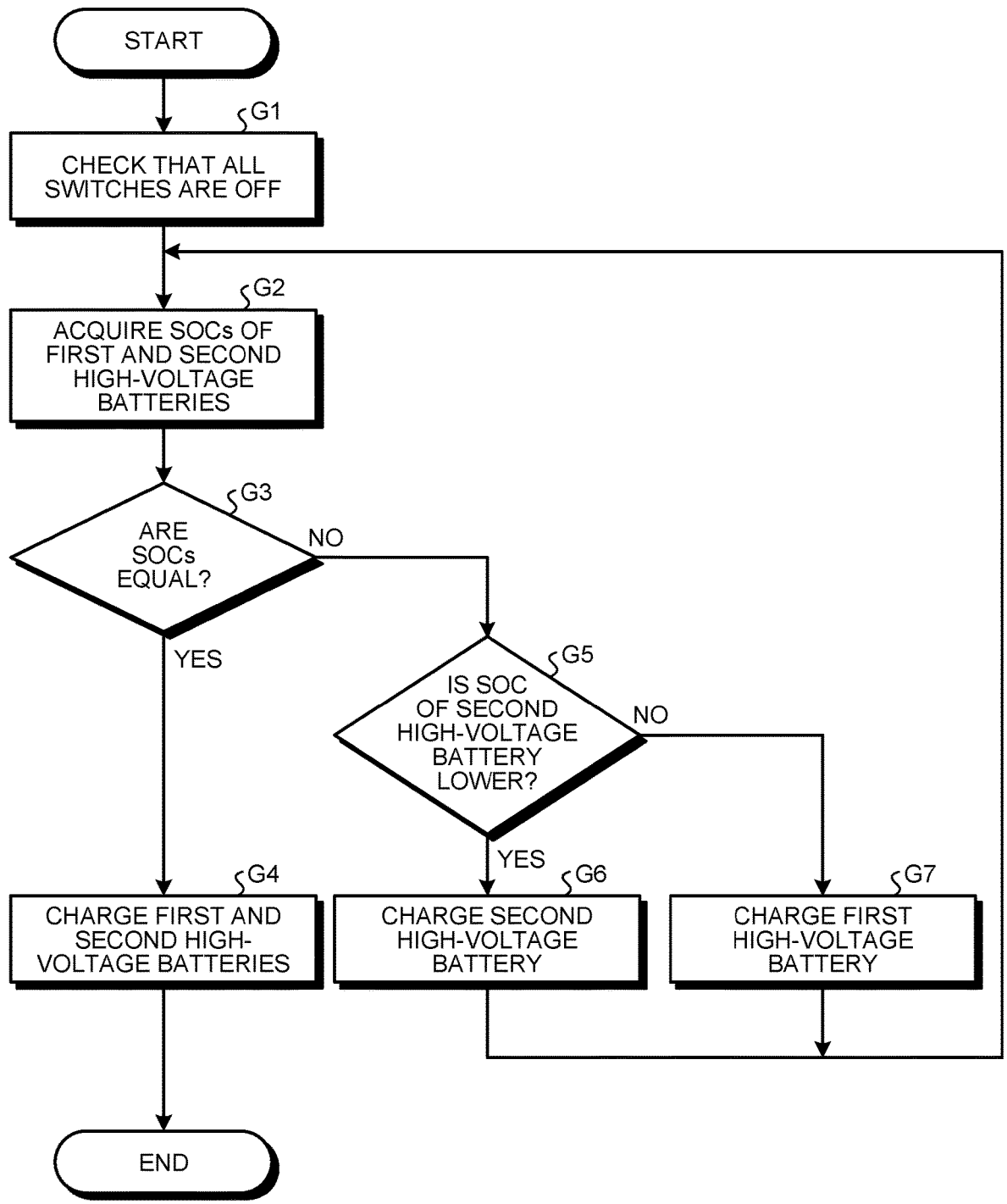
FIG. 29 is a flowchart illustrating the operation examples of the power supply system according to the third embodiment during the quick charging.

FIG. 29 is a flowchart illustrating the operation examples of the power supply system 1B according to the third embodiment during the quick charging. As illustrated in FIG. 29, the controller 50 checks that all the switches are off (Step G1). Then, the controller 50 acquires the states of charge (SOCs) of the first and second high-voltage batteries 11 and 12 (Step G2). Then, the controller 50 determines whether the state of charge of the first high-voltage battery 11 is equal to that of the second high-voltage battery 12 (Step G3). If so (Yes at Step G3), the controller 50 forms the parallel circuit Q, and charges the first and second high-voltage batteries 11 and 12 (Step G4). If not (No at Step G3), the controller 50 determines whether the state of charge of the second high-voltage battery 12 is lower than that of the first high-voltage battery 11 (Step G5). If so (Yes at Step G5), the controller 50 charges the second high-voltage battery 12 without charging the first high-voltage battery 11 (Step G6), as illustrated in FIG. 28. If, instead, the state of charge of the first high-voltage battery 11 is lower than that of the second high-voltage battery 12 (No at Step G5), the controller 50 charges the first high-voltage battery 11 without charging the second high-voltage battery 12 (Step G7).

Figure 31:
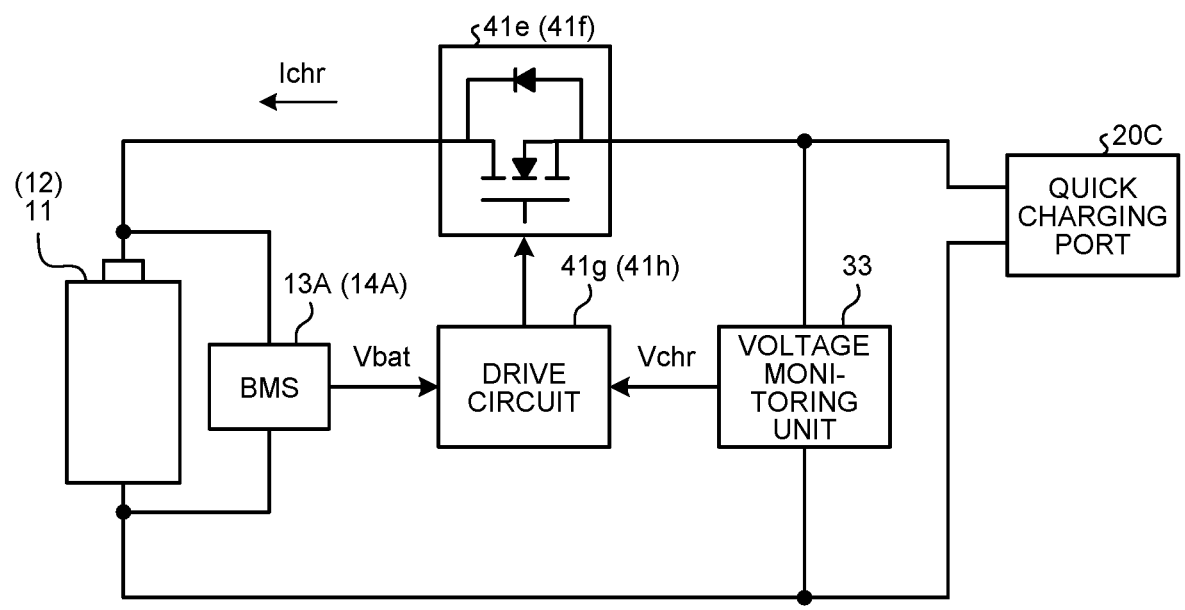
FIG. 31 is a circuit diagram illustrating a diode operation of a field-effect transistor (FET) according to the third embodiment.
Figure 32:
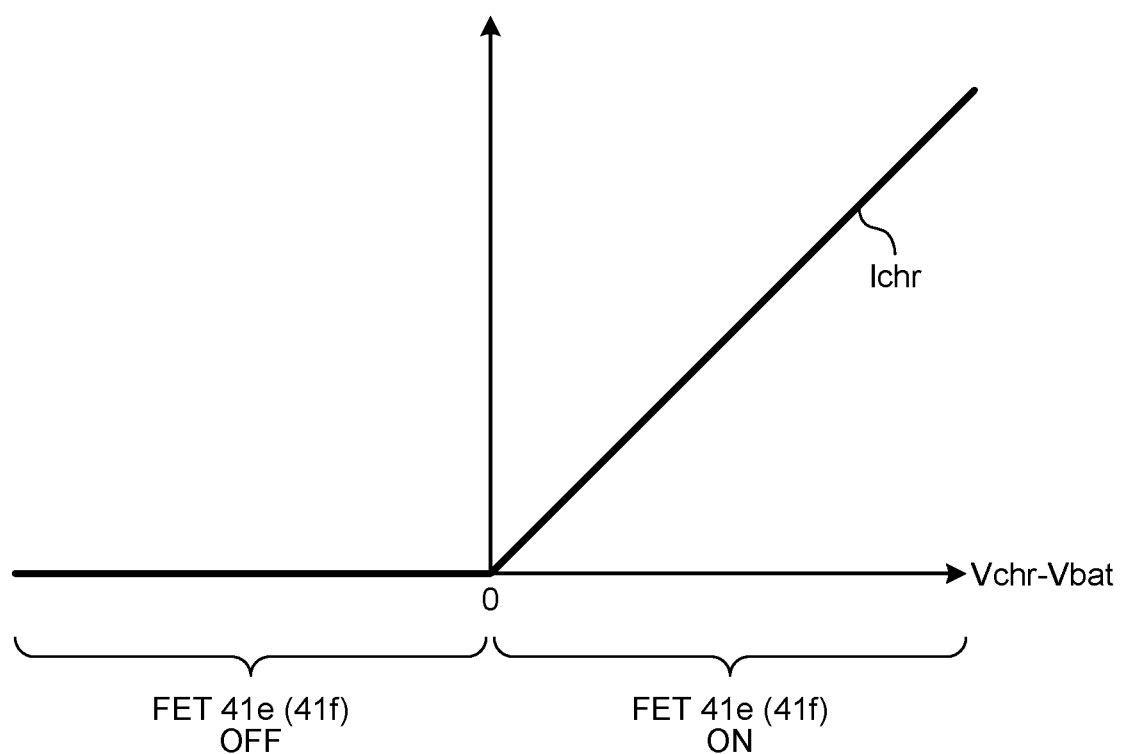
FIG. 32 is a diagram illustrating the diode operation of the FET according to the third embodiment.

FIG. 31 is a circuit diagram illustrating a diode operation of each of the FET 41e and the FET 41f according to the third embodiment. FIG. 32 is a diagram illustrating the diode operation of each of the FET 41e and the FET 41f according to the third embodiment. As illustrated in FIGS. 31 and 32, the controller 50 monitors a voltage Vbat of each of the first and second high-voltage batteries 11 and 12 and a charging voltage Vchr applied from the quick charging port 20C, and, if the voltage Vbat of either one or both of the first and second high-voltage batteries 11 and 12 is lower than the charging voltage Vchr, turns on corresponding one or both of the FETs 41e and 41f, or if the voltage Vbat of either one or both of the first and second high-voltage batteries 11 and 12 is higher than the charging voltage Vchr, turns off corresponding one or both of the FETs 41e and 41f. With this configuration, the controller 50 can cause a charging current Ichr to flow from the quick charging port 20C to each of the first and second high-voltage batteries 11 and 12, and can shut off a current that flows from the positive electrode of each of the first and second high-voltage batteries 11 and 12 back to the quick charging port 20C.

Figure 33:
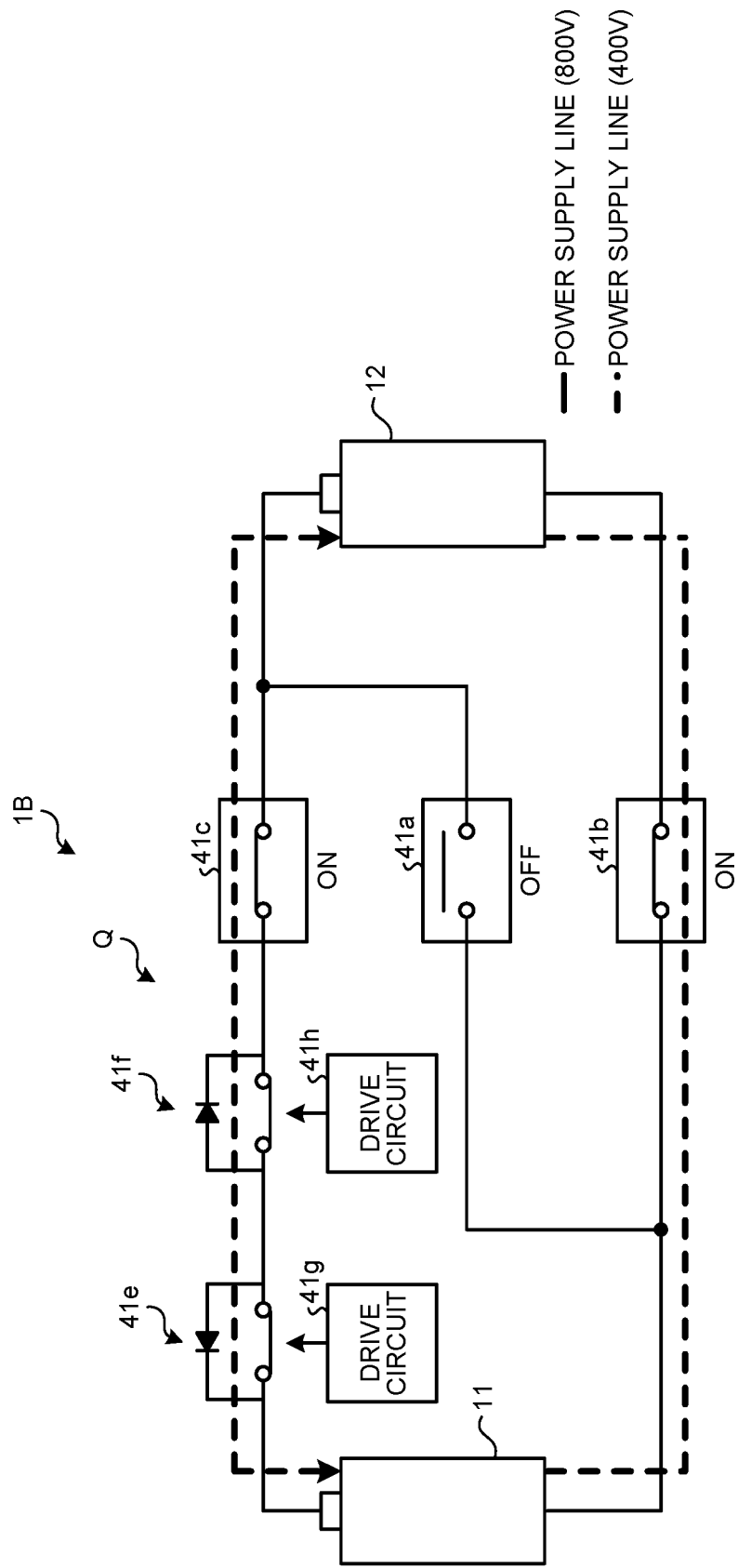
FIG. 33 is a circuit diagram illustrating processing of equalizing states of charge according to the third embodiment.
Figure 34:
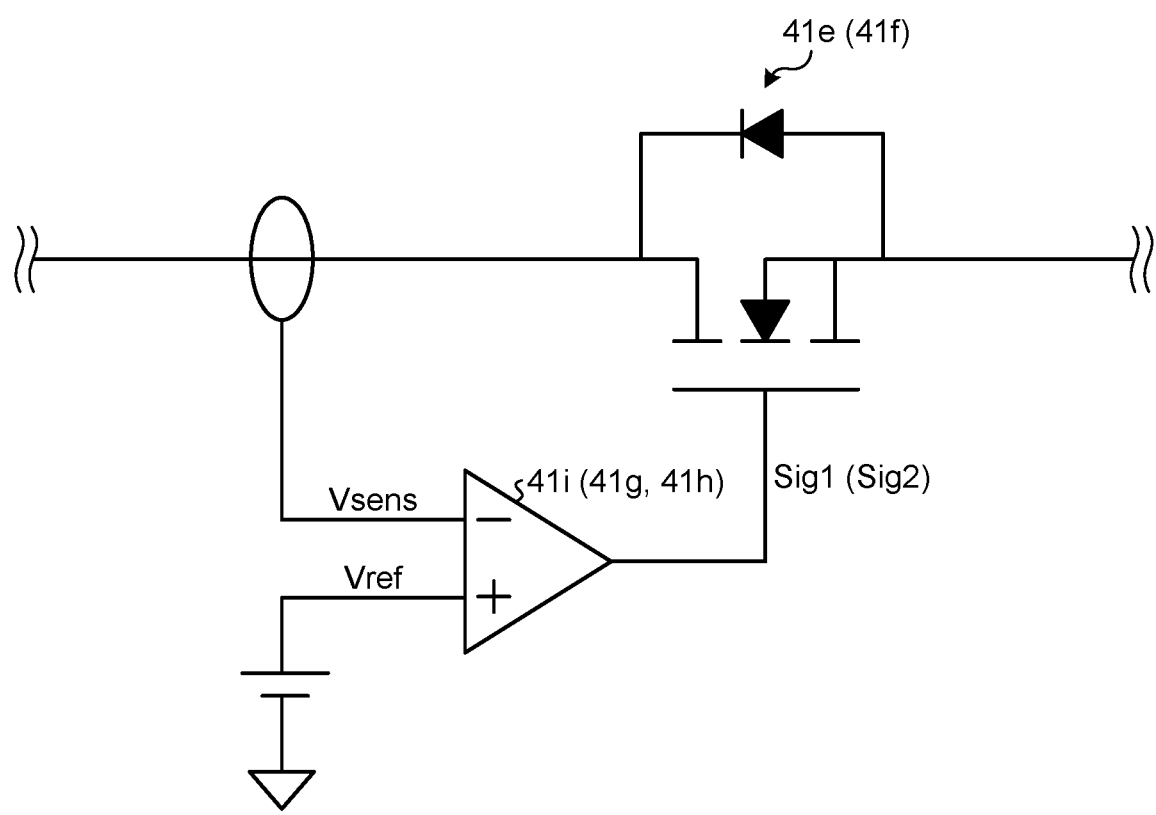
FIG. 34 is a circuit diagram illustrating a configuration example of a constant current circuit according to the third embodiment.
Figure 35:
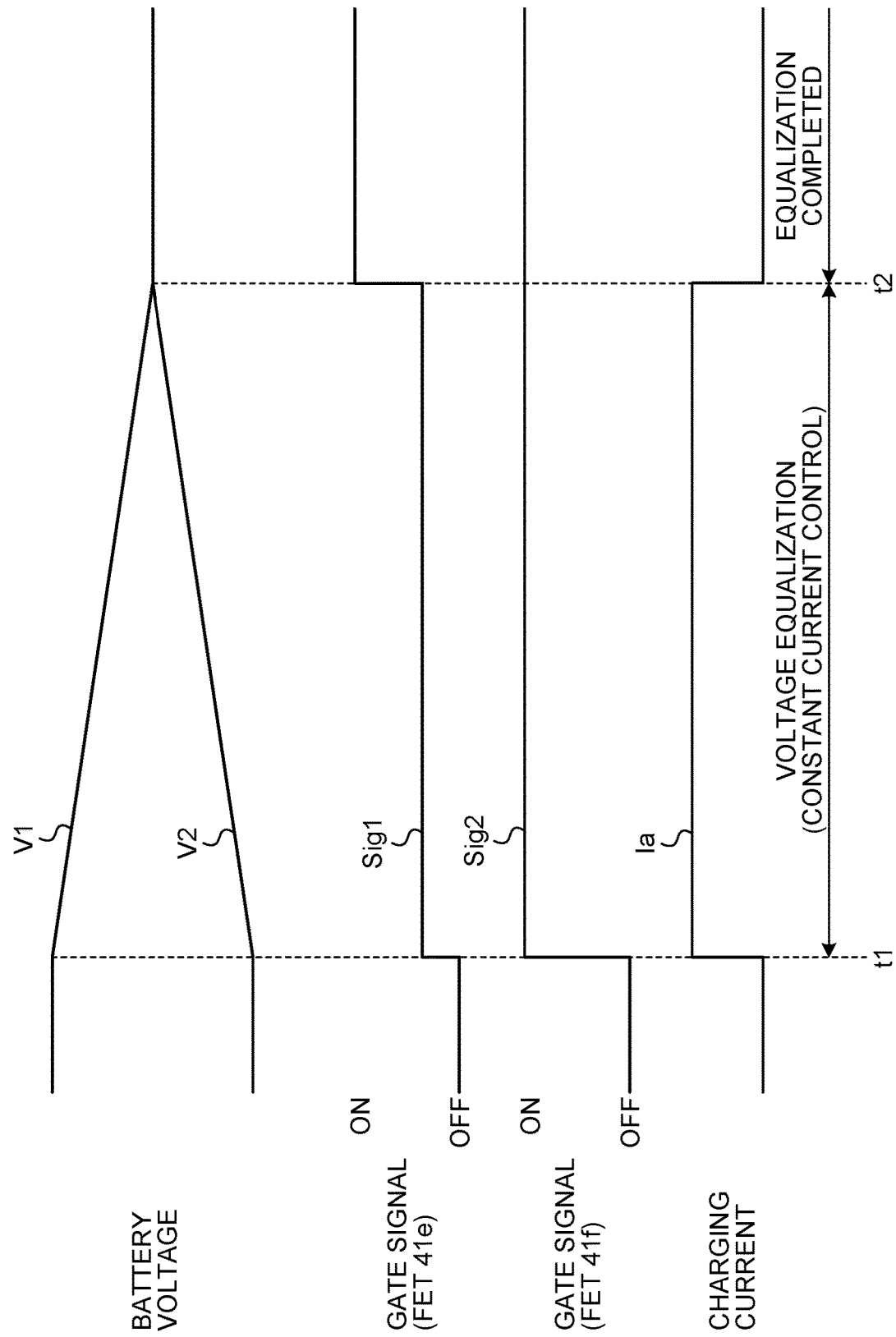
FIG. 35 is a sequence diagram illustrating the processing of equalizing the states of charge according to the third embodiment.

FIG. 33 is a circuit diagram illustrating the processing of equalizing the states of charge according to the third embodiment. FIG. 34 is a circuit diagram illustrating a configuration example of a constant current circuit according to the third embodiment. FIG. 35 is a sequence diagram illustrating the processing of equalizing the states of charge according to the third embodiment. The controller 50 equalizes the states of charge of the first high-voltage battery 11 and the second high-voltage battery 12 except during the vehicle traveling and during the battery charging. For example, as illustrated in FIG. 33, the controller 50 forms the parallel circuit Q by turning on the charging relays 41b and 41c and turning off the charging relay 41a, and performs the bidirectional constant current control using the FETs 41e and 41f. The FET 41e regulates a current that flows from the first high-voltage battery 11 to the second high-voltage battery 12. The FET 41f regulates a current that flows from the second high-voltage battery 12 to the first high-voltage battery 11. FIG. 30 illustrates the on/off relations among the charging relays 41a, 41b, and 41c and FETs 41e and 41f during the battery voltage equalization.

Each of the drive circuits 41g and 41h includes a comparator circuit 41i (refer to FIG. 34). The comparator circuit 41i outputs a gate signal Sig1 or Sig2 to each of the FETs 41e and 41f based on a result obtained by comparing a detection voltage Vsens obtained by converting a current value of a current flowing between the first high-voltage battery 11 and the second high-voltage battery 12 into a voltage value with a preset reference voltage Vref.

For example, as illustrated in FIG. 35, if, at time t1, the voltage V1 of the first high-voltage battery 11 is higher than the voltage V2 of the second high-voltage battery 12, the comparator circuit 41i outputs the gate signal Sig2 to the FET 41f to fully turn on the FET 41f. The comparator circuit 41i outputs the gate signal Sig1 having an on-voltage lower than that of the gate signal Sig2 to the FET 41e, and the FET 41e performs the constant current control (voltage equalization) to keep a charging current Ia flowing from the first high-voltage battery 11 to the second high-voltage battery 12 constant. If, at time t2, the voltage V1 of the first high-voltage battery 11 is equal to the voltage V2 of the second high-voltage battery 12, the comparator circuit 41i fully turns on the FET 41e to complete the voltage equalization processing.

As described above, in the power supply system 1B, when supplying the power to the high-voltage load unit 8 of 400 V, the controller 50 controls the charge switching unit 40B to form the parallel circuit Q, and supplies the power from the first high-voltage battery 11 and the second high-voltage battery 12 to the high-voltage load unit 8 of 400 V. When supplying the power to the motor-inverter 7 of 800 V, the controller 50 controls the charge switching unit 40B to form the series circuit P, and supplies the power from the first high-voltage battery 11 and the second high-voltage battery 12 to the motor-inverter 7 of 800 V. With this configuration, in the case of using the two power supply voltages of 400 V and 800 V, the power supply system 1B can supply both power supply voltages to the respective load units by switching the switches, without the need for a DC/DC converter. As a result, the power supply system 1B can be simplified in system configuration, and can be improved in versatility.

In the power supply system 1B, the controller 50 controls the charge switching unit 40B to form the series circuit P so as to supply the power having the voltage of approximately 800 V from the first high-voltage battery 11 and the second high-voltage battery 12 to the motor-inverter 7, and supplies the power having the voltage of approximately 400 V from the second high-voltage battery 12 to the high-voltage load unit 8. This configuration allows the power supply system 1B to simultaneously supply the power supply voltage of 800 V and the power supply voltage of 400 V to the respective load units.

In the power supply system 1B, the charge switching unit 40B includes the FET 41e that regulates the current flowing from the first high-voltage battery 11 to the second high-voltage battery 12 and the FET 41f that regulates the current flowing from the second high-voltage battery 12 to the first high-voltage battery 11, when the parallel circuit Q is formed. This configuration allows the power supply system 1B to perform the constant current control using the FETs 41e and 41f. As a result, when the parallel circuit Q is formed, the power supply system 1B can restrain an excessive current from flowing due to a potential difference between the first high-voltage battery 11 and the second high-voltage battery 12, and can appropriately perform the voltage equalization of the batteries. The power supply system 1B can perform the voltage equalization of the batteries without using, for example, a resistor for limiting the current, and therefore can be reduced in number of parts. As a result, the power supply system 1B can restrain the system from increasing in size, and can reduce manufacturing cost.

Fourth Embodiment

Figure 36:
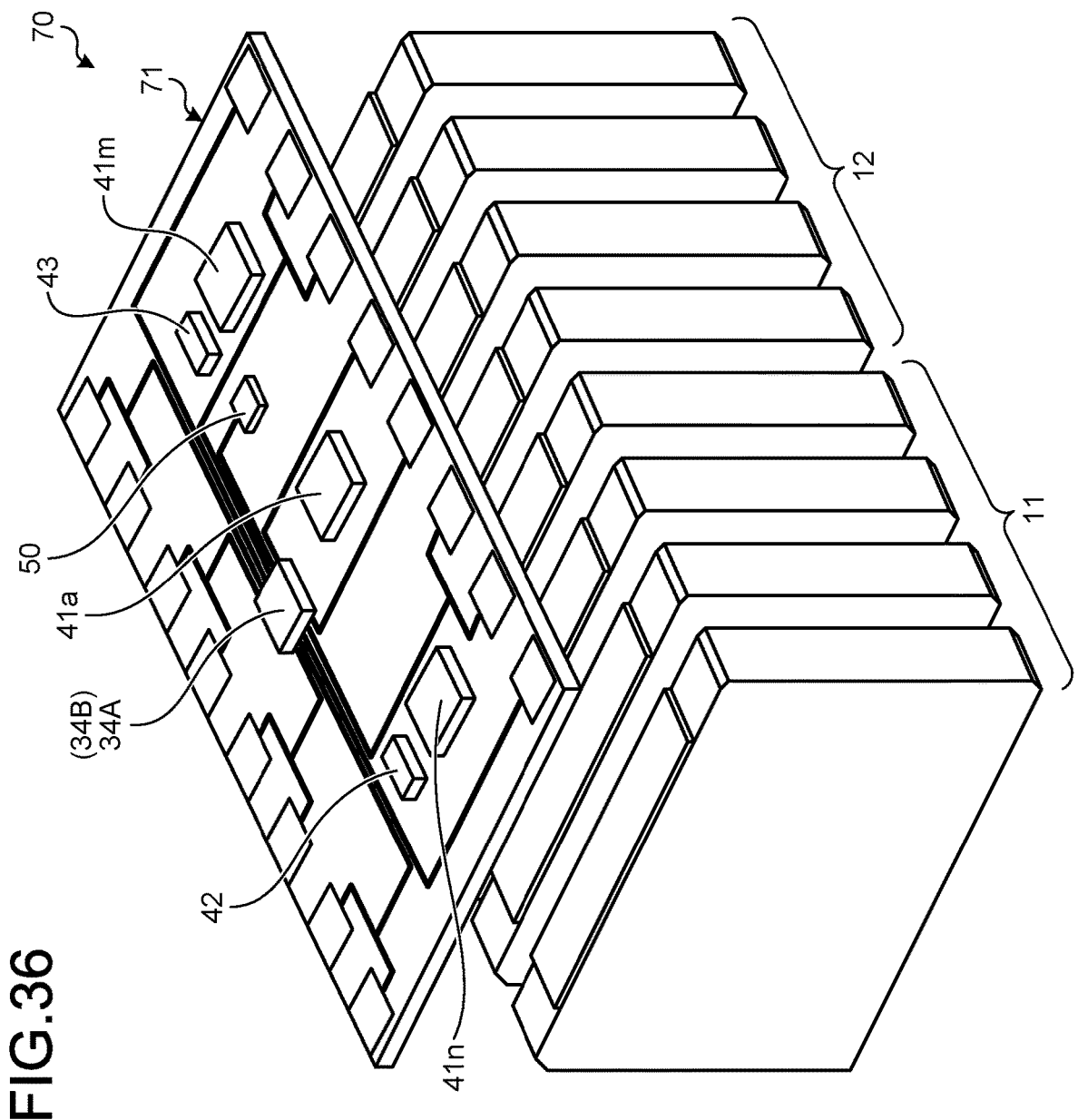
FIG. 36 is a perspective view illustrating a configuration example of a battery unit according to a fourth embodiment of the present invention.
Figure 37:
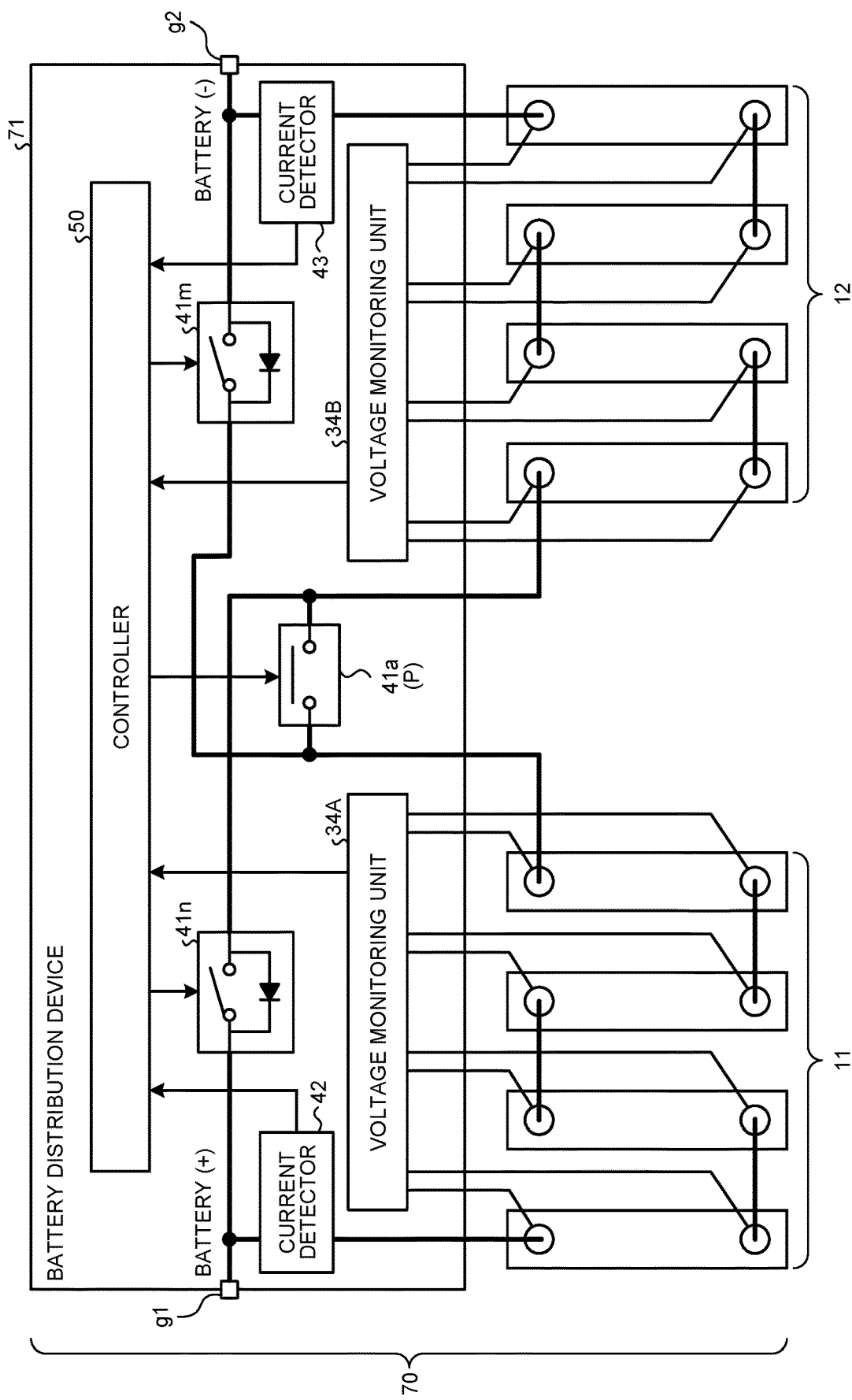
FIG. 37 is a circuit diagram illustrating the configuration example of the battery unit according to the fourth embodiment.
Figure 38:
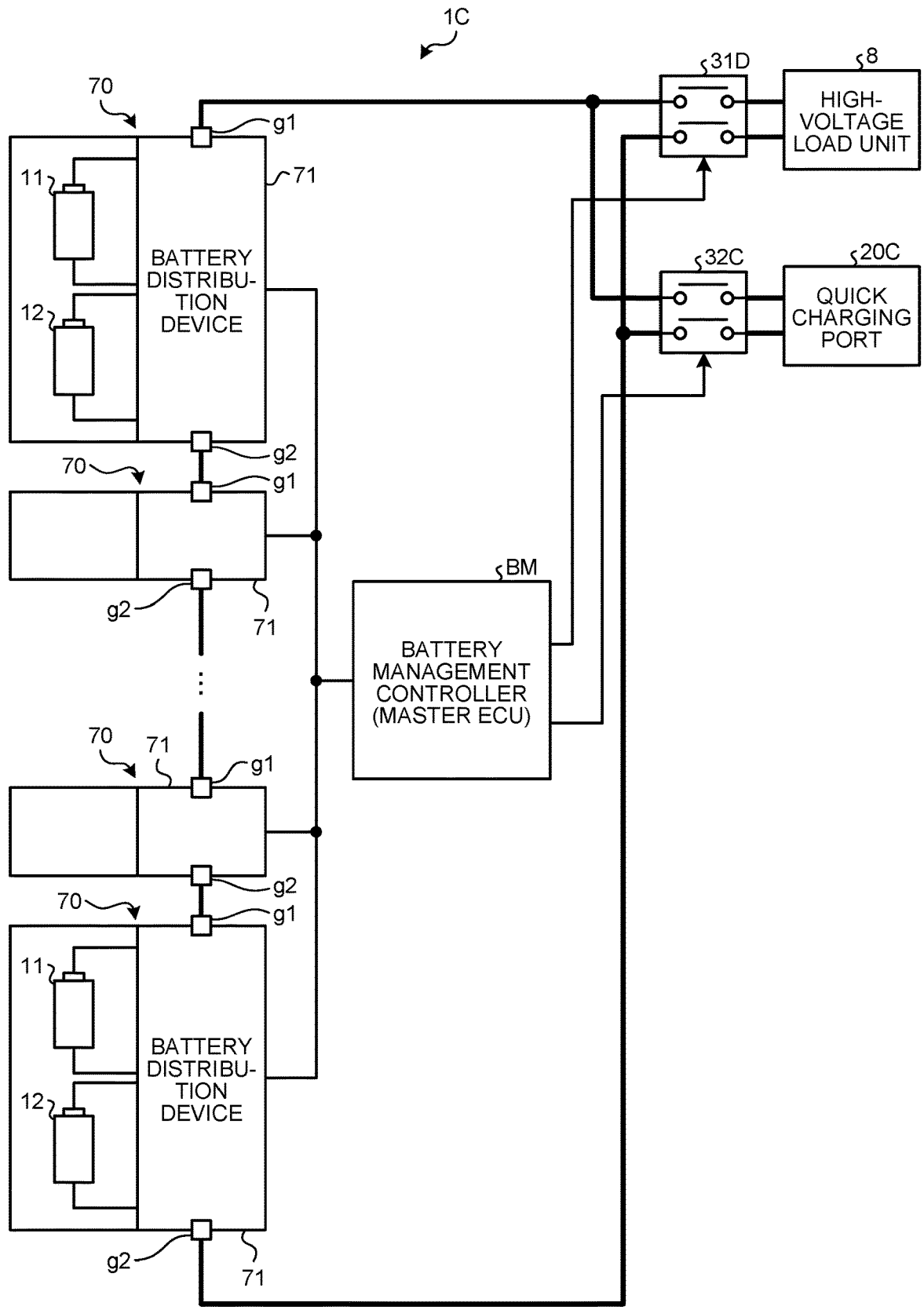
FIG. 38 is a block diagram illustrating a configuration example of a power supply system according to the fourth embodiment.

The following describes a power supply system 1C according to a fourth embodiment of the present invention. In the fourth embodiment, the same components as those of any one of the first and third embodiments are denoted by the same reference numerals as those of any one of the first and third embodiments, and will not be described in detail. FIG. 36 is a perspective view illustrating a configuration example of a battery unit 70 according to the fourth embodiment. FIG. 37 is a circuit diagram illustrating the configuration example of the battery unit 70 according to the fourth embodiment. FIG. 38 is a block diagram illustrating a configuration example of the power supply system 1C according to the fourth embodiment.

As illustrated in FIG. 38, the power supply system 1C includes a battery management controller (master ECU) BM, the load power switching unit 31D, the main switching unit 32C, the quick charging port 20C, and a plurality of the battery units 70. The power supply system 1C is constituted by the battery units 70 connected in series to one another, and supplies the power supply having a voltage according to specifications of various high-voltage load units (such as the motor for driving). The power supply system 1C supplies, for example, the voltage of 800 V by forming the series circuit P that connects the first and second high-voltage batteries 11 and 12 in series in each of the battery units 70. The power supply system 1C supplies the voltage of 400 V by forming the parallel circuit Q that connects the first and second high-voltage batteries 11 and 12 in parallel in each of the battery units 70. The power supply system 1C forms the series circuit P or the parallel circuit Q according to the input voltage supplied from the external charger, and charges the first and second high-voltage batteries 11 and 12.

The battery management controller BM controls the battery units 70. The battery management controller BM is connected to each of the battery units 70 so as to be capable of communicating therewith, acquires current values and voltage values from the battery units 70, and transmits control signals to the battery units 70 for controlling the charging relay 41a and FETs 41m and 41n of the battery units 70. The battery management controller BM controls the main switching unit 32C to turn on and off the electrical connection to the quick charging port 20C, and controls the load power switching unit 31D to turn on and off the electrical connection to the high-voltage load unit 8.

As illustrated in FIGS. 36 and 37, each of the battery units 70 includes the first high-voltage battery 11, the second high-voltage battery 12, and a battery distribution device 71. The battery distribution device 71 is connected to the first and second high-voltage batteries 11 and 12, and distributes the power to the first and second high-voltage batteries 11 and 12. The battery distribution device 71 is mounted on top surfaces of the first and second high-voltage batteries 11 and 12. The battery distribution device 71 includes a positive terminal g1 and a negative terminal g2 that serve as the first input unit, the charging relay 41a, the FET 41m, and the FET 41n that serve as the switching unit, the current detectors 42 and 43, voltage monitoring units 34A and 34B, and the controller 50.

The positive terminal g1 is connected to the positive electrode of the first high-voltage battery 11, and the negative terminal g2 is connected to the negative electrode of the second high-voltage battery 12. The positive terminal g1 is connected to the negative terminal g2 of another of the battery distribution devices 71, and the negative terminal g2 is connected to the positive terminal g1 of still another of the battery distribution devices 71.

The charging relay 41a forms the series circuit P, and is provided between the positive electrode of the second high-voltage battery 12 and the negative electrode of the first high-voltage battery 11. The charging relay 41a conducts or shuts off the current that flows from the second high-voltage battery 12 to the first high-voltage battery 11.

The FET 41m forms the parallel circuit Q (refer to FIG. 39), and is provided between the negative electrode of the first high-voltage battery 11 and the negative terminal g2. The FET 41m conducts or shuts off a current that flows from the negative electrode of the first high-voltage battery 11 to the negative terminal g2.

The FET 41n forms the parallel circuit Q, and is provided between the positive terminal g1 and the positive electrode of the second high-voltage battery 12. The FET 41n conducts or shuts off a current that flows from the positive terminal g1 to the positive electrode of the second high-voltage battery 12.

The current detector 42 is provided between the positive terminal g1 and the positive electrode of the first high-voltage battery 11, and detects a current flowing from the positive terminal g1 to the first high-voltage battery 11. The current detector 42 outputs the detected current to the controller 50.

The current detector 43 is provided between the negative electrode of the second high-voltage battery 12 and the negative terminal g2, and detects a current flowing from the second high-voltage battery 12 to the negative terminal g2. The current detector 43 outputs the detected current to the controller 50.

The voltage monitoring unit 34A detects a voltage of each of the battery cells constituting the first high-voltage battery 11. The voltage monitoring unit 34A outputs the detected voltage to the controller 50.

The voltage monitoring unit 34B detects a voltage of each of the battery cells constituting the second high-voltage battery 12. The voltage monitoring unit 34B outputs the detected voltage to the controller 50.

The controller 50 controls the charging relay 41a and the FETs 41m and 41n based on the detection results output from the current detectors 42 and 43 and the voltage monitoring units 34A and 34B. In each of the battery units 70, when the input voltage is 400 V, the controller 50 controls the charging relay 41a and the FETs 41m and 41n to form the parallel circuit Q, and charges the first and second high-voltage batteries 11 and 12 with the power supplied from the external charger. When the input voltage is 800 V, the controller 50 controls the charging relay 41a and the FETs 41m and 41n to form the series circuit P, and charges the first and second high-voltage batteries 11 and 12 with the power supplied from the external charger.

Figure 39:
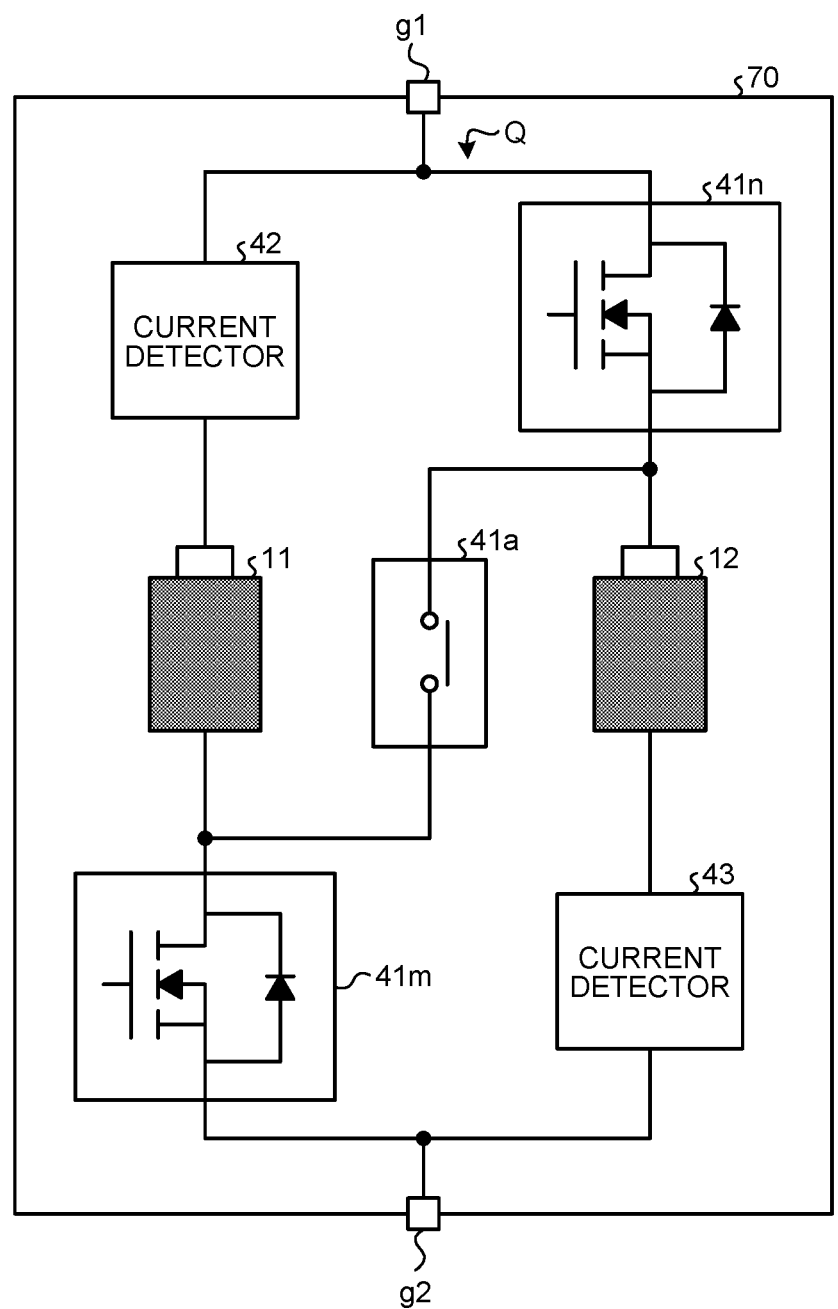
FIG. 39 is a schematic diagram illustrating a configuration example of the battery unit according to the fourth embodiment.
Figure 40:
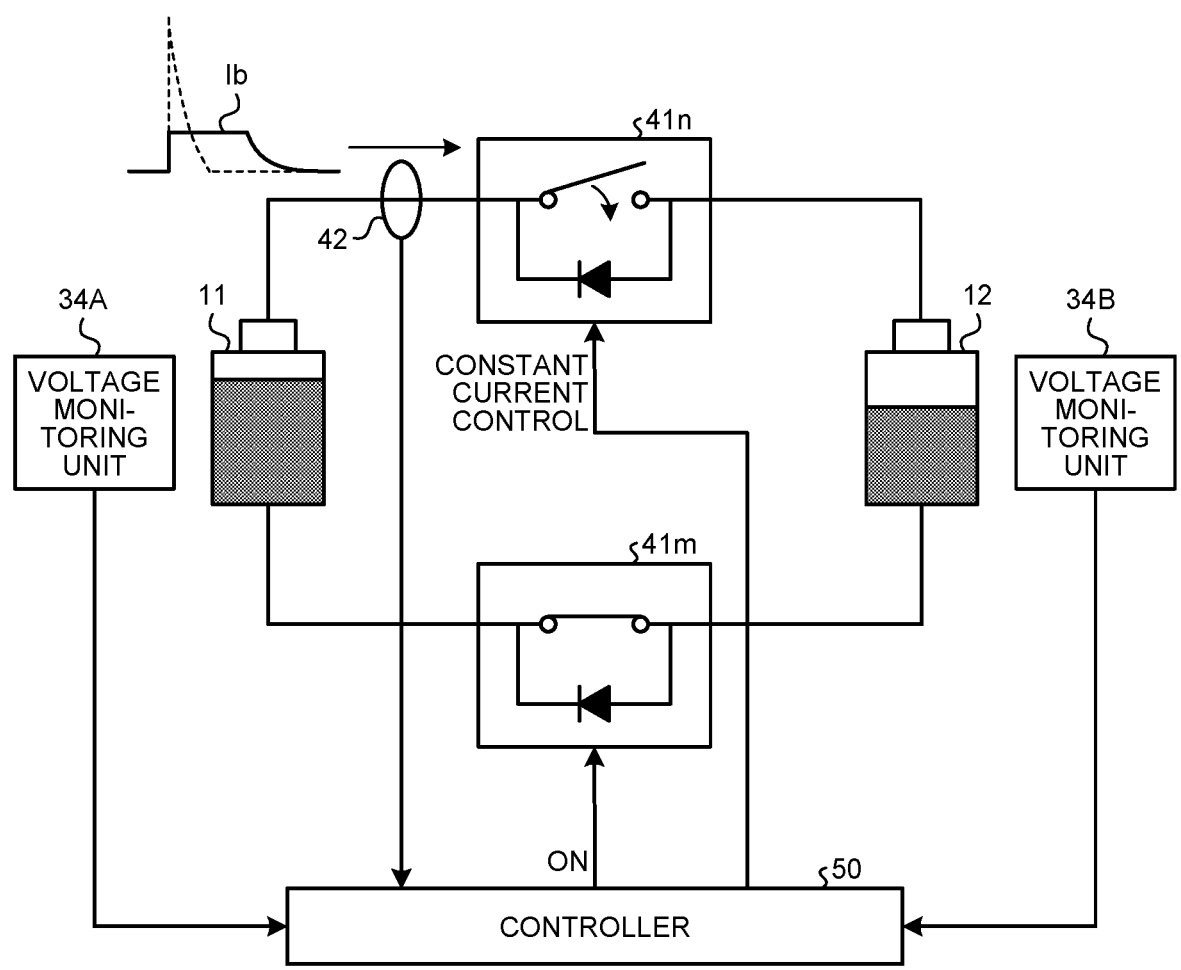
FIG. 40 is a schematic diagram illustrating overcurrent suppression (No. 1) during parallel connection according to the fourth embodiment.

FIG. 39 is a schematic diagram illustrating a configuration example of the battery unit 70 according to the fourth embodiment. FIG. 39 illustrates the battery unit 70 in a state in which the first high-voltage battery 11 and the second high-voltage battery 12 are both fully charged and have an equal state of charge. FIG. 40 is a schematic diagram illustrating overcurrent suppression (No. 1) during the parallel connection according to the fourth embodiment. In the battery unit 70 illustrated in FIG. 40, the state of charge of the first high-voltage battery 11 is higher than that of the second high-voltage battery 12, and a potential difference is generated between the first high-voltage battery 11 and the second high-voltage battery 12. In this case, the controller 50 fully turns on the FET 41m to conduct a current, and performs the constant current control (voltage equalization) using the FET 41n to keep a current Ib flowing from the first high-voltage battery 11 to the second high-voltage battery 12 constant.

Figure 41:
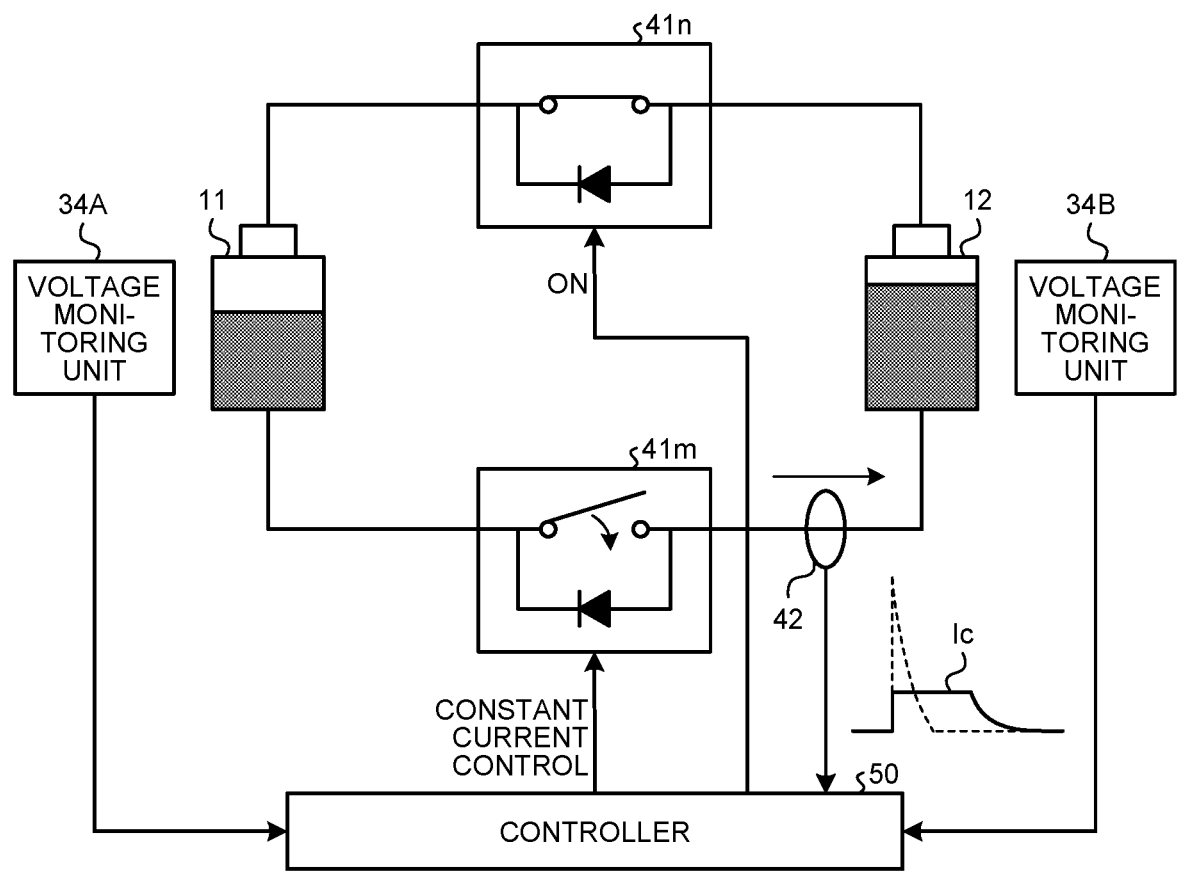
FIG. 41 is a schematic diagram illustrating the overcurrent suppression (No. 2) during the parallel connection according to the fourth embodiment.

FIG. 41 is a schematic diagram illustrating the overcurrent suppression (No. 2) during the parallel connection according to the fourth embodiment. In the battery unit 70 illustrated in FIG. 41, the state of charge of the second high-voltage battery 12 is higher than that of the first high-voltage battery 11, and a potential difference is generated between the first high-voltage battery 11 and the second high-voltage battery 12. In this case, the controller 50 fully turns on the FET 41n to conduct a current, and performs the constant current control (voltage equalization) using the FET 41m to keep a current Ic flowing from the second high-voltage battery 12 to the first high-voltage battery 11 constant.

Figure 42:
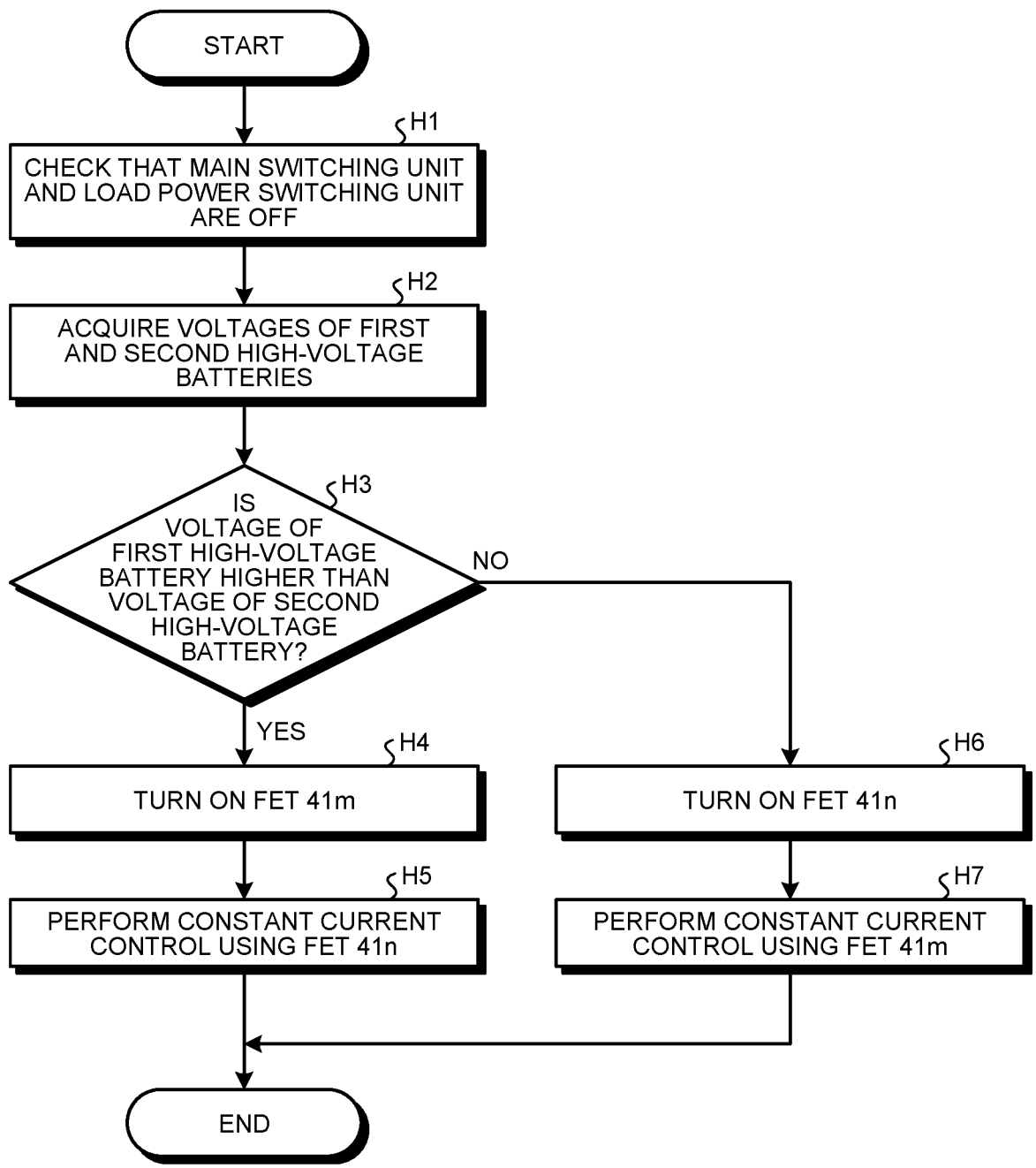
FIG. 42 is a flowchart illustrating the overcurrent suppression during the parallel connection according to the fourth embodiment.

FIG. 42 is a flowchart illustrating the overcurrent suppression during the parallel connection according to the fourth embodiment. The battery management controller BM checks that the main switching unit 32C and the load power switching unit 31D are off (Step H1). Then, in each of the battery distribution devices 71, the controller 50 acquires the voltages of the first and second high-voltage batteries 11 and 12 (Step H2), and determines whether the voltage of the first high-voltage battery 11 is higher than the voltage of the second high-voltage battery 12 (Step H3). If so (Yes at Step H3), the controller 50 fully turns on the FET 41m (Step H4), and performs the constant current control (voltage equalization) using the FET 41n (Step H5) to keep the current Ib flowing from the first high-voltage battery 11 to the second high-voltage battery 12 constant, in the parallel circuit Q, as illustrated in FIG. 40.

If, instead, the voltage of the first high-voltage battery 11 is lower than the voltage of the second high-voltage battery 12 (No at Step H3), the controller 50 fully turns on the FET 41n (Step H6), and performs the constant current control (voltage equalization) using the FET 41m (Step H7) to keep the current Ic flowing from the second high-voltage battery 12 to the first high-voltage battery 11 constant, in the parallel circuit Q, as illustrated in FIG. 41. In this way, in each of the battery distribution devices 71, the controller 50 performs the constant current control to prevent peripheral parts and the batteries themselves from failing due to overcurrent when the parallel circuit Q is formed.

Figure 43:
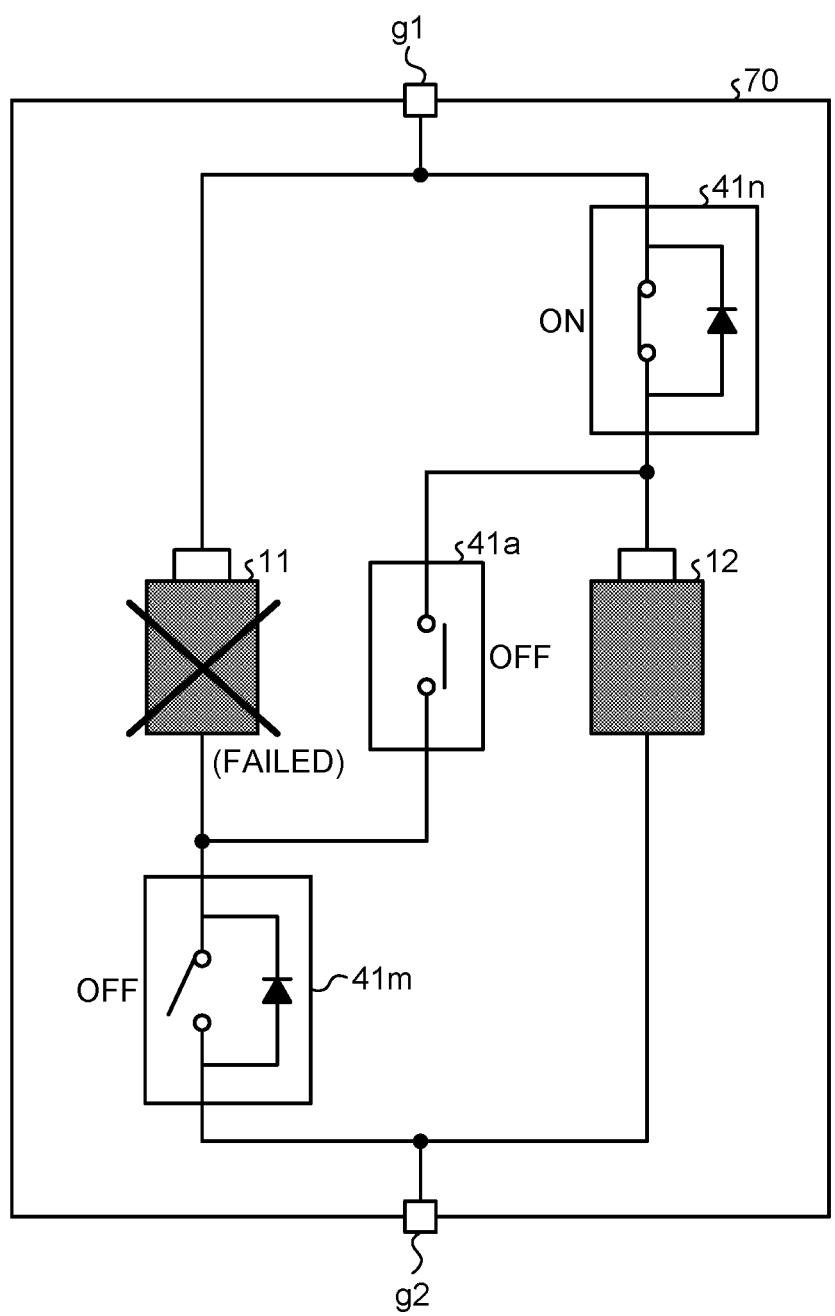
FIG. 43 is a schematic diagram illustrating an operation example during a battery failure according to the fourth embodiment.

FIG. 43 is a schematic diagram illustrating an operation example during a battery failure according to the fourth embodiment. Based on the detection results output from the voltage monitoring units 34A and 34B and the current detectors 42 and 43, the controller 50 determines whether either one of the first and second high-voltage batteries 11 or 12 has failed (for example, the output voltage thereof has dropped). If so, since the failed battery may adversely affect the other normal battery, the controller 50 electrically shuts off the failed battery, and supplies power using the normal battery. For example, as illustrated in FIG. 43, if the first high-voltage battery 11 has failed, the controller 50 turns off the FET 41m to electrically shut off the failed first high-voltage battery 11, and supplies the power using the normal second high-voltage battery 12. As a result, the power supply system 1C can be improved in reliability.

FIG. 44 is a flowchart illustrating the operation example during the battery failure according to the fourth embodiment. The controller 50 determines whether the parallel circuit Q has been formed (Step J1). If so, (Yes at Step J1), the controller 50 determines whether the first high-voltage battery 11 has failed (Step J2). If so (Yes at Step J2), the controller 50 turns off the FET 41m (Step J3) to electrically shut off the failed first high-voltage battery 11, and supplies the power using the normal second high-voltage battery 12 (refer to FIG. 43). If not (No at Step J2), the controller 50 determines whether the second high-voltage battery 12 has failed (Step J4). If so (Yes at Step J4), the controller 50 turns off the FET 41n (Step J5) to electrically shut off the second high-voltage battery 12, and supplies the power using the normal first high-voltage battery 11. If the first and second high-voltage batteries 11 and 12 have not failed (No at Step J4), the controller 50 supplies the power using the first and second high-voltage batteries 11 and 12 constituting the parallel circuit Q.

If, at Step J1 described above, the parallel circuit Q has not been formed, that is, the series circuit P has been formed (No at Step J1), the controller 50 determines whether the first high-voltage battery 11 has failed (Step J6). If so (Yes at Step J6), the controller 50 turns off the charging relay 41a and the FET 41m (Step J7) and turns on the FET 41n (Step J8) to electrically shut off the failed first high-voltage battery 11 and supply the power using the normal second high-voltage battery 12. If not (No at Step J6), the controller 50 determines whether the second high-voltage battery 12 has failed (Step J9). If so (Yes at Step J9), the controller 50 turns off the charging relay 41a and the FET 41n (Step J10) and turns on the FET 41m (Step J11) to electrically shut off the failed second high-voltage battery 12 and supply the power using the normal first high-voltage battery 11. If not (No at Step J9), the controller 50 supplies the power using the first and second high-voltage batteries 11 and 12 constituting the series circuit P.

As described above, the power supply system 1C includes the first high-voltage battery 11, the second high-voltage battery 12, and the battery units 70 each including the battery distribution device 71. The battery units 70 are connected in series to one another. In each of the battery units 70, when the input voltage is 400 V, the controller 50 controls the charging relay 41a and the FETs 41m and 41n to form the parallel circuit Q, and charges the first and second high-voltage batteries 11 and 12 with the power supplied from the external charger. When the input voltage is 800 V, the controller 50 controls the charging relay 41a and the FETs 41m and 41n to form the series circuit P, and charges the first and second high-voltage batteries 11 and 12 with the power supplied from the external charger. With this configuration, the power supply system 1C includes the battery switching switches (the charging relay 41a and the FETs 41m and 41n) for each of the battery units 70, and therefore can flexibly adapt to vehicles having different battery capacities (number of the battery units 70) by changing the number of the connected battery units 70, thus being improvable in versatility. Since the power supply system 1C includes the battery switching switches for each of the battery units 70, each of the battery switching switches can have a withstanding voltage lower than that of a conventional battery switching switch, and can reduce manufacturing cost.

Modifications

The following describes modifications of the first to fourth embodiments. Although the power supply system 1 has been described by way of the example in which the input voltage supplied through the DC charging port 20A is approximately 400 V or approximately 800 V, the input voltage is not limited thereto, and may be another voltage.

Although the example has been described in which the power storage unit 10 includes the two batteries (the first high-voltage battery 11 and the second high-voltage battery 12), the power storage unit 10 is not limited thereto, and may include three or more batteries.

The example has been described in which, after the quick charger 2 or the super-quick charger 3 is connected to the DC charging port 20A and before the power is supplied from the quick charger 2 or the super-quick charger 3 to the DC charging port 20A, the controller 50 detects whether any one of the charging relays 41a to 41c has failed. However, the controller 50 is not limited to this example, and may detect at another time whether the failure has occurred.

The example has been described in which the controller 50 detects whether the charging relay 41*a* has failed, based on the voltage (detection voltage V3) applied to the series circuit P by the first high-voltage battery 11 and the second high-voltage battery 12, the voltage (detection voltage V1) between the positive electrode and the negative electrode of the first high-voltage battery 11, and the voltage (detection voltage V2) between the positive electrode and the negative electrode of the second high-voltage battery 12. However, the controller 50 is not limited to this example. The controller 50 may detect whether the charging relay 41*a* has failed, based on, for example, the voltage (detection voltage V3) applied to the series circuit P by the first high-voltage battery 11 and the second high-voltage battery 12, and a preset threshold.

The example has been described in which the controller 50 detects whether the charging relay 41*b* has failed, based on the voltage (detection voltage V3) applied to the parallel circuit Q by the first high-voltage battery 11 and the voltage (detection voltage V1) between the positive electrode and the negative electrode of the first high-voltage battery 11. However, the controller 50 is not limited to this example. The controller 50 may detect whether the charging relay 41*b* has failed, based on, for example, the voltage (detection voltage V3) applied to the parallel circuit Q by the first high-voltage battery 11 and a preset threshold.

The example has been described in which the controller 50 detects whether the charging relay 41*c* has failed, based on the voltage (detection voltage V3) applied to the parallel circuit Q including the charging relay 41*c* by the second high-voltage battery 12 and the voltage (detection voltage V2) between the positive electrode and the negative electrode of the second high-voltage battery 12. However, the controller 50 is not limited to this example. The controller 50 may detect whether the charging relay 41*c* has failed, based on, for example, the voltage (detection voltage V3) applied to the parallel circuit Q by the second high-voltage battery 12 and a preset threshold.

The example has been described in which the DC charging port 20A is connected to the front power supply box 30B, and the AC charging port 20B is connected to the rear power supply box 30A. However, the configuration is not limited to this example, and may be such that, for example, the DC charging port 20A is connected to the rear power supply box 30A, and the AC charging port 20B is connected to the front power supply box 30B.

Although the example has been described in which the power supply system 1A performs the battery equalization processing through the charge switching unit 40A, the power supply system 1A is not limited to this example. The power supply system 1A may perform the battery equalization processing not through the charge switching unit 40A, but, for example, by connecting the first high-voltage battery 11 to the second high-voltage battery 12 using another circuit.

Although the example has been described in which the power supply system 1A shuts off the abnormal battery through the charge switching unit 40A, the power supply system 1A is not limited to this example. The power supply system 1A may shut off the abnormal battery not through the charge switching unit 40A, but, for example, using another circuit.

The example has been described in which, in the power supply system 1B, the controller 50 controls the charging relays 41*a* to 41*c* to form the series circuit P, and supplies the power having the voltage of approximately 800 V from the first high-voltage battery 11 and the second high-voltage battery 12 to the motor-inverter 7, and the power having the voltage of approximately 400 V from the second high-voltage battery 12 to the high-voltage load unit 8. However, the power supply system 1B is not limited to this configuration, and may supply the power having the voltage of approximately 400 V to the high-voltage load unit 8 from the first high-voltage battery 11 instead of from the second high-voltage battery 12.

The power supply system according to the embodiment switches the first battery and the second battery into the series circuit or the parallel circuit so as to be capable of appropriately performing the charging in the case where the input voltage from the external charger varies.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply system comprising:
   a first battery that is mounted on a vehicle and is capable of storing power;
   a second battery that is mounted on the vehicle and is capable of storing power;
   a switching unit switchable between a series circuit that connects the first battery to the second battery in series and a parallel circuit that connects the first battery to the second battery in parallel;
   a first input unit configured to be connected to a first external charger and receive power supplied from the first external charger; and
   a controller configured to control the switching unit based on an input voltage of the power received from the first input unit, wherein
   the controller is configured to:
   control the switching unit to form the parallel circuit and charge the first battery and the second battery with the power supplied from the first external charger if the input voltage is a first voltage, or
   control the switching unit to form the series circuit and charge the first battery and the second battery with the power supplied from the first external charger if the input voltage is a second voltage higher than the first voltage,
   the switching unit includes a series connection switch configured to form the series circuit, a first parallel connection switch configured to form the parallel circuit, and a second parallel connection switch configured to form the parallel circuit,
   the series circuit connects a positive electrode of the first input unit to a positive electrode of the first battery, connects a negative electrode of the first battery to a positive electrode of the second battery through the series connection switch, and connects a negative electrode of the second battery to a negative electrode of the first input unit,
   the parallel circuit connects the positive electrode of the first input unit to the positive electrode of the first battery, and connects the negative electrode of the first battery to the negative electrode of the first input unit through the first parallel connection switch, and further, connects the positive electrode of the first input unit to the positive electrode of the second battery through the second parallel connection switch, and connects the negative electrode of the second battery to the negative electrode of the first input unit, and
   the controller is configured to:

form the parallel circuit by turning on the first parallel connection switch and the second parallel connection switch and turning off the series connection switch if the input voltage is the first voltage; or form the series circuit by turning on the series connection switch and turning off the first parallel connection switch and the second parallel connection switch if the input voltage is the second voltage, and the power supply system further comprising:

a circuit voltage detector that is capable of detecting a voltage applied to the series circuit by the first battery and the second battery, a voltage applied to the parallel circuit by the first battery, and a voltage applied to the parallel circuit by the second battery;

a first battery voltage detector that is capable of detecting a voltage between the positive electrode and the negative electrode of the first battery; and a second battery voltage detector that is capable of detecting a voltage between the positive electrode and the negative electrode of the second battery, wherein the controller is configured to detect whether any one of the series connection switch, the first parallel connection switch, and the second parallel connection switch has failed, based on detection results of the circuit voltage detector, the first battery voltage detector, and the second battery voltage detector, after the first external charger is connected to the first input unit and before the power is supplied from the first external charger to the first input unit.

2. The power supply system according to claim 1, wherein the controller is configured to detect whether the series connection switch has failed, based on the voltages of the first battery and the second battery detected by the circuit voltage detector, the voltage of the first battery detected by the first battery voltage detector, and the voltage of the second battery detected by the second battery voltage detector, detect whether the first parallel connection switch has failed, based on the voltage of the first battery detected by the circuit voltage detector and the voltage of the first battery detected by the first battery voltage detector, and detect whether the second parallel connection switch has failed, based on the voltage of the second battery detected by the circuit voltage detector and the voltage of the second battery detected by the second battery voltage detector.

3. The power supply system according to claim 1, wherein the first battery and the second battery are configured to be connected by the series circuit or the parallel circuit, and constitute a power storage unit, the power supply system further comprises:

a rear power supply box that is provided on a rear side in an overall length direction of the vehicle, and is configured to turn on and off an electrical connection of the power storage unit to a load unit on the rear side of the vehicle; and a front power supply box that is provided on a front side in the overall length direction of the vehicle, and is configured to turn on and off an electrical connection of the power storage unit to a load unit on the front side of the vehicle, and one of the rear power supply box and the front power supply box is configured to turn on and off an electrical connection of the first input unit to the power storage unit.

4. The power supply system according to claim 3, further comprising:

a second input unit configured to be connected to a second external charger having a charging voltage lower than a charging voltage of the first external charger and receive power supplied from the second external charger, wherein the other of the rear power supply box and the front power supply box is configured to turn on and off an electrical connection of the second input unit to the power storage unit.

5. The power supply system according to claim 1, wherein the switching unit includes a voltage equalization switch that is provided between the positive electrode of the first battery and the positive electrode of the second battery, and is configured to turn on and off an electrical connection between the positive electrode of the first battery and the positive electrode of the second battery, and includes a resistor connected in parallel to the voltage equalization switch, and the controller is configured to, when equalizing voltages of the first battery and the second battery, turn off the voltage equalization switch to form a closed circuit that connects the positive electrode of the first battery to the positive electrode of the second battery through the resistor, so as to cause a current to flow from a higher-voltage side toward a lower-voltage side of the positive electrode of the first battery and the positive electrode of the second battery through the resistor.

6. The power supply system according to claim 1, further comprising:

shut-off switches that is capable of shutting off the first battery and the second battery, wherein the controller is configured to:

control, if the first battery is abnormal, one of the shut-off switches to shut off the first battery, and supply power from the second battery to a load unit on a rear side of the vehicle and a load unit on a front side of the vehicle, or control, if the second battery is abnormal, another of the shut-off switches to shut off the second battery, and supply power from the first battery to the load unit on the rear side of the vehicle and the load unit on the front side of the vehicle.

7. The power supply system according to claim 1, wherein the controller is configured to:

control, when supplying power to a first load unit having a load voltage equal to the first voltage, the switching unit to form the parallel circuit, and supply the power from the first battery and the second battery to the first load unit, or control, when supplying power to a second load unit having a load voltage equal to the second voltage, the switching unit to form the series circuit, and supply the power from the first battery and the second battery to the second load unit.

8. The power supply system according to claim 1, further comprising:

a plurality of battery units each including the first battery, the second battery, the switching unit, the first input unit, and the controller, wherein the battery units are connected in series to one another, and in each of the battery units, the controller is configured to control, when the input voltage is the first voltage, the switching unit to form the parallel circuit, and charge the first battery and the second battery with the power supplied from the first external charger, or control, when the input voltage is the second voltage, the switching unit to form the series circuit, and charge the first battery and the second battery with the power supplied from the first external charger.

9. The power supply system according to claim 1, wherein the switching unit includes a first constant current switch configured to regulate a current flowing from the first battery to the second battery when the parallel circuit is formed and a second constant current switch configured to regulate a current flowing from the second battery to the first battery when the parallel circuit is formed.

10. The power supply system according to claim 1, wherein
the controller is configured to control the switching unit to form the series circuit to supply power from the first battery and the second battery to a second load unit having a load voltage equal to the second voltage, and is configured to supply power from one of the first battery and the second battery to a first load unit having a load voltage equal to the first voltage.

\* \* \* \* \*